US007284987B2

(12) United States Patent
McGrath

(10) Patent No.: US 7,284,987 B2
(45) Date of Patent: Oct. 23, 2007

(54) PHYSICAL QUANTUM MODEL FOR THE ATOM

(76) Inventor: Terrence S. McGrath, 20196 Palm Island Dr., Boca Raton, FL (US) 33498

( * ) Notice: Subject to any disclaimer, the term of this patent is extended or adjusted under 35 U.S.C. 154(b) by 197 days.

(21) Appl. No.: 10/996,546

(22) Filed: Nov. 24, 2004

(65) Prior Publication Data

US 2005/0153266 A1 Jul. 14, 2005

Related U.S. Application Data

(63) Continuation-in-part of application No. 10/683,384, filed on Oct. 10, 2003.

(60) Provisional application No. 60/417,781, filed on Oct. 11, 2002.

(51) Int. Cl.
*G09B 23/26* (2006.01)

(52) U.S. Cl. .................................... 434/281

(58) Field of Classification Search ............ 434/276, 434/278, 281, 283, 298, 300, 301, 302
See application file for complete search history.

(56) References Cited

U.S. PATENT DOCUMENTS

| 2,601,729 | A | 7/1952 | Underwood |
| 3,183,608 | A | 5/1965 | Jierree et al. |
| 4,030,209 | A | 6/1977 | Dreiding |
| 4,099,339 | A | 7/1978 | Snelson |
| 4,192,084 | A | 3/1980 | O'Riordan |
| 4,348,190 | A | 9/1982 | Barrett |
| 4,812,128 | A | 3/1989 | Mikelsaar |
| 5,030,103 | A | 7/1991 | Buist et al. |
| 5,382,166 | A * | 1/1995 | Ahmose ............ 434/281 |
| 5,453,937 | A | 9/1995 | Srinivasan et al. |
| 5,557,535 | A | 9/1996 | Srinivasan et al. |
| 5,947,745 | A | 9/1999 | Tempelman |
| 6,016,978 | A * | 1/2000 | Neuhaus ............ 239/650 |
| 6,019,482 | A | 2/2000 | Everett |
| 6,443,974 | B1 | 9/2002 | Oron et al. |
| 6,460,014 | B1 | 10/2002 | Waldman et al. |
| 6,537,304 | B1 | 3/2003 | Oron |
| 2002/0183809 | A1 | 12/2002 | Oron et al. |

FOREIGN PATENT DOCUMENTS

| EP | 1 010 112 B1 | 4/1998 |
| WO | WO90/13126 | 1/1990 |

OTHER PUBLICATIONS

Abe, F. et al., "Measurment of Dijet Angula Distributions by the Collider Detector at Fermilab The CDF Collaboration", Physical Review Letters, 77, 5336, 1996.

(Continued)

*Primary Examiner*—Kurt Fernstrom
(74) *Attorney, Agent, or Firm*—Saliwanchik, Lloyd & Saliwanchik

(57) ABSTRACT

A Quantum Model of the atom has been formulated, which illustrates how classical wave structures and four-wave intersections provide a background-independent supersymmetric metric of quantized positions outward from the atom's single neutrino centerpoint. The Quantum Model reveals the physical structure and the natural regularization of low-energy lattice circle solutions as the basis for quantum loops founded at Planck scales. Importantly, the Model provides the causal structure for charge, confinement, the Higgs mechanism, photons and gravity. The Quantum Model provides a unique tool for teaching, demonstration, rendering, and experimentation related to atomic level structures, field generation, bonding, and elemental bond control.

17 Claims, 60 Drawing Sheets

OTHER PUBLICATIONS

Baez, John C., "Higher-Dimensional Algebra and Planck-Scale Physics", in Physics Meets Philosophy at the Planck Length, Eds. Craig Callender and Nick Huggett, Cambridge University Press, Cambridge, 1999.

Evans, D.J. Cohen, E.G.D. & Morriss, G.P., "Probability of Second Law Violations in Shearing Steady States", Physical Review Letters, 71, 2401-2404, 1993.

Hau, Lene Vestergaard, "Frozen Light", Scientific American, p. 66-72, Jul. 2001.

Hayashi. et al., "Light-Induced Conversion of an Insulating Refractory Oxide into a Persistent Electric Conductor", Nature, 419, 462-465, 2002.

Strecker, K.E., et al., "Formation and Propagation of Matter Wave Soliton Trains", Nature, 418, 150-153, (May 9, 2002).

Karu, T.I., et at., "Changes in Absorbance of Monolayer of Living Cells Induced by Laser Radiation at 630, 670 and 820 nm", Journal on Selected Topics in Quantum Electronics, vol. 7, No. 6, Nov./Dec. 2001.

Karu, Tiina I., "Lower-Power Laser Therapy", Biomedical Photonics Handbook, Ch. 48, pp. 1-25 (Feb. 3, 2003).

Knott, Ron, "Fibonacci Numbers and the Golden Section", 2002, www.mcs.surrey.ac.uk/Personal/R.Knott/Fibonacci/, ron@ronknott.com, used with permission.

Lamas-Linares, Anita, et al., "Experimental Quantum Cloning of Single Photons", Science, 296, 712-714, 2002.

Ledingham, K.W.D., Singhal, R.P., McKenna P., Spencer, I., "Laser-Induced Nuclear Physics and Applications", EuroPhysics News, vol. 33, No. 4, Article 3, 2002.

de Pomerai, D.I., et al., "Growth and Maturation of the Nematode Caenorhabditis Elegans Following Exposure to Weak Microwave Fields", Enzyme and Microbial Technology 30, pp. 73-79, 2002.

Pejakovic, Susan A., Kitamura, Chitoshi, Miller, Joel S., and Epstein, Arthur J., "Photoinduced Magnetization in the Organic-Based Magnet Mn (TCNE)x-y($CH_2C_{12}$)," Physical Review Letters, 88, 2003.

Quail, P.H., "A Light Switchable Gene Promoter System", Nature Biotechnology published on-line, doi: 10.1038/nbt734, 2002.

Tanida, K., et al., "Measurements of the B (E2) of Lambda 7 Li and Shrinkage of the Hypernuclear Size", Physical Review Letters, 86, 1982 (print issue of Mar. 5, 2001).

Tiphlova, O., et al., "Action of Low-Intensity Laser Radiation on *Escherichia coli*", CRC Critical Reviews in Biomedical Engineering, 18(6), 387-412, 1991.

Trigilia, A., et al., "Biophysical Aspects of the Ultra Weak Photon Emisson from Living System During Growth", Current Development of Biophysics; C. Zhang, F. Popp and M. Bischof, Eds, Hang Zhou University Press, 1996.

Whelan, H.T., et al., "The NASA Light-Emitting Diode Medical Program—Progress in Space Flight and Terrestrial Applications", American Institute of Physics Conference Proceedings 504 (1), pp. 37-43, Jan. 19, 2000.

Zhou, et al., "An Efficient Two-Photon-Generated Photoacid Applied to Positive-Tone 3D Microfabrication", Science, 296, 1106-1109, 2002.

Patent Abstracts of Japan, Publication No. 2001-092349, Shozo, "Molecular Structure Model".

Patent Abstracts of Japan, Publication No. 2000-321972, Shuji, "Molecular Model Which Allows Visual Recognition of Molecular Motion".

Patent Abstracts of Japan, Takamatsu, "Molecular Structure Model", Application No. 2000-372328.

Baez, John C., "Higher-Dimensional and Planck-Scale Physics", Department of Mathematics, University of California, http://math.ucr.edu/home/baez/planck/, Jan. 28, 1999.

Jaffe, Arthur and Witten, Edward, "The Physcis of Gauge Theory", Harvard University, California Institute of Technology.

* cited by examiner

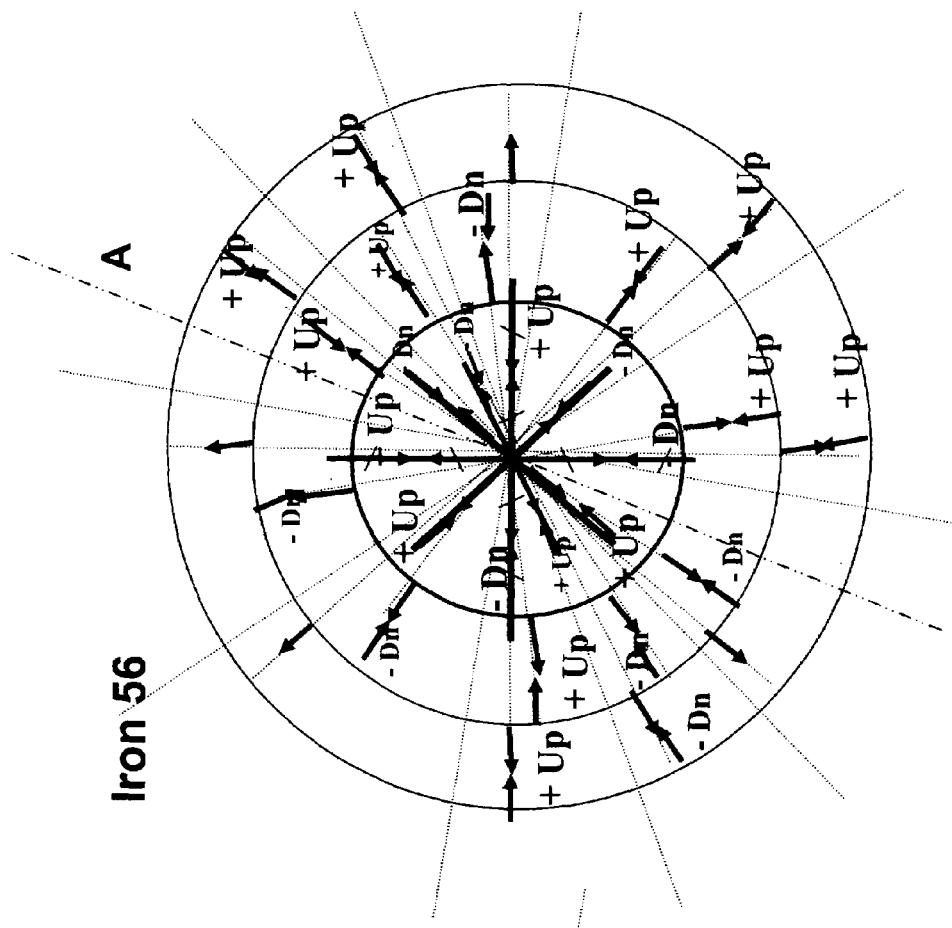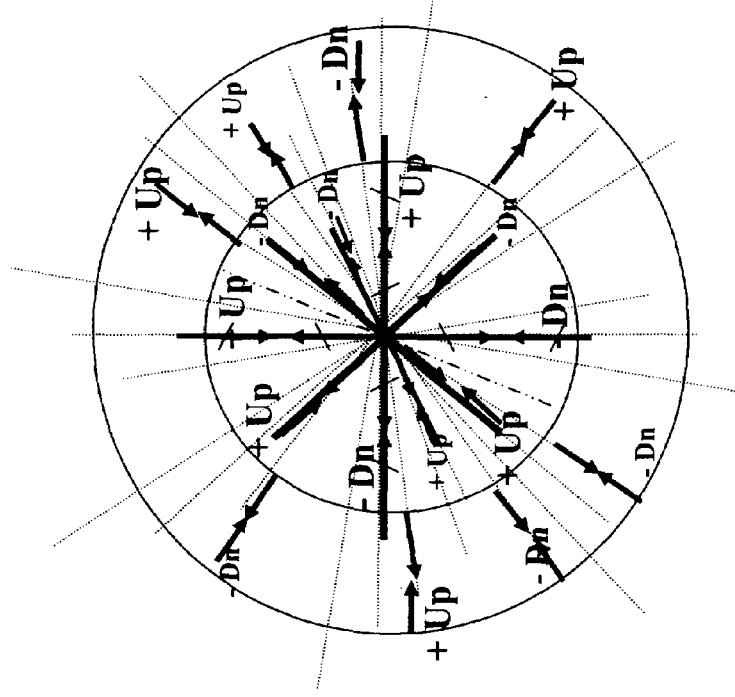
FIG. 44

PHYSICAL QUANTUM MODEL FOR THE ATOM

CROSS REFERENCE TO RELATED APPLICATIONS

This application is a continuation-in-part of U.S. patent application Ser. No. 10/683,384 filed Oct. 10, 2003 which takes benefit of U.S. provisional patent application Ser. No. 60/417,781, filed Oct. 11, 2002, the entire contents of which are herein incorporated by reference without disclaimer.

BACKGROUND OF THE INVENTION

1. Field of the Invention

The present invention is directed to modeling atomic structure and field generation. In particular, working physical models for mass structure, electromagnetic field generation, photons, and gravity are described as teaching tools.

2. Description of the Background Art

The invention includes a novel model of the atom that describes the causal quantized structure of quantum fields, mass-particles, photons, and gravity, yielding predictive tools for the structure, formation, and control of elemental particles, atoms, chemical bonds, biological processes and photo-stimulation.

Early Theoretical Models—There have been numerous physical models of the atom since Lord Kelvin described it as a permanent vortex structure within the context of an ether background. J. J. Thompson improved the model with the discovery of electrons in 1897. Later the atomic model became known as the plum pudding model where the atom was pictured as holding negative electrons within a sphere of unknown non-electrical forces spread evenly throughout the atom (like raisins in plum pudding). The plum pudding model was also theorized to explain the different wavelengths of light based on the atom's size.

The pudding model was proven wrong based on experimental scattering data gathered by Rutherford almost 100 years ago. Rutherford showed that alpha particles slammed into thin gold foil sheets produced scattering only when the centerpoints collided and concluded that the entire mass of the atom is held at a finite center point. This supported the point nucleus theory and its infinitesimally small size in relation to the radius of the electron.

In 1913 Bohr suggested halo orbits for electrons, a model that explains quantum electrodynamics (QED) and electron angular momentum. This model, which shows the atom's electrons in orbit around a point-mass nucleus, is still popular today, although there are significant challenges, as it does not provide an accurate description of a point-mass center using just three dimensions. Einstein later proposed a three-dimensional space augmented with time as a fourth variable, or fourth dimension, in order to describe a space formed by a point mass in motion. This adjustment was required because a field could not be described without the point being in motion through time to create space and because four-dimension math better describes the structure of matter and fields.

Otherwise, for over 90 years the overall physical or topological model for the atom has not changed substantially from a centerpoint-mass model despite significant advances in understanding the mathematical relationships of forces and particles within the atom and the discovery of a large number of particles that form the nucleus and constitute the strong and weak nuclear forces.

Physical Models—Most models that are used for educational purposes are designed to show the interlocking of molecular and chemical bonds with a variety of unique flanges. The minute scale of the centerpoint-mass nucleus relative to the electron orbit has made physical models difficult to portray, hence the focus on bonding models. Further, physical models have not portrayed the statistical models for the electron or an organizational construct for fields and the centerpoint mass.

Mathematical models—A number of theories have attempted to mathematically unify atomic forces. The present dominant model is commonly termed the "Standard Model". The forces of the atom have been accurately described within the context of the Standard Model, where particles and force exchanges are represented in minute detail, matching experimental results. There are at least five major types of string theory that have unique base assumptions for gauge limits and dimensions (1 through 26 dimensions). String theories add time as a coordinate in unified space-time geometry. While three dimensions can describe a point, four-dimensions (three conventional plus time) are used to describe an event and a space. Logically extended, extra dimensions have been shown to describe forces and symmetrical constructs. Popular higher dimension theories have included four, five, ten, and twenty-six dimensions. Through mathematical compacting, extra dimensions (>3) are "rolled up" to match our conventional three-dimensional world.

Several recent theories attempt to describe particles topologically, with the objective of: (1) providing boundaries and containment and (2) linking particles and forces more directly. Spin foams, twisters, M-branes, P-branes, and D-branes mathematically describe particle forces that more closely represent a conventional view of objects that can spin, rotate, resonate, and have volume. While they appear to provide a more accurate description of particles and force transfers, these theories do not describe the causal structure underlying the atom. Further, each of these mathematical models has to impose artificial limits to the math equations to account for the formation of the atom.

Mathematical models have grown in complexity because the structure of symmetry, electromagnetic fields, charge, spin, confinement, and gravity cannot be directly seen. The conventional view is that the atomic nucleus is a centerpoint mass and the vast space between the nucleus and the orbiting electrons is virtually empty. For almost 90 years, this has been considered by many as fundamental.

Current models do not establish the structure of the real and physical limits for regularizing fields and gauge limits as the center of the atom approaches zero. The models do not adequately accommodate the dynamic nature of the atom and therefore have limited ability to predict sub-atomic machinery and force interactions. The Standard Model describes mathematical relationships but is unable to locate a point in space at a given time. Relativity is not seen as relevant inside the orbit of the electrons. A new model of the atom is needed to combine the theories of the Standard Model and General Relativity to provide information in real time and space on bonding, force interactions, and atomic substructures.

Deficiencies of the Known Models

Models have enhanced our understanding of Physics over the last century; however, each has had limitations in providing a grand unification theory. Bohr's model, for example, cannot account for other basic characteristics of the atom such as scattering or spectral absorption/emission from multi-electron atoms. The Standard Model and General Relativity as mathematical models have made significant contributions to the field of physics, but, despite these advancements, there has been little progress in tying these two descriptions of matter together. They differ dramatically in scale and mathematical complexity and they have not been unified.

Topological descriptions of particles provide some guidance for the structure of fields; however, what has remained elusive is a single physical model for the atom that provides the normalization and regularization factors that guide the formation of atoms and particles. Such a physical model should be based on a limited set of rules with minimal arbitrary elements and provide predictions of future events. A successful model should predict new experimental results and at the same time unify what has already been measured. A new model should also ideally provide lattice regularization for the formation of particles and provide lattice spacing that tends to zero at the centerpoint of the particle or atom. Further, the model should define limits of appropriate expectations of gauge-invariant observables.

To date, there has been no successful theory for the natural regularizations of the atom, that is, why atoms form in such consistent ways and in such tremendous numbers of iterations.

While mathematical models may accurately describe forces on the most basic levels, they have not yielded a plethora of experimental predictions going forward; nor are they able to describe the natural limits providing quantization of light, particle scales, or atomic organization. Natural limits include the fundamental, real parameters for the formation of particles, light, and atoms with such consistency and regularization. Natural limits would also define the "machinery" underlying the structure of fields, charge, photons, and gravity. Further, it would yield constructive insights to the interaction of atoms within the context of chemistry and biology.

Another challenge to reaching a unified theory has been the significant scale disparity between the scale of force transfer and the scale of the proton. Strings are theorized to have force transfers starting on scales 20 orders of magnitude smaller than a proton. In some gauge theories, lattice volumes are described as zero, while other theories declare the smallest material dimension as a Planck length.

The wide variety of multi-dimensional theories makes a unification theory appear even more difficult to assemble. Popular string theories range from one to 26 dimensions. Force transfers are sometimes assigned particle values; sometimes particles are theorized with no dimension. Electron excitation can only be "explained" for hydrogen and has not been successful for many-electron atoms because the current model for hydrogen requires increasing radii for each energy level, an assumption that is unworkable in many-electron atoms.

A long-standing objective has been to unify gravity with the structure of matter. Most physics theories do not include computations for gravity; much less describe the mechanism for its generation. Current theories cannot explain the structural origin of fields or handedness (chirality) despite being able to measure both with high accuracy.

Current theories also do not postulate causality for discrete sizes of particles (the "hierarchal problem"). Symmetry is described mathematically, most often as positive and negative integer values mixed with uncertainty, but current physical models do not explain a causal mechanism in the conventional realm for these values. No theory today answers the structure of mass gap, confinement, gravity, field generation, or charge. Neutrinos remain an enigma. Black holes and large cosmological objects appear to follow another set of rules. The source of extra-gravitational forces in the universe (postulated as dark matter) is not understood. No theory explains the structural reason why inertial mass and gravity mass are the same. No theory provides a structural basis for the Pauli exclusion principal or Hund's rule. Although, many theories have offered significant insights into these questions, none has proven all-inclusive.

The important role of physics in biology and chemistry is often underemphasized. While bonds can be described mathematically, physics cannot describe the structural mechanism for bonding radii or the atomic-level coding that is locked in amino acids to differentiate genes and the life they generate. Grand unification theories seek a set of equations that describe all phenomena. No such model currently exists.

Another major question concerns the nature of a dimension. Mathematically, dimensions and complexity are simply positive, negative, real, or imaginary numbers. A multi-dimension model that involves tangible structure for dimensions should render the structure of matter and forces to be real, and although complex, they should be determinable and not subject to uncertainties and probabilities. However, it has also been conjectured that four dimensions would not be visible conventionally (Jaffe, Arthur and Witten, Edward, Quantum Yang-Mills Theory, Clay Math Institute, 2000 (Web publication only)).

A successful physical atomic model should translate a dimension into conventional terms, yielding a plethora of predictions based on the model itself. The unifying solution had to provide a mechanism for "real" dimensions, allowing mass, and field descriptions in absolute time. Supersymmetry also requires a structure for gauge limits and a structure for lattice spacing where moments can converge to a unique, determinable centerpoint. A unique physical centerpoint is not found in the Standard Model.

Most mathematical models use a fixed lattice background structure to represent space in which matter exists. Others have theorized that the atom must be background independent in order to match our conventional understanding (Baez, John C., "Higher-Dimensional Algebra and Planck-Scale Physics," in Physics Meets Philosophy at the Planck Length, Eds. Craig Callender and Nick Huggett, Cambridge University Press, Cambridge, 2001, pp. 177-195).

Current models also do not establish the structure of the real and physical limits for regularizing fields and gauge limits as the center of the atom approaches zero. The models do not adequately accommodate the dynamic nature of the atom and therefore have limited ability to predict sub-atomic machinery and force interactions. The Standard Model describes mathematical relationships but is unable to locate a point in space at a given time. Relativity is not seen as relevant inside the orbit of the electrons.

For about four generations, debate has raged over the seemingly different physics rules inside the atom versus the convention 3-D world outside the atom. Heisenberg theorized the atom was based on discontinuous quantum points, a foundation of the Standard Model. Einstein's rules of Relativity did not appear to apply inside the electron. A new model of the atom that combines the Standard Model and General Relativity to provide information in real time and space on bonding, force interactions and atomic substructures would be of significant value in providing a detailed representation and teaching model of atomic structure and allowing development of methods to control chemical and biological reactions.

SUMMARY OF THE INVENTION

The invention is a Quantum Model (the "Model") that confirms the unification of the major theories in physics today and shows that atomic structure and fields are a result of a simple basic structure. The Quantum Model defines the fundamental physical structure of the atom at Planck scale creating a supersymmetric four-wave metric providing the lattice scaffolding for particles and fields. The Model provides a basic physical structure for the deterministic representation of the supersymmetric metric, particle structure, mass scales, field structures, charge, confinement, Higgs mechanism, and the machinery for light and gravity. The Model also removes hidden variables from dimension analysis and subsumes most of today's dimension theories.

The Quantum Model provides the fundamental structure to the organization of the atom. It provides a physical description of the atom as a geometric construct that is a visually intuitive description of the structure and position of particles, sub-particles, fields, photons, and forces within the atom. This Model was designed to provide visualization of the tangible structure of the atom. The Model "fills in" the space between the centerpoint and the electron with quantum loop structures fundamental generators of subtle differences in fields.

The Model unifies the four major forces in physics by providing a physical structure for reference, including:
1) the weak force—the single six-dimension centerpoint;
2) the strong force—alignment of the four-wave metric such that three four-wave nodes are shared between each contiguous mass-particle;
3) gravitation—the disturbance to the background caused by the mass-particle quantum loops through the metric;
4) the electromagnetic force—field alignment associated with entire metric fields and chirality;
5) the Higgs mechanism—the axial alignment of the triplet's metric scale, axes, axes sequence, and chirality with a nearby particle light-cone.

The Model is accurate. The model matches the scale of the electron to the proton to eight orders of magnitude. The physical structure for the centerpoint weak force is shown to be a scale of 5.7743E-10 consistent with observations (Table 9). The Model unifies the scale of the proton with that of the single-dimension transfer in string theory and Planck length scales to 4.69E-21, solving the hierarchy problem. The Model provides the structure for gravity and calculates the scale of gravitation to the electromagnetic force to be 9.39E-39 for Iron, consistent with observed values.

The Quantum Model provides a supersymmetric organization using real 4-D space, without hidden or negative dimensions. The Model shows that the electromagnetic field is propagated locally and is background independent. The Model provides a logical, physical structure that can be understood without significant mathematical gymnastics, using a wave structure that would seem to fit with the conventions of the macroworld.

The Quantum Model shows how the space inside the atom is quantized with discrete potentiated 4-D spaces that are the result of four-wave intersections generated by a single 6-D resonant centerpoint providing a coherent and modelable supersymmetric metric of four-wave temporary intersections. The entire metric rotates on a conventional and complex basis. The metric alignment is based on separation of temporary four-wave intersections creating discrete 4-D points organized within a 6-choose-4 permutational metric axially organizing 15 lattice sets of four-wave intersections. The four-wave metric is shown to be supersymmetric, consistent with Lorentz transformations and complex rotation.

The Quantum Model is deterministic, providing discrete radial measurements based on measuring waves traveling at the speed of light from the defined centerpoint. All points within the metric can be defined using the metric tools provided by the Model. The Quantum Model shows why atomic forces can be measured through the 6-D centerpoint and provides insight to a more descriptive means to measure sub-atomic using wave parameters. The Model also describes the 6-D centerpoint as the structure for a neutrino.

The Quantum Model uses naturally occuring high-density circle lattice sets as radii for quantum loops following spindle torus geometries. The organization of the metric and quantum loops create a regularized structure for particles, atoms, and fields. Resonant energy transfers through these intersections following one-dimension changes to create quantum loops. Five-dimension quantum loops are comprised of three sets of four-space lattices from within the 15-axis 6-choose-4 metric. The axial metric set naturally defines a four-vector lattice structure, (consistent with Lorentz transformation) that can sweep about the centerpoint, rotate, and create infinite fields while maintaining lattice spacing down to the singular centerpoint.

Quantum loops are not solid structures but are the result of discrete four-wave intersections transferring energy through one-dimension transfers within an axial triplet. The scales of mass are regularized by the simple available sets of high-density lattice circle solutions.

The Quantum Model illustrates the natural structural reasons for mass-particle scales with no compromises or missed steps from the proton down to the structure of a photon and a single lattice point. The Model provides the structure underlying discrete mass scales including the quark, pentaquark, and smaller mass-particle. The Model also includes the multiple substructures of the electron.

The Model is fundamentally based on four basic sets of math: 1) quantum four-wave intersections based on sets of waves chosen from the six dimension wave variables; 2) high-density lattice circle sets for quantum loops; 3) the geometry of the spindle torus and quantum loop intersections: and 4) the Julia fractal to describe single dimension energy transfers. On another level, the Model reveals that the Rydberg constant ($R_h$=10 973 731.568 525(73) m$^{-1}$, NIST) represents a quantum loop geometry for Hydrogen.

All mass-particles are shown to have negative and positive poles. The orientation of the particles defines the particle's apparent charge within the atom. The Model also sheds light on the spontaneous and ordered development of mass-particles, starting from the 6-D neutrino at Planck scales up to the proton.

Another important feature of the Quantum Model is that it provides the machinery for the excitation states of electrons in hydrogen without requiring an increase in the electron radius, an unworkable construct when attempting to Model the excitation of many-electron atoms. It also includes why a photon is both a particle and a wave and how photon energy is absorbed and emitted within mass. The Model also indicates the determinable positions of electrons.

The dual wave and particle nature of photons has been the subject of a multitude of theories and conjectures for generations. The underlying machinery for photon emission or absorption has been an enigma. The challenge is to apply the known behaviors of the photon to the four-wave metric and quantum loop structure disclosed in the Quantum Model.

The same resonant energy that resonates within the centerpoint and transfers through the quantum loops is the starting point for the source of photon energy; that is, the photon is excess resonant energy released from quantum loop nodes. The rules of the quantum loop then applied easily to the photon, such as requiring four-wave alignment before the energy could be transferred node-to-node. The four-wave model also provided a mechanism for the photon to travel outward from the atom at the speed of light, following a single dimension wave away from the centerpoint. The use of quantum loops also provided functions for chirality, wave information, and geometry as a foundation for some of the observed properties of light.

The Quantum Model identifies that there are three sources of dimension wave generation by the atom: 1) The electromagnetic field generated by the centerpoint, 2) dimension waves of gravity generated by quantum loops, and 3) the resonant photon generated by quantum loops. These phenomena are all generated within the supersymmetric metric and quantum loops.

The supersymmetric metric and resonant quantum loop structure provided the physical mechanism for gravitation. The Quantum Model shows that gravitation is generated by the background disturbance associated with quantum loops. The Model also shows that the ratio of gravitation to the electromagnetic force varies by element.

The Quantum Model of the atom provides a description of the atom that is written, rendered, and represented physically that provides a teaching tool suitable for describing numerous physical, chemical, biological, biotech, and nanotechnology phenomena.

| Particle | Radius | # Lattice Points on High-Density Circles |
|---|---|---|
| Node | 0.5 | 1 |
| Sub-pentaelectron | 1 | 4 |
| Pentaelectron | 5 | 12 |
| Sub-Pentaquark | 13 | 12 |
| Electron Quark | 25 | 20 |
| Pentaquark | 65 | 36 |
| Electron | 85 | 36 |
| Quark | 325 | 60 |
| Proton | 1105 | 108 |

Figure 8:
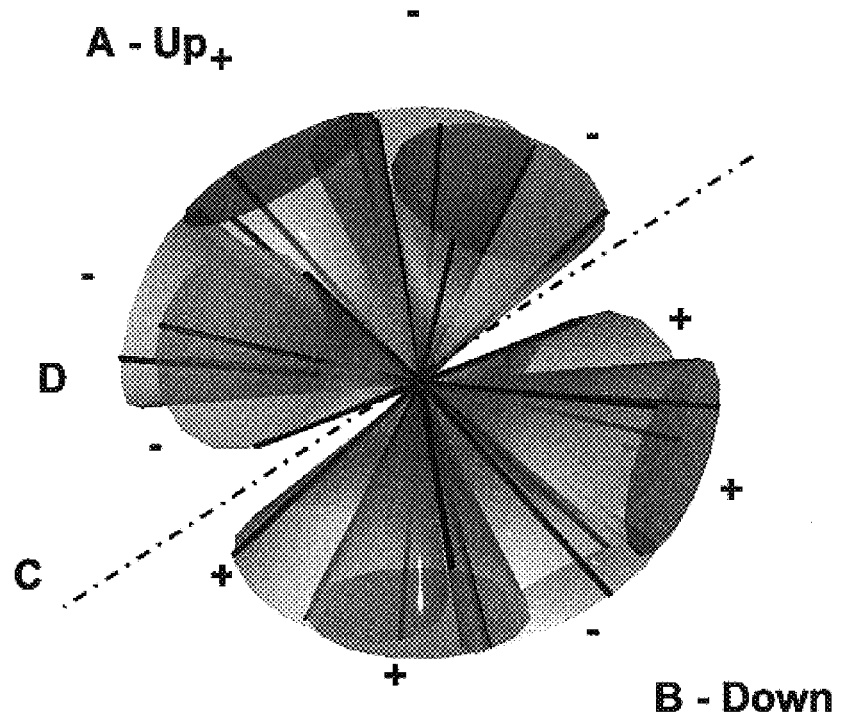
FIG. 8 is a view in perspective of the fifteen 6/4 axes shown in FIG. 6 further developed as 10 cones (five 6/4 triplets) that share a common center point each with one cone on opposite sides of the centerpoint. The triplet again defines spin up A versus spin down B. The drawing also show the interplay of the ten cones and the relative spin character for contiguous triplets D. Letter C show the conceptual equator, exaggerated, as an organizing element of the metric cones and axial spin character.
Figure 21:
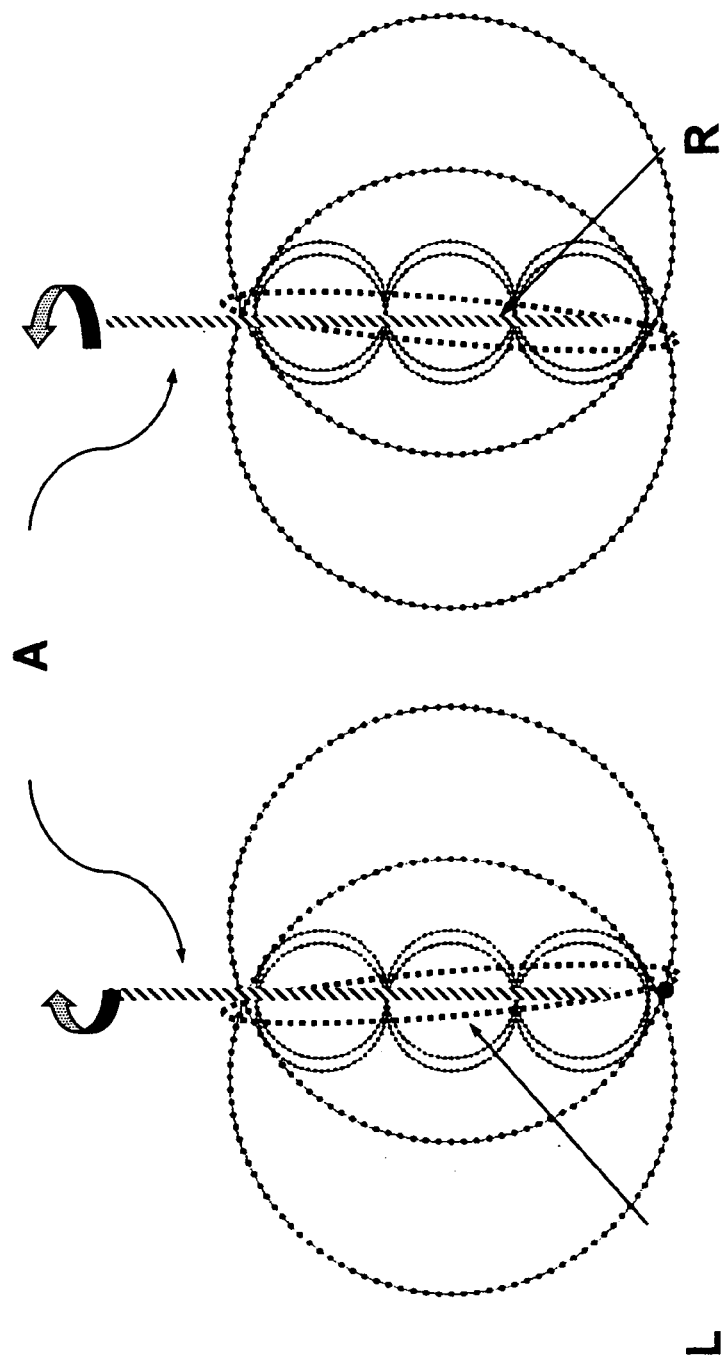
Figure 22:
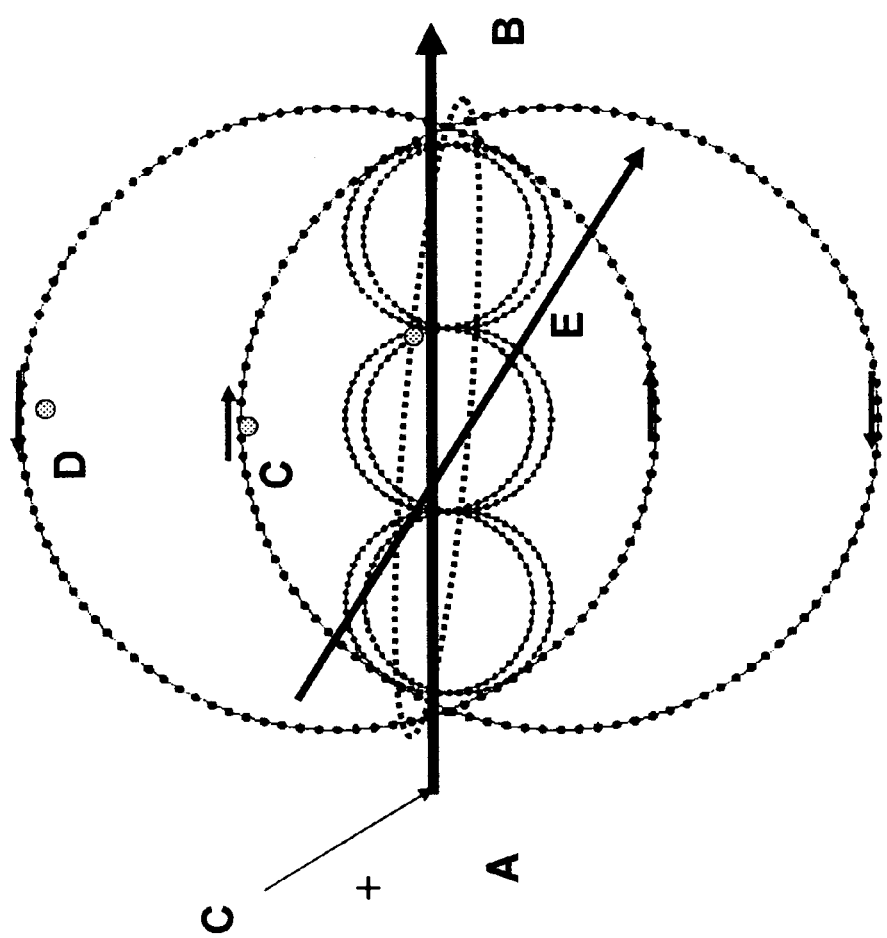
Figure 23:
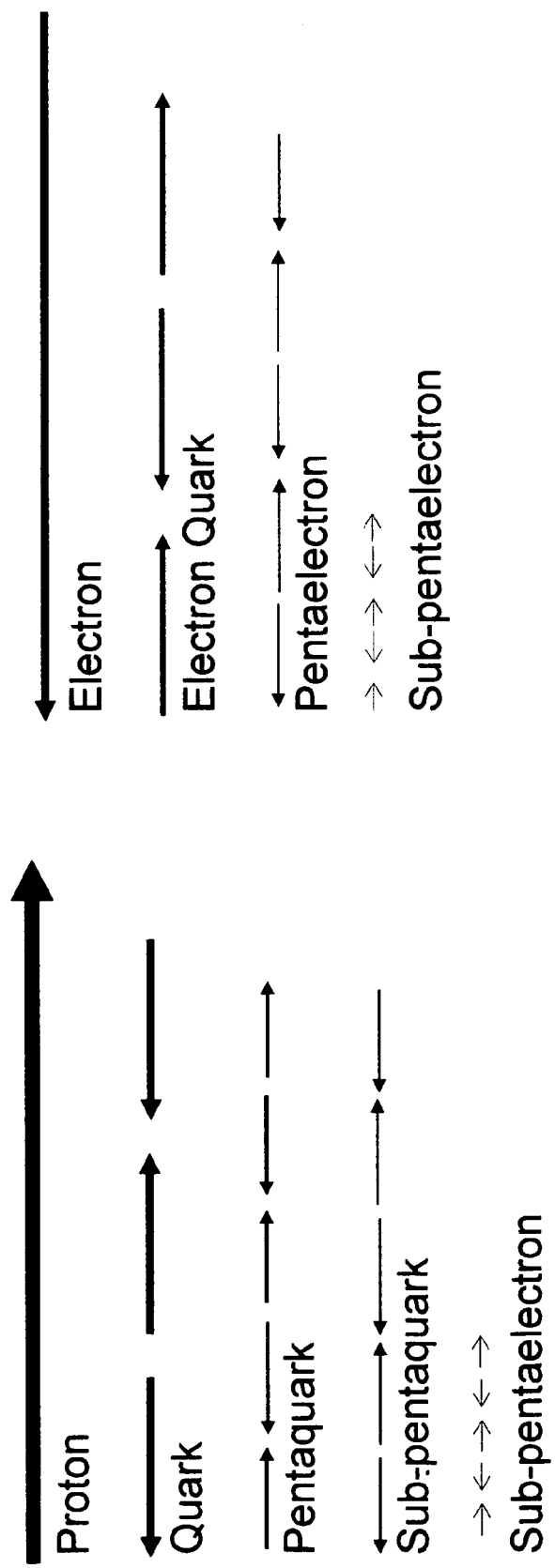
Figure 24:
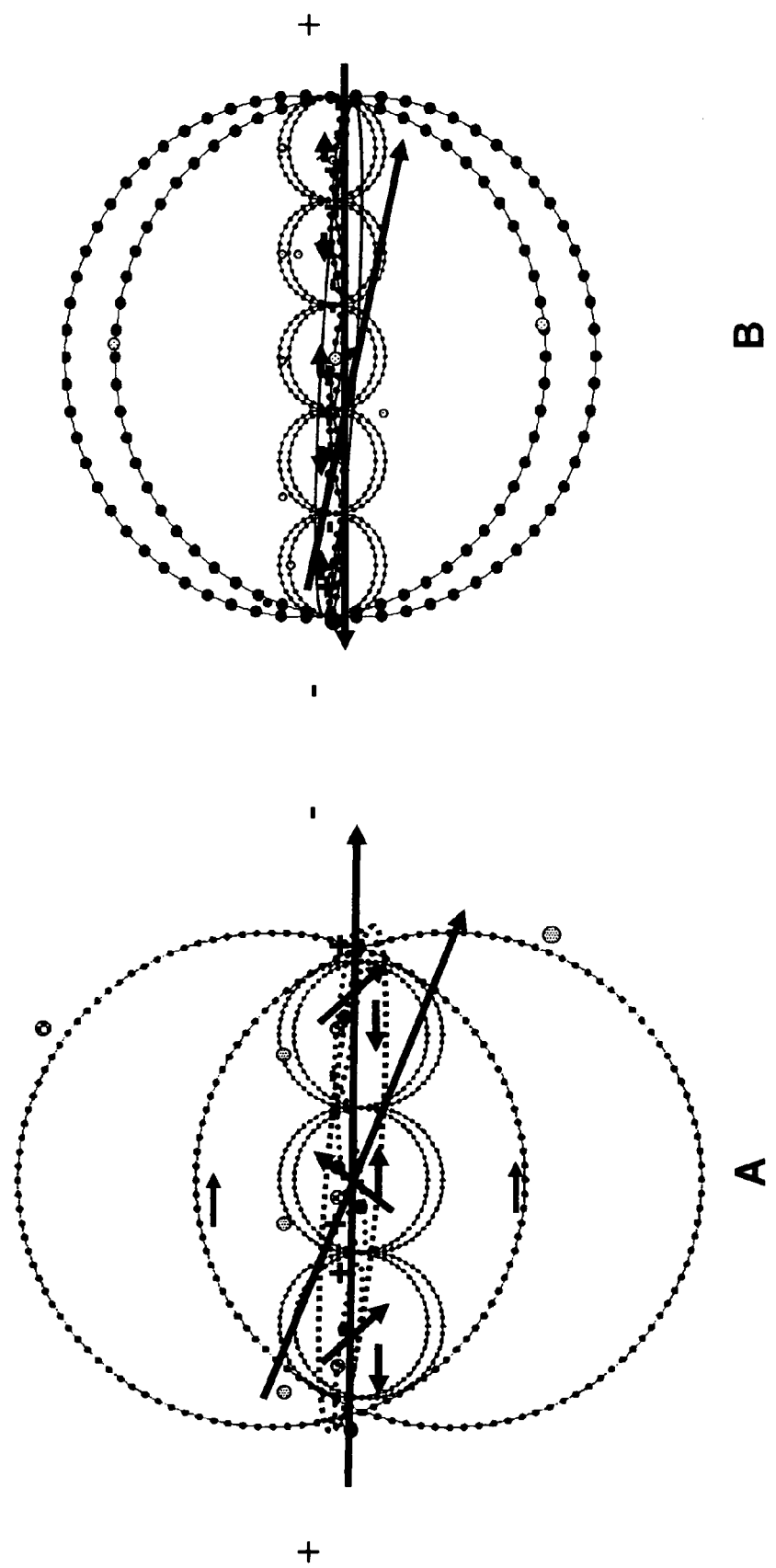
Figure 25:
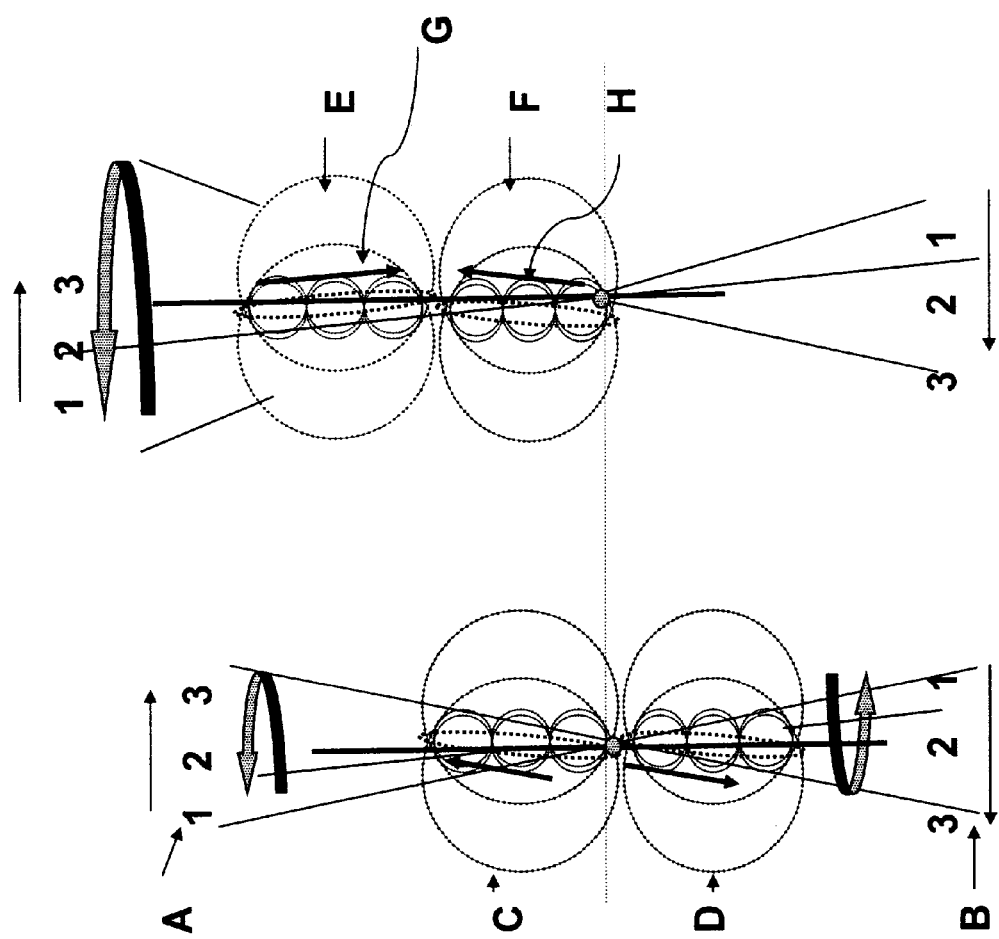
Figure 26:
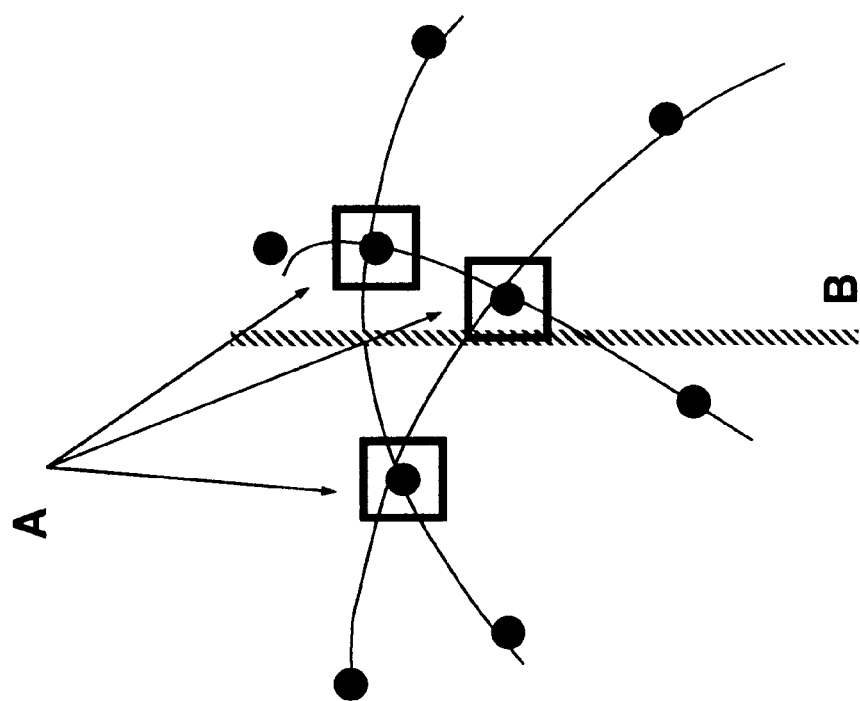
Figure 27:
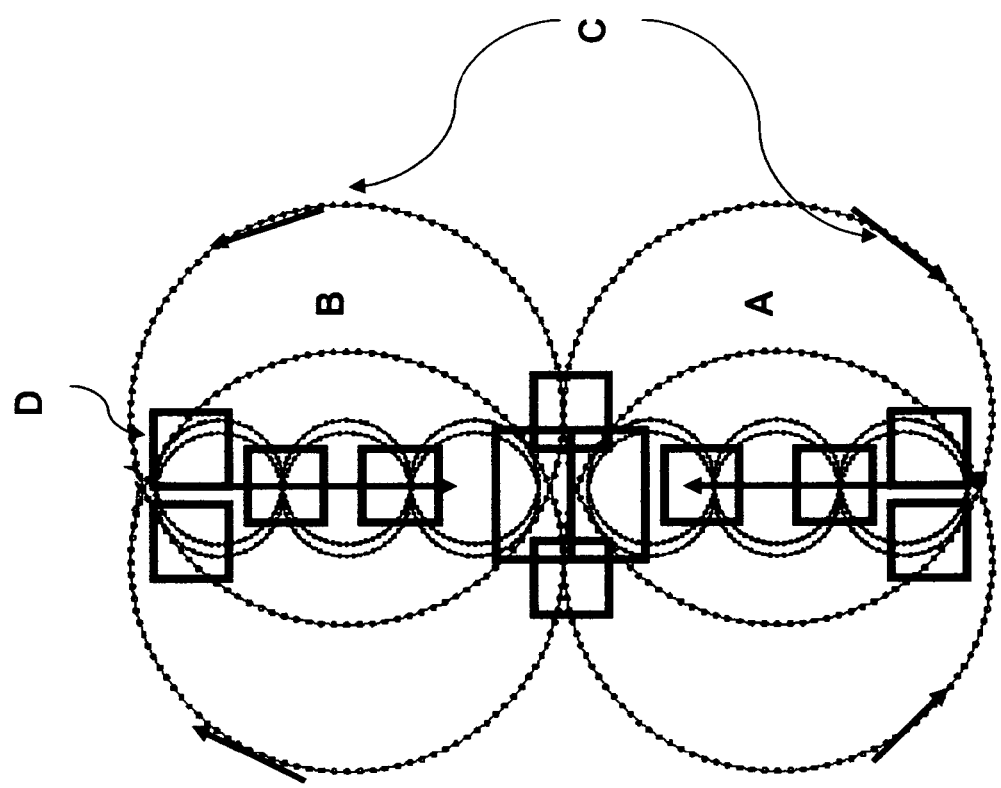
Figure 28:
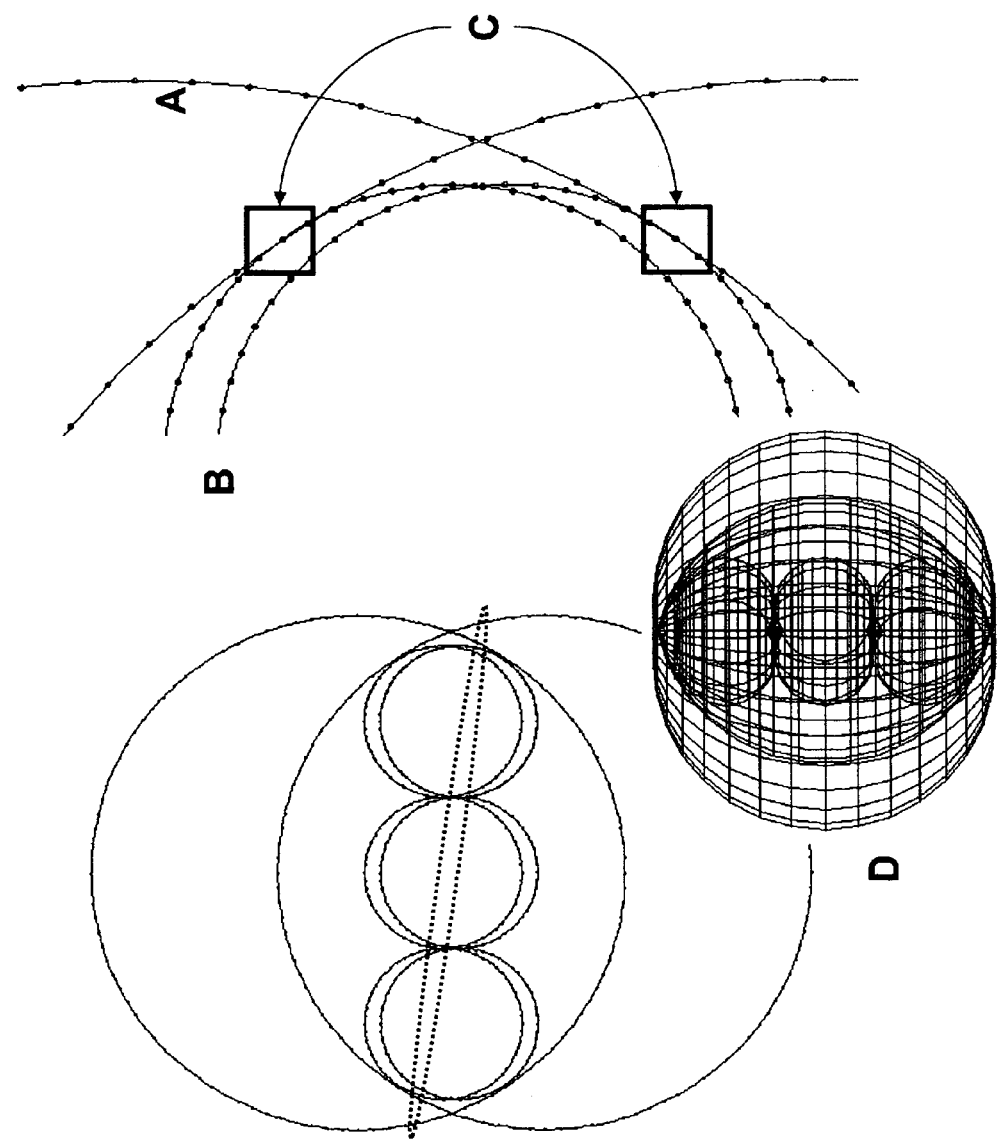
Figure 29:
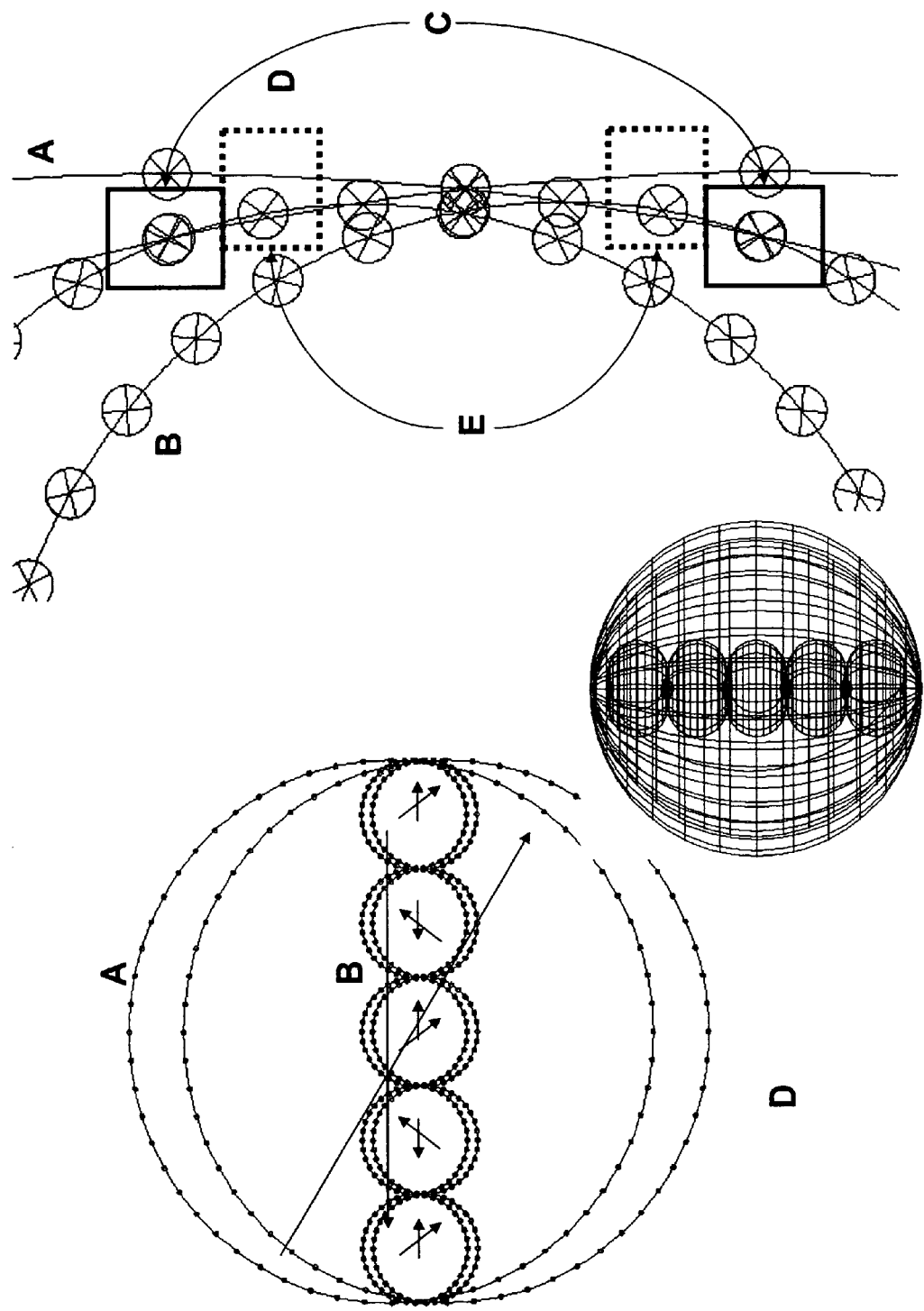
Figure 30:
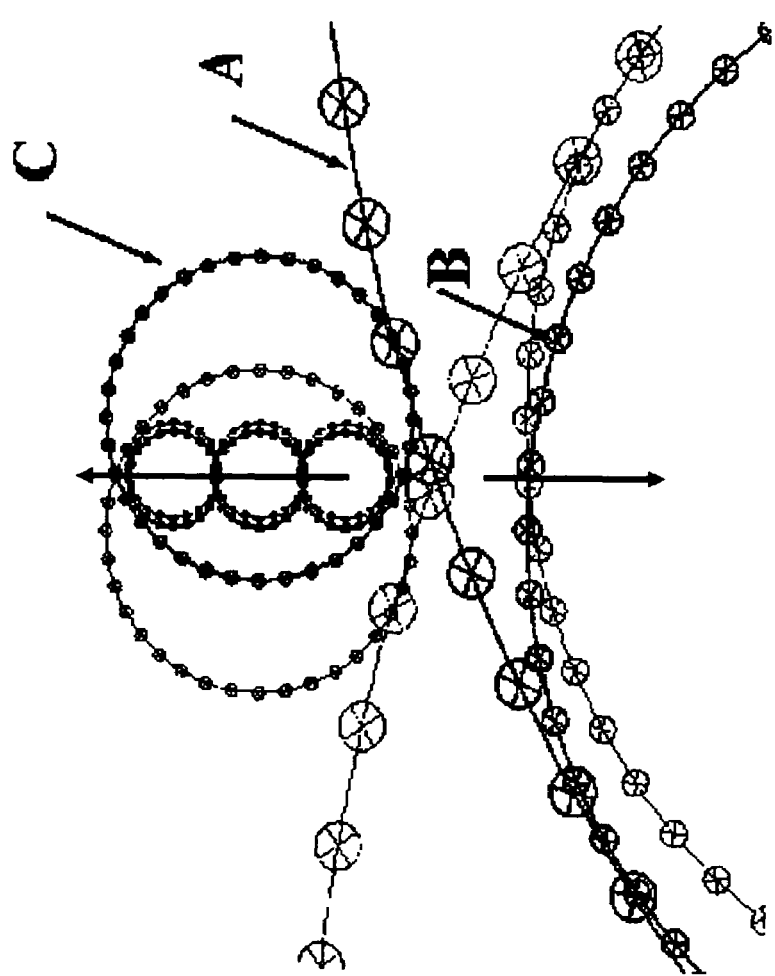
Figure 31:
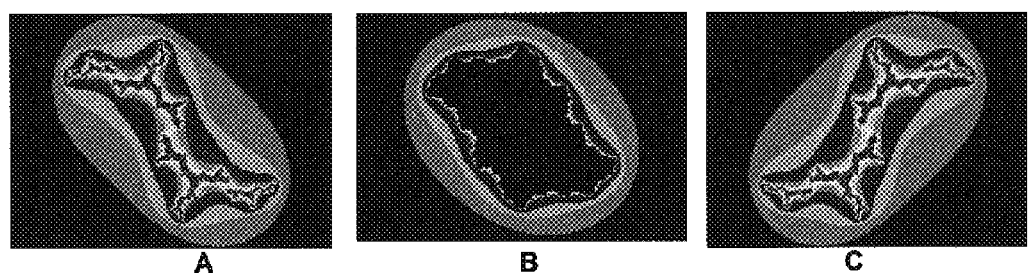
Figure 32:
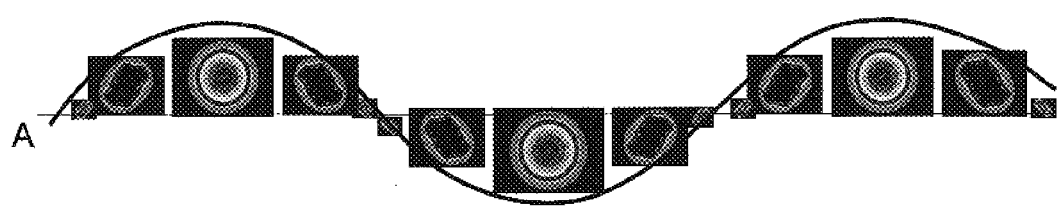
Figure 33:
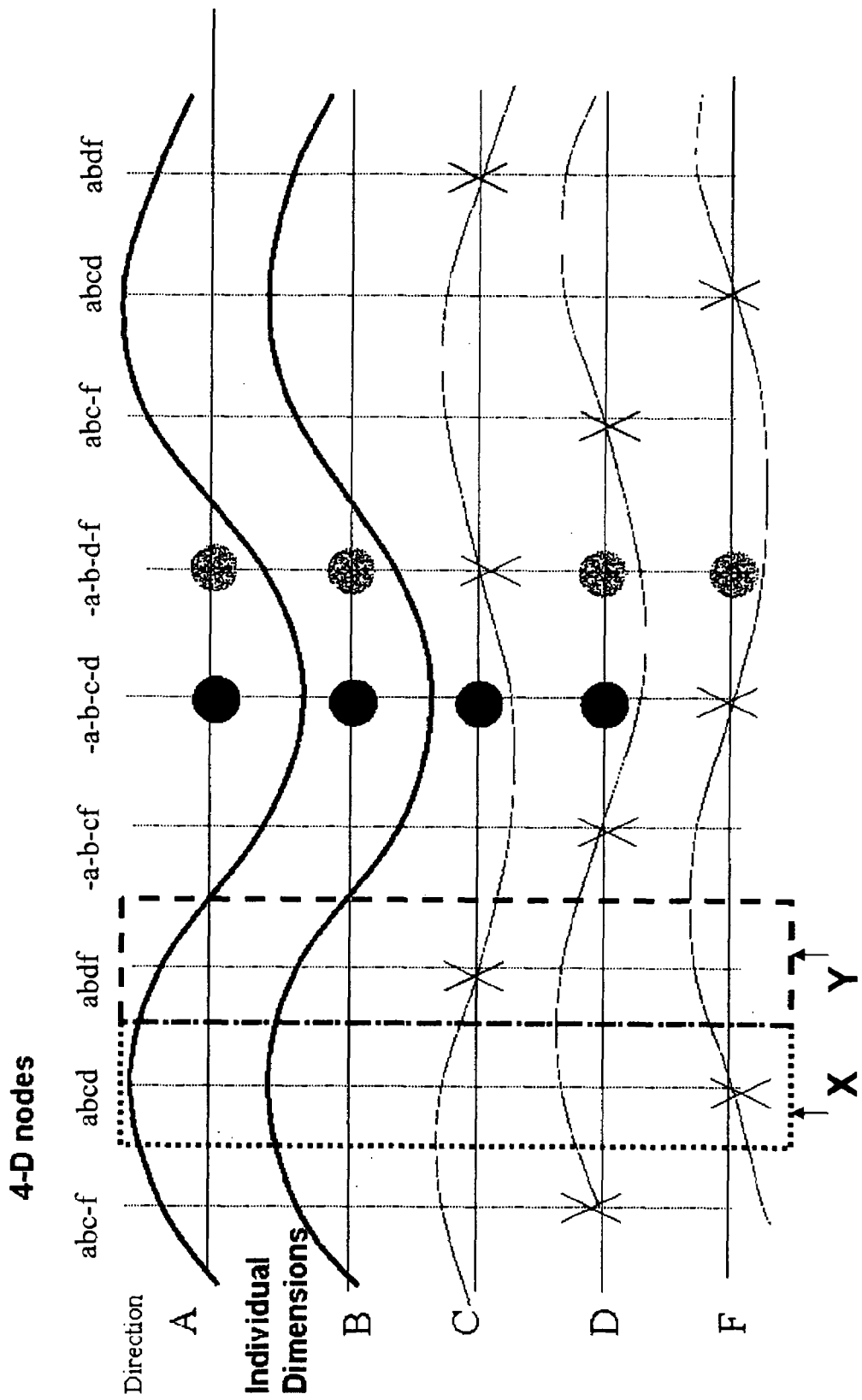
Figure 34:
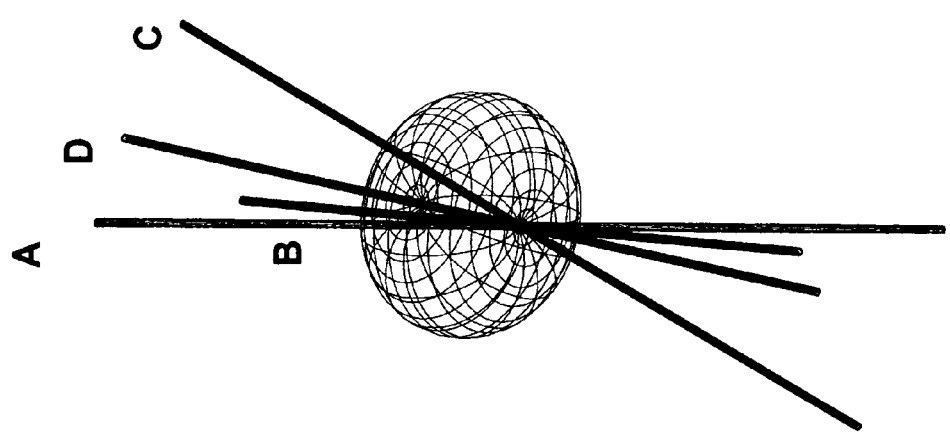
Figure 35:
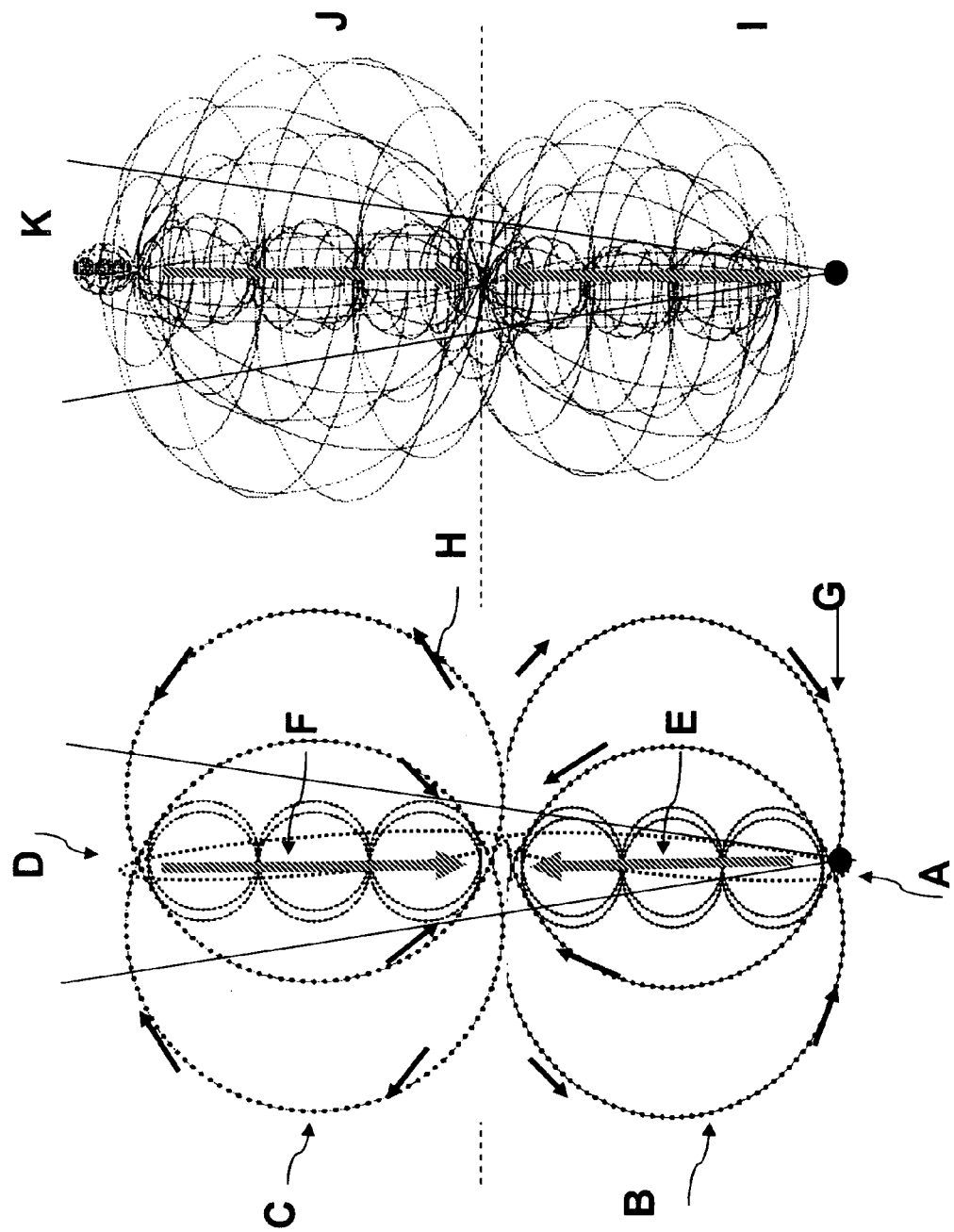
Figure 36:
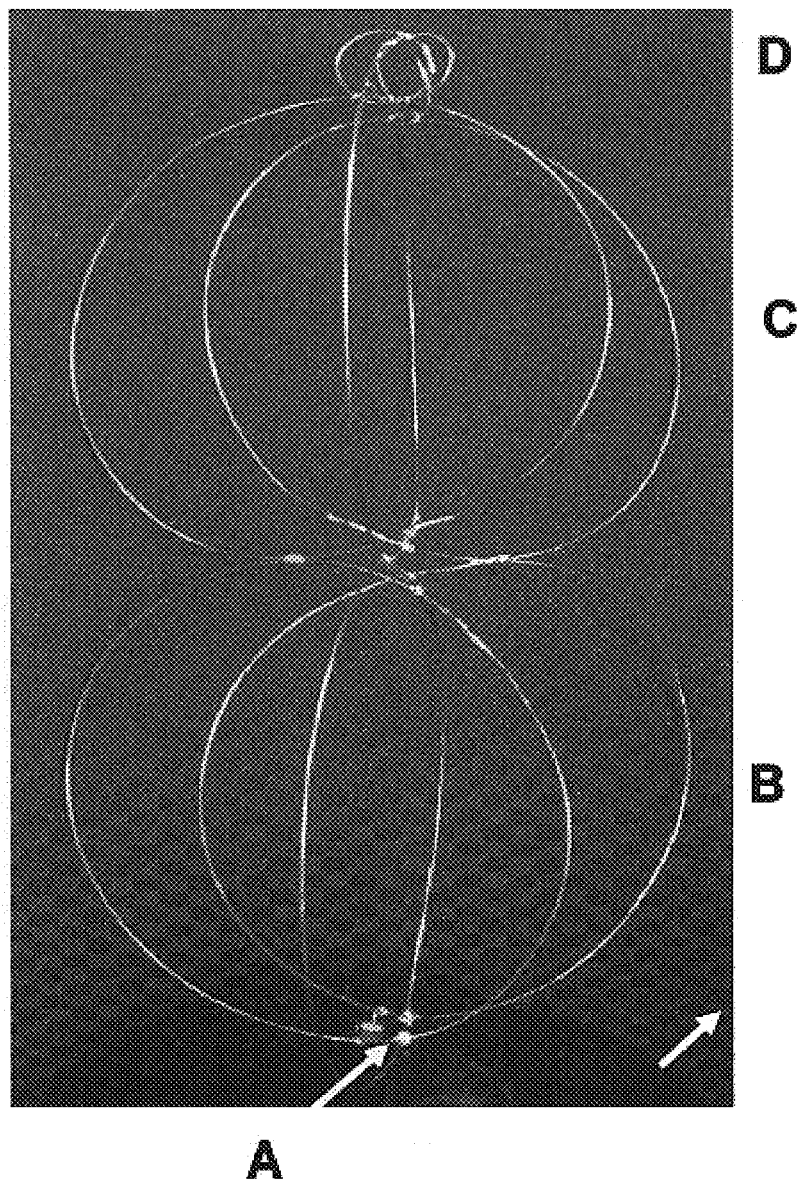
Figure 37:
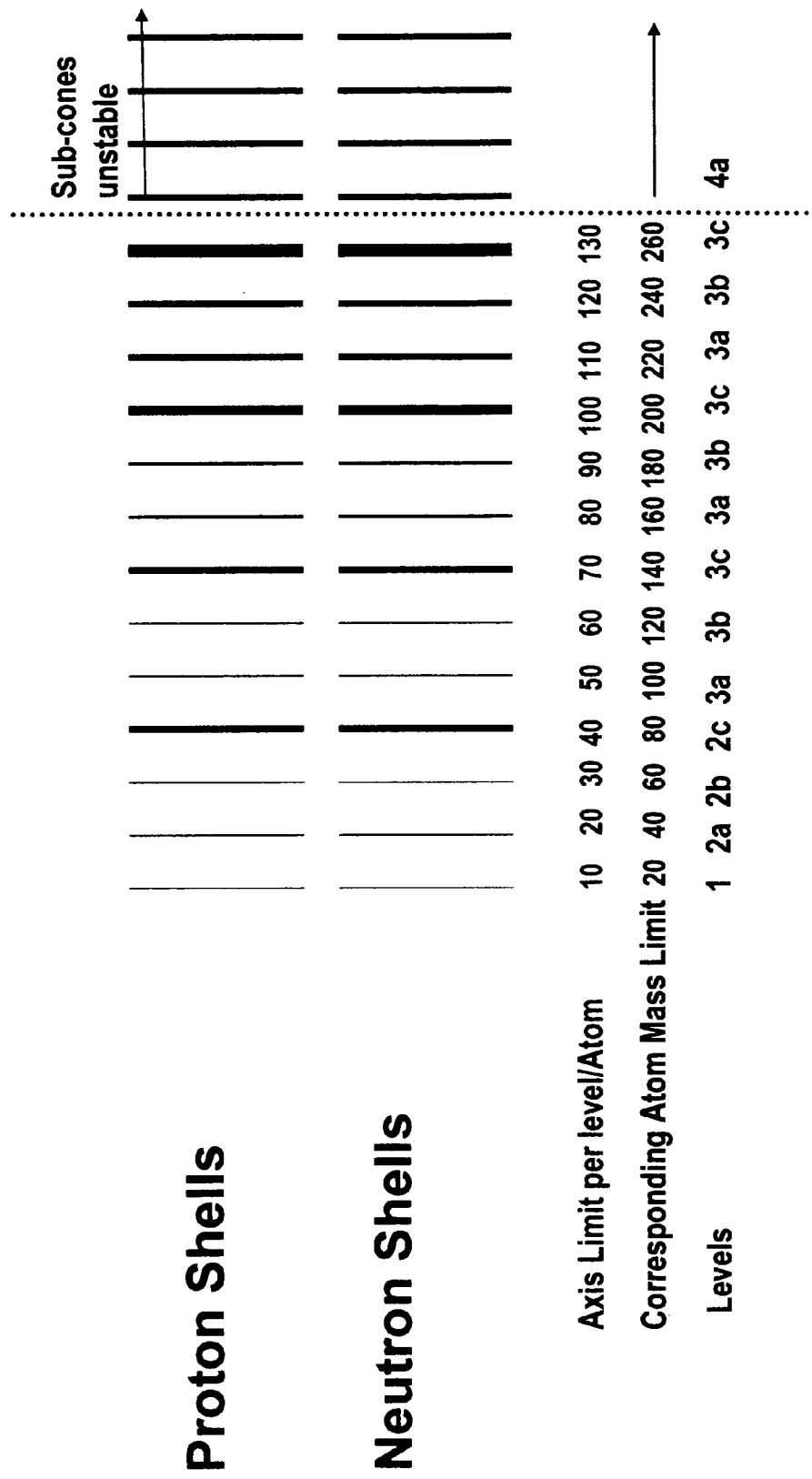
Figure 38:
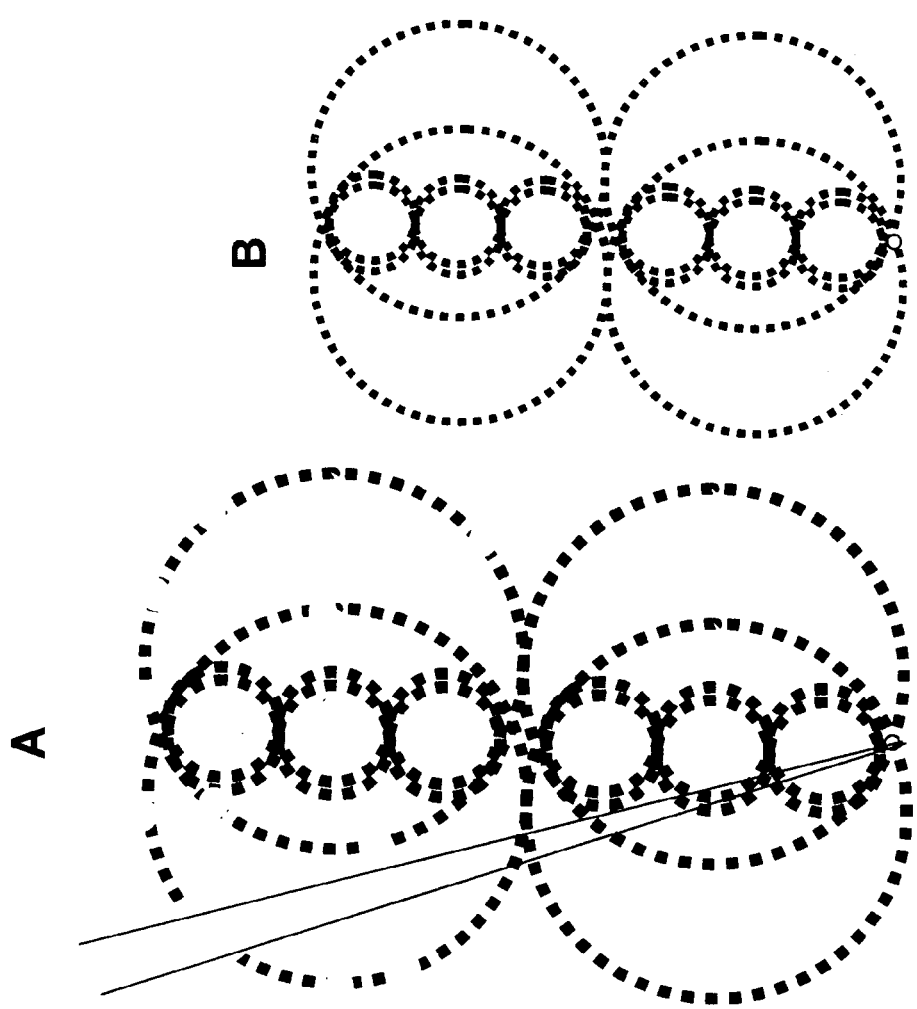
Figure 39:
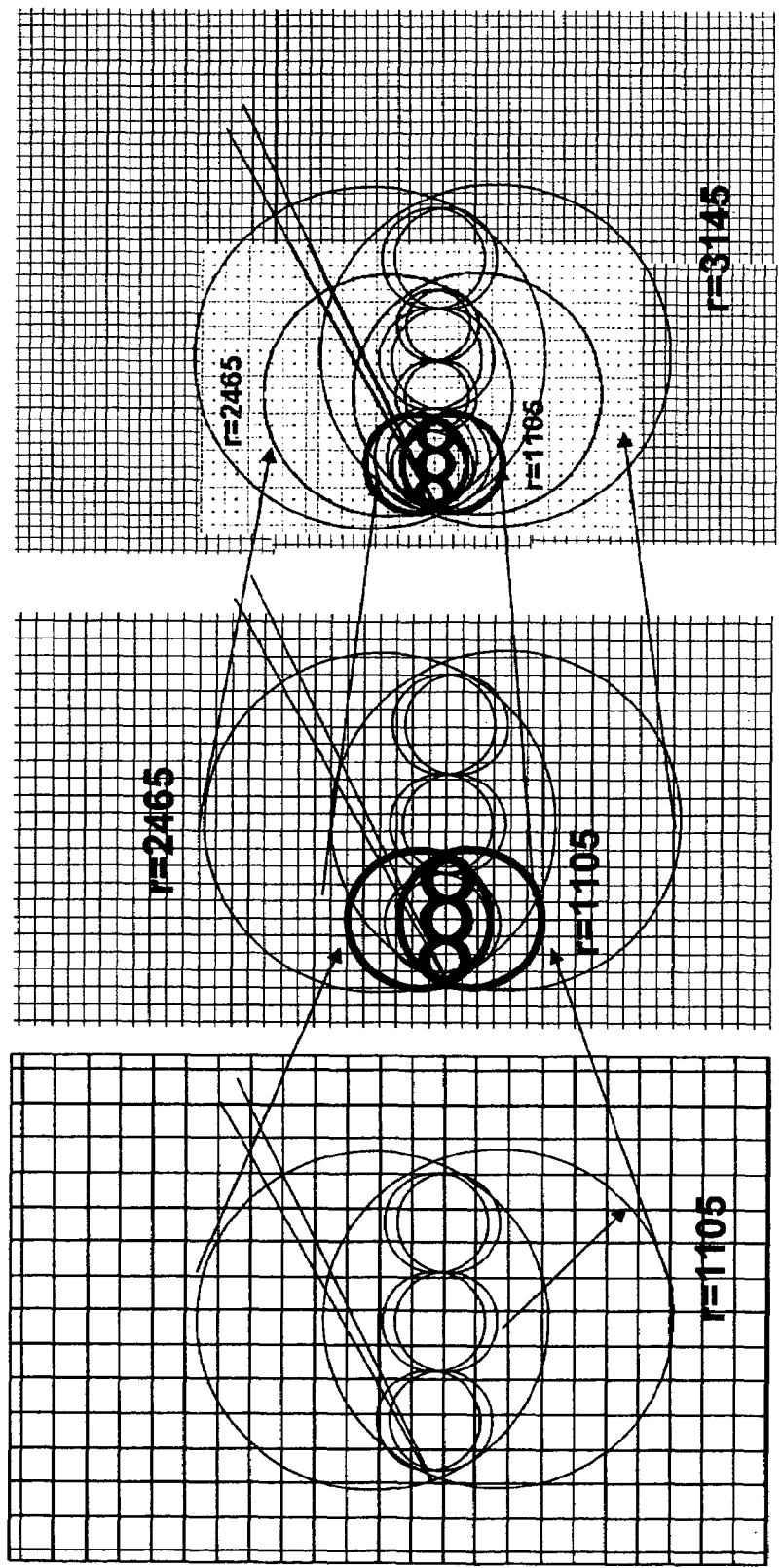
Figure 40:
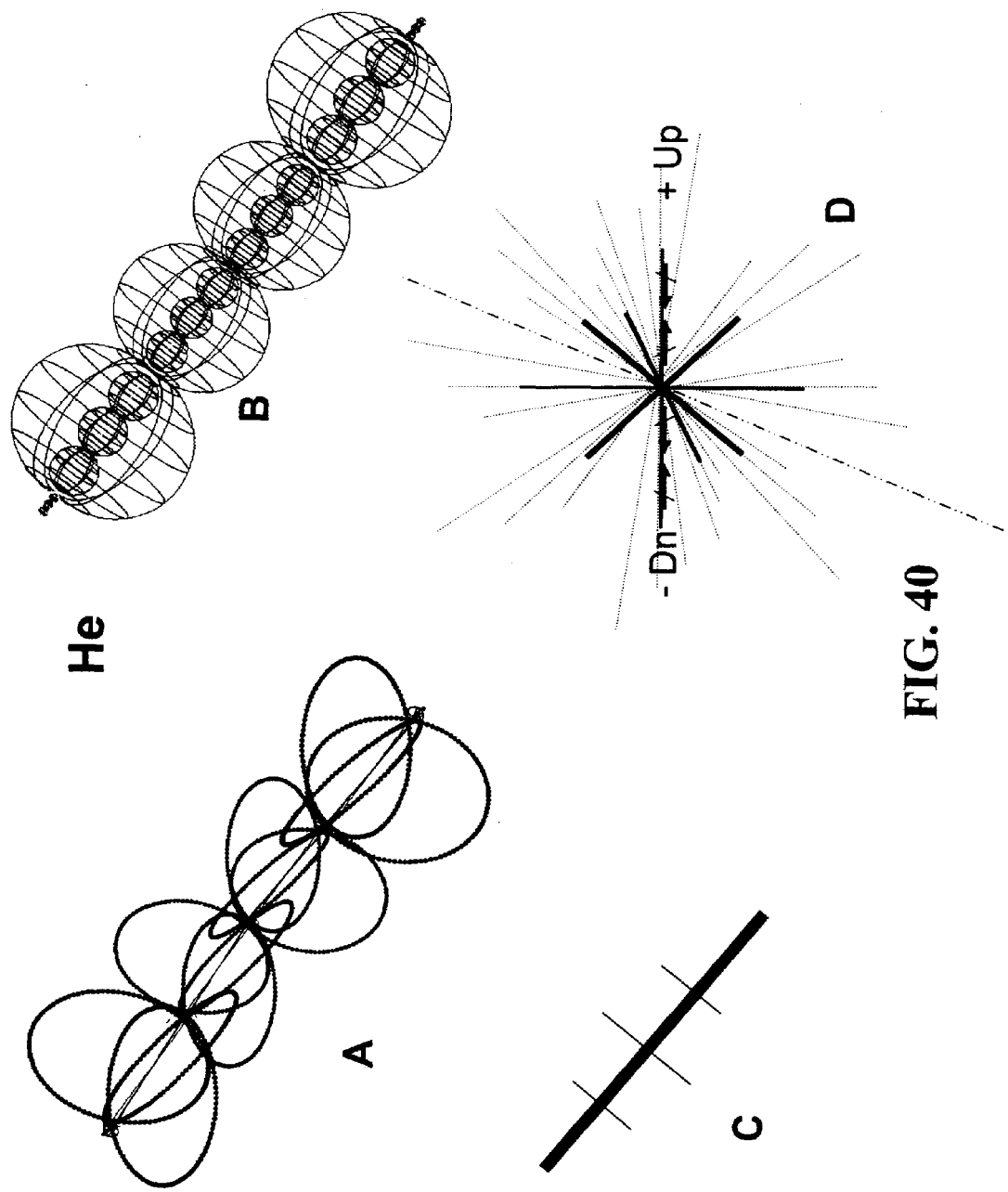
Figure 41:
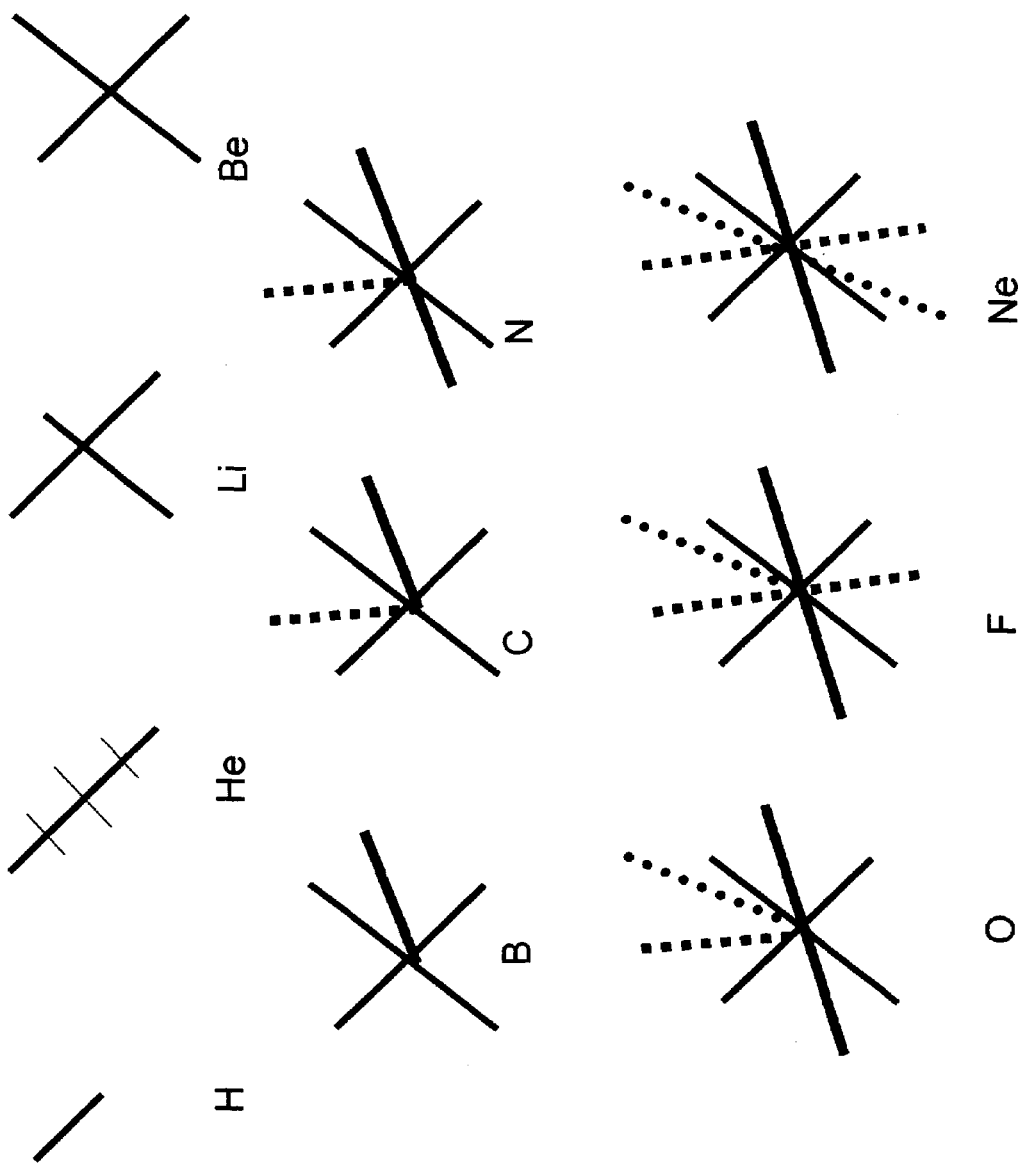
Figure 42:
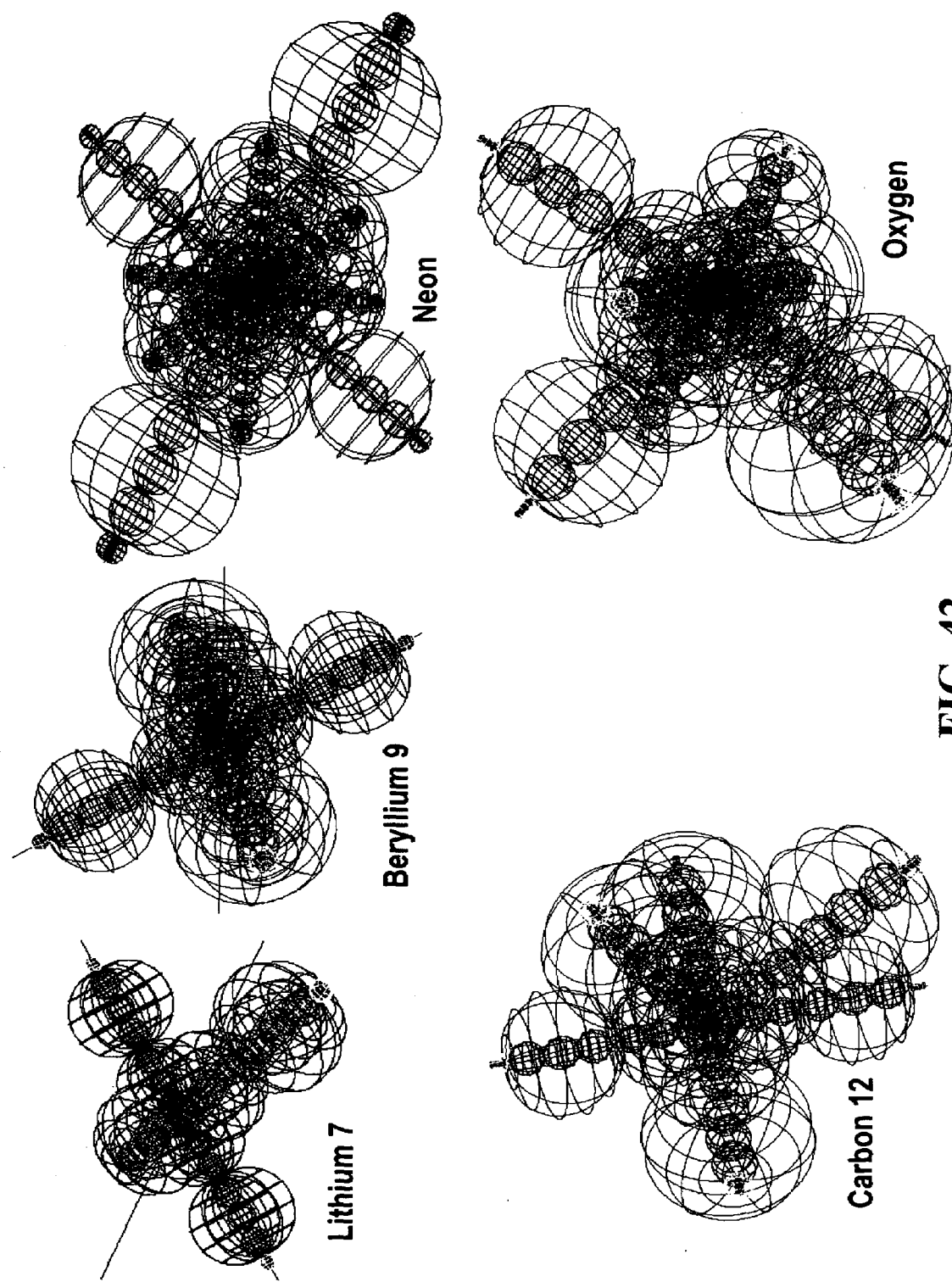
Figure 43:
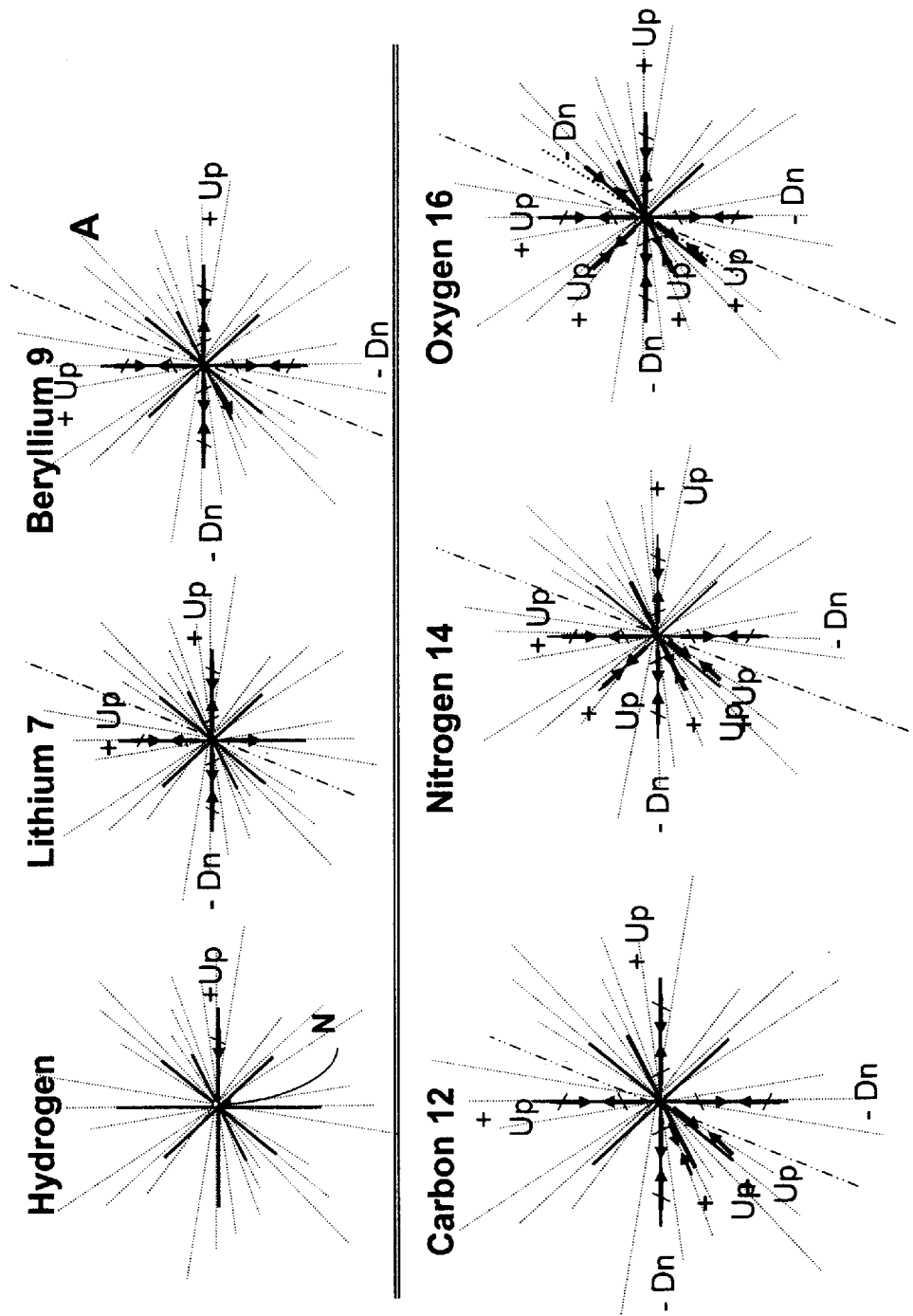
Figure 45:
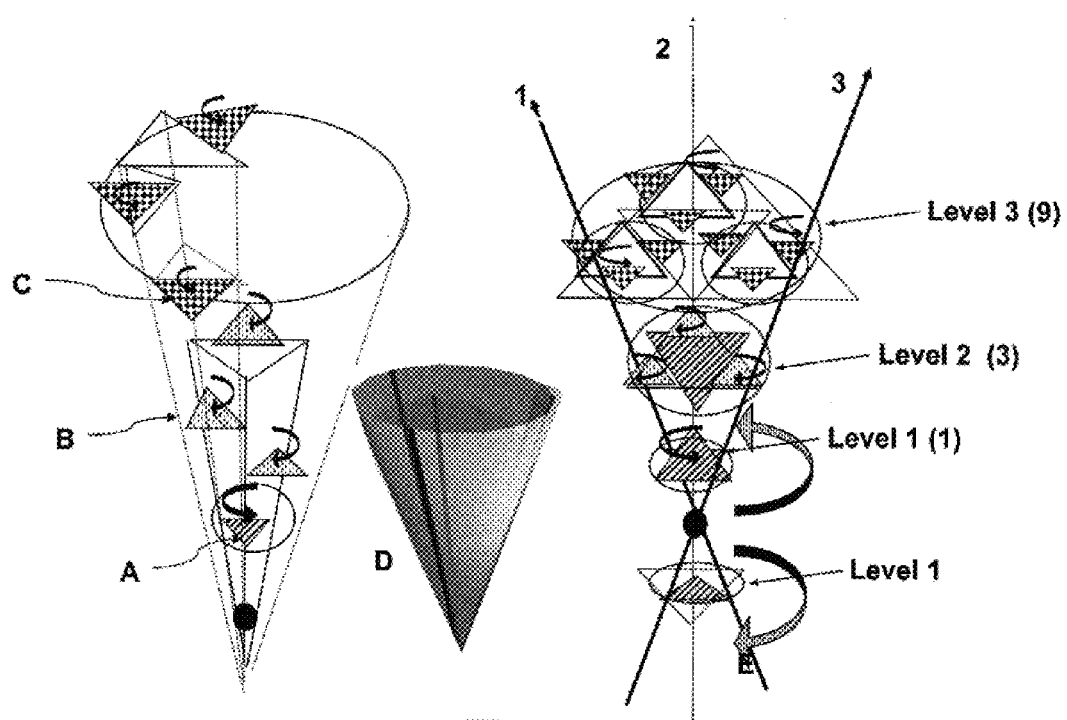
Figure 46:
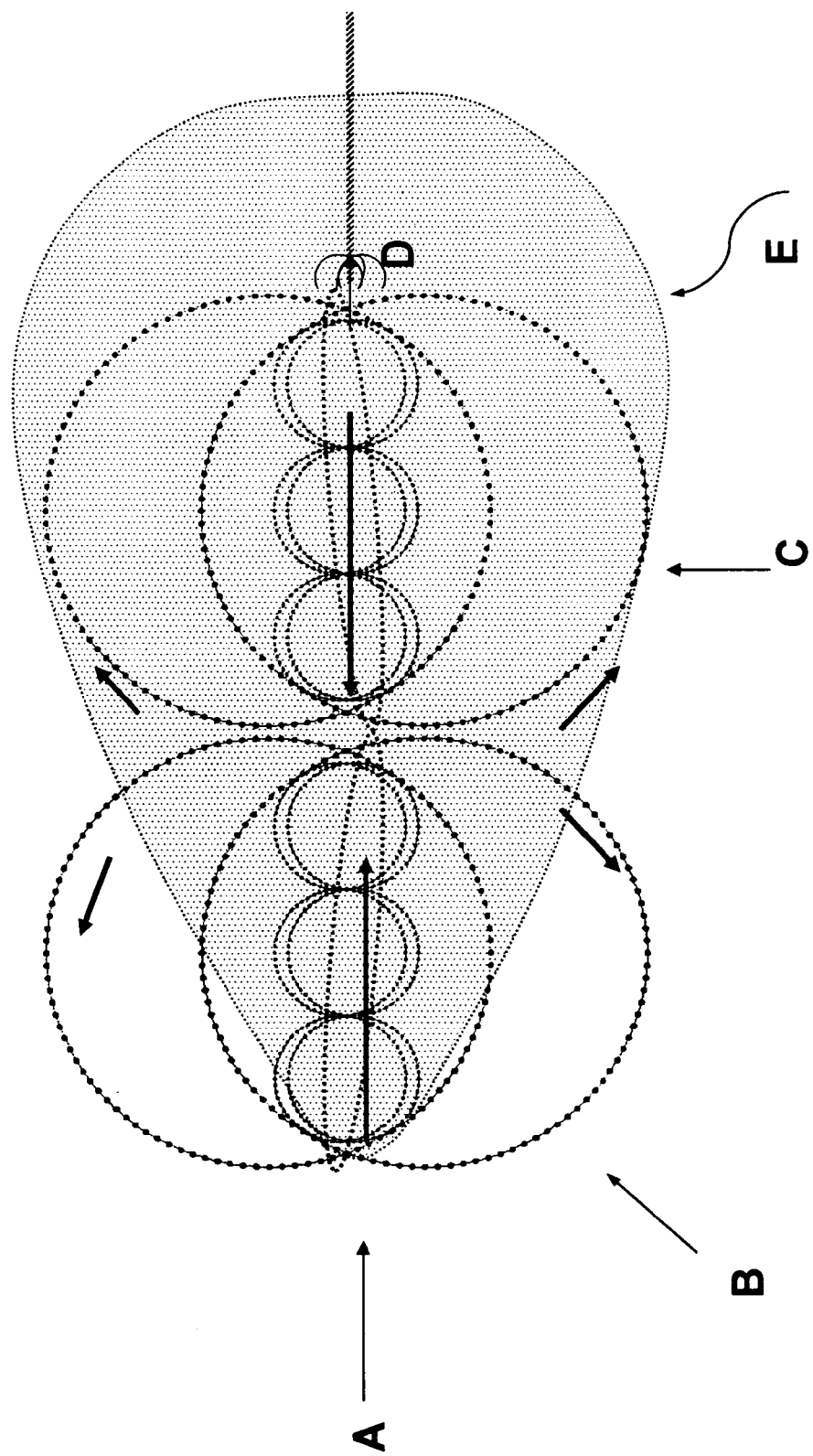
Figure 47:
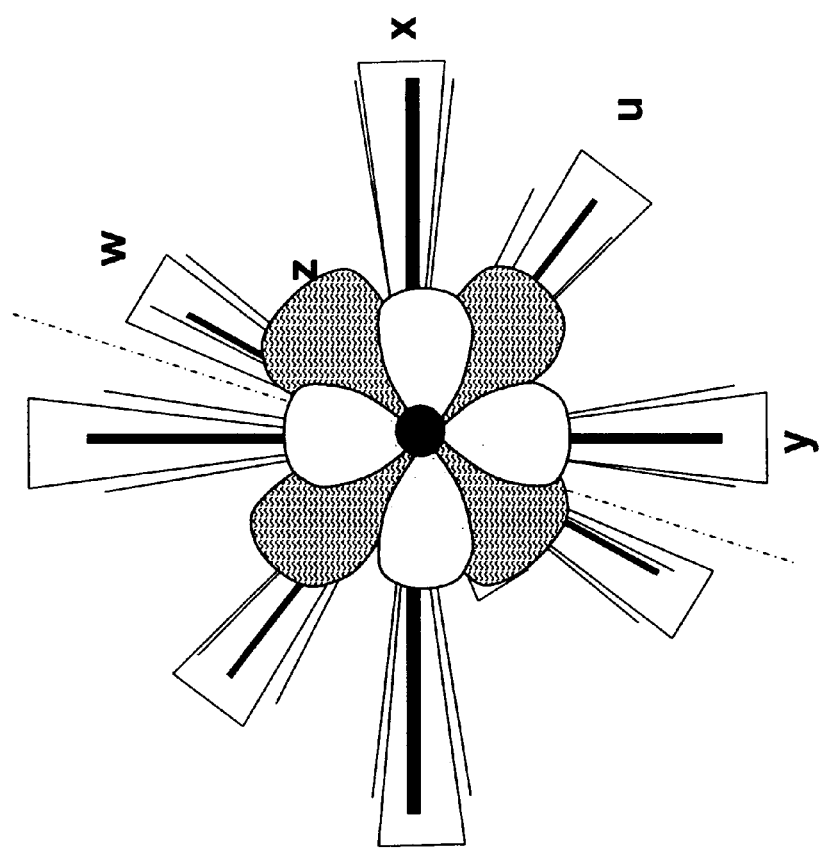
Figure 48:
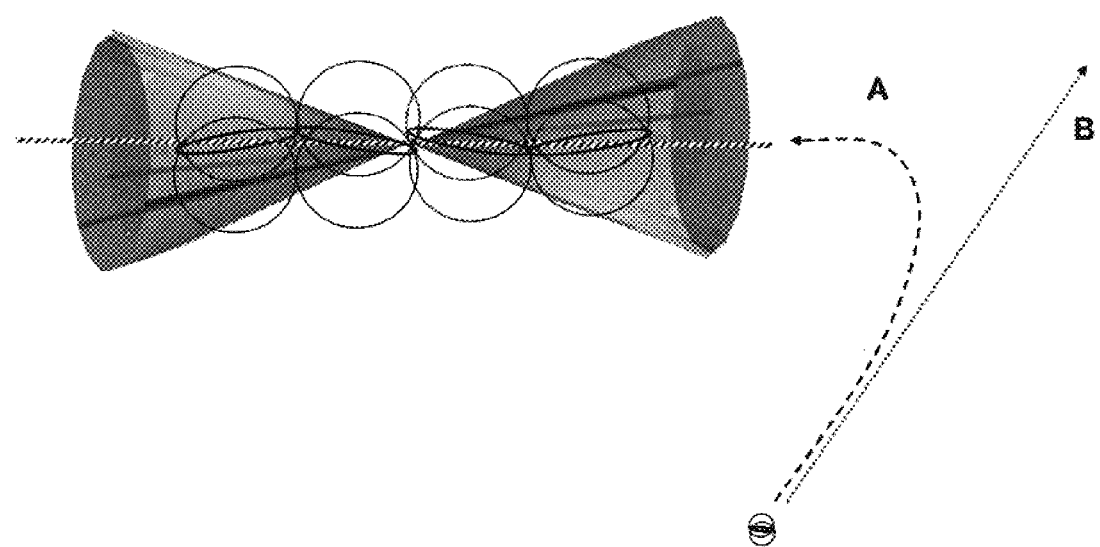
Figure 49:
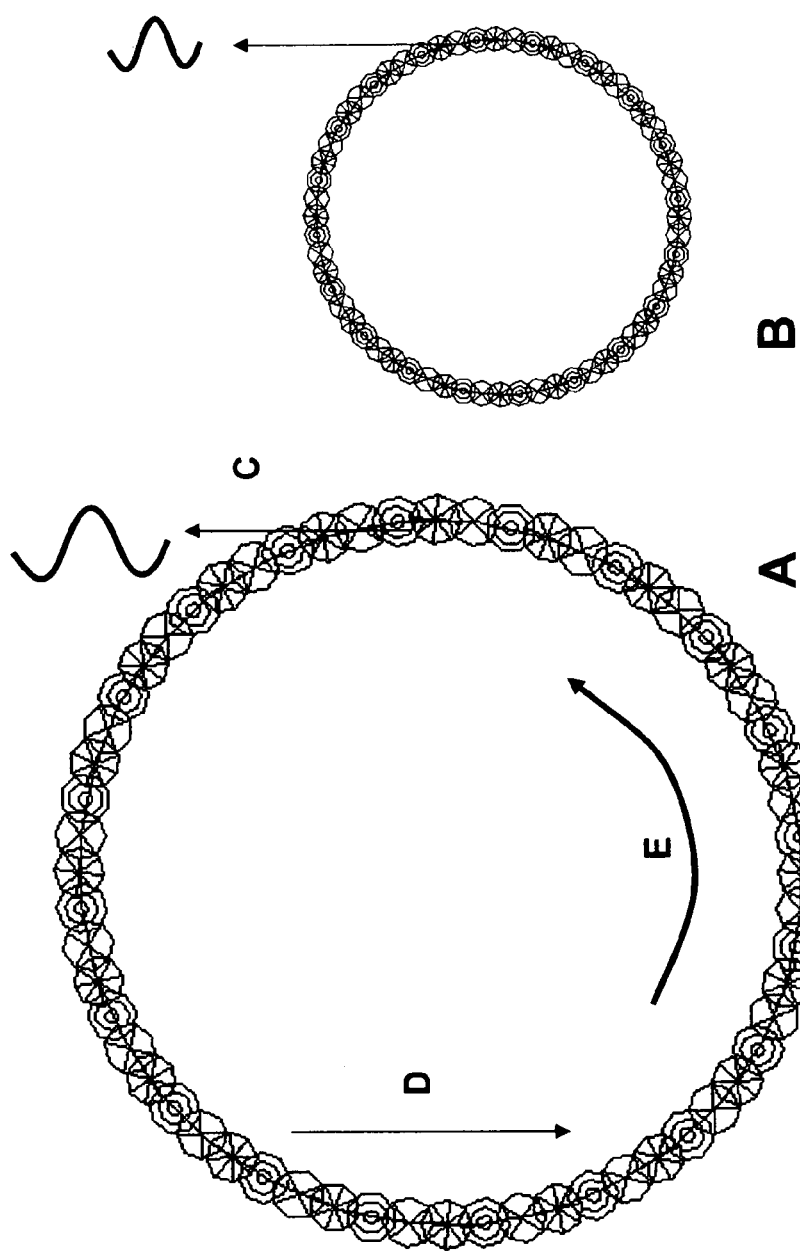
Figure 50:
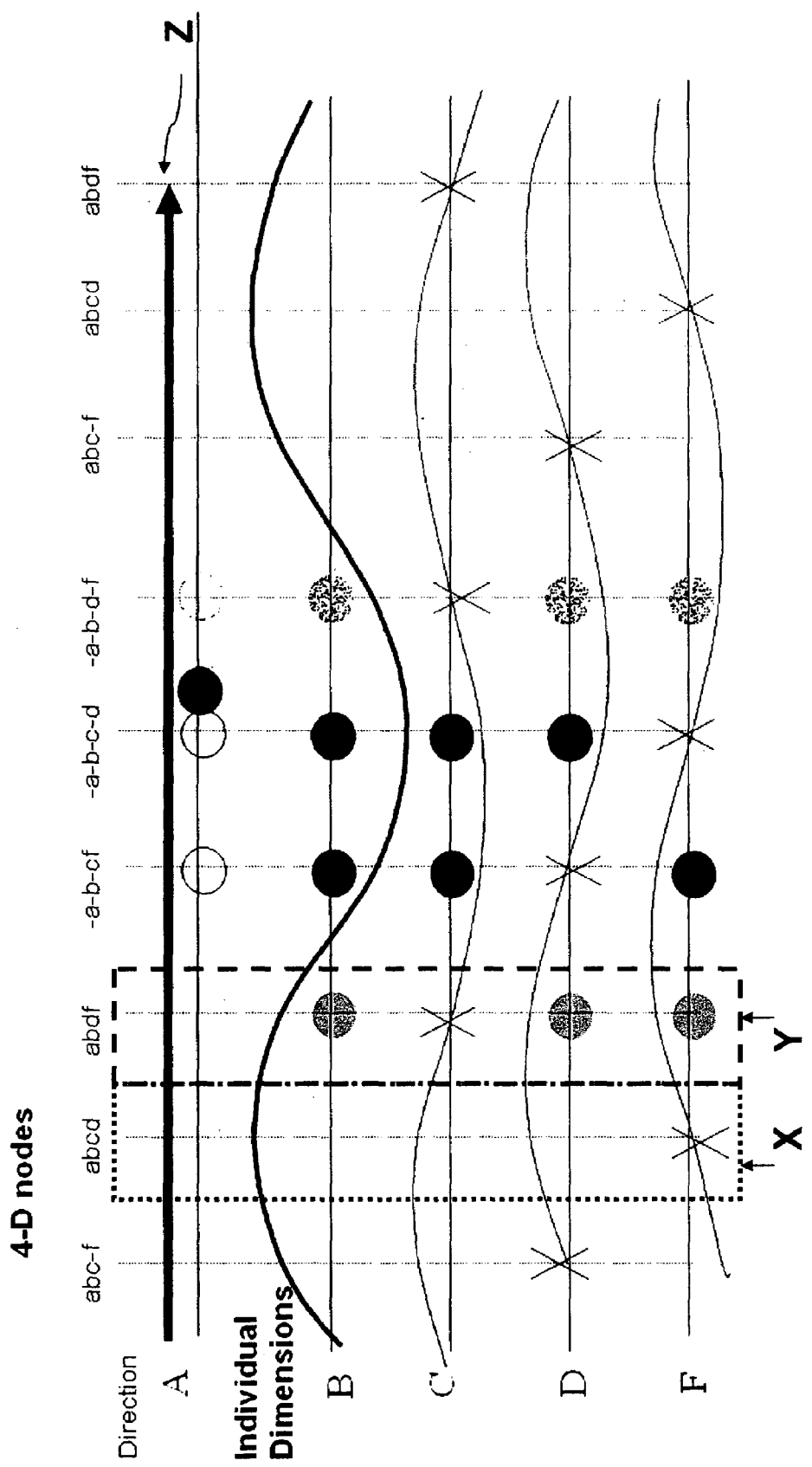
Figure 51:
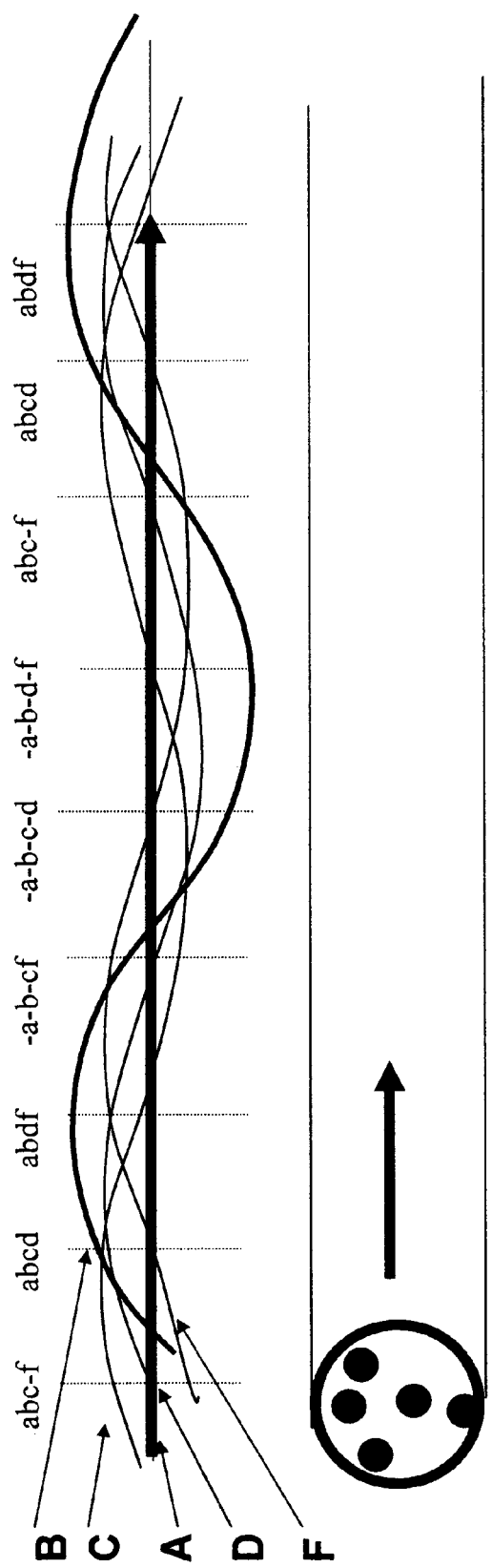
Figure 52:
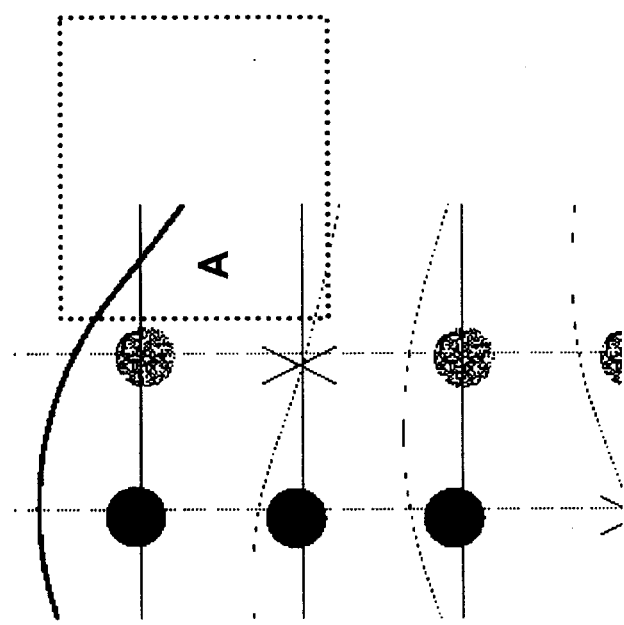
Figure 53:
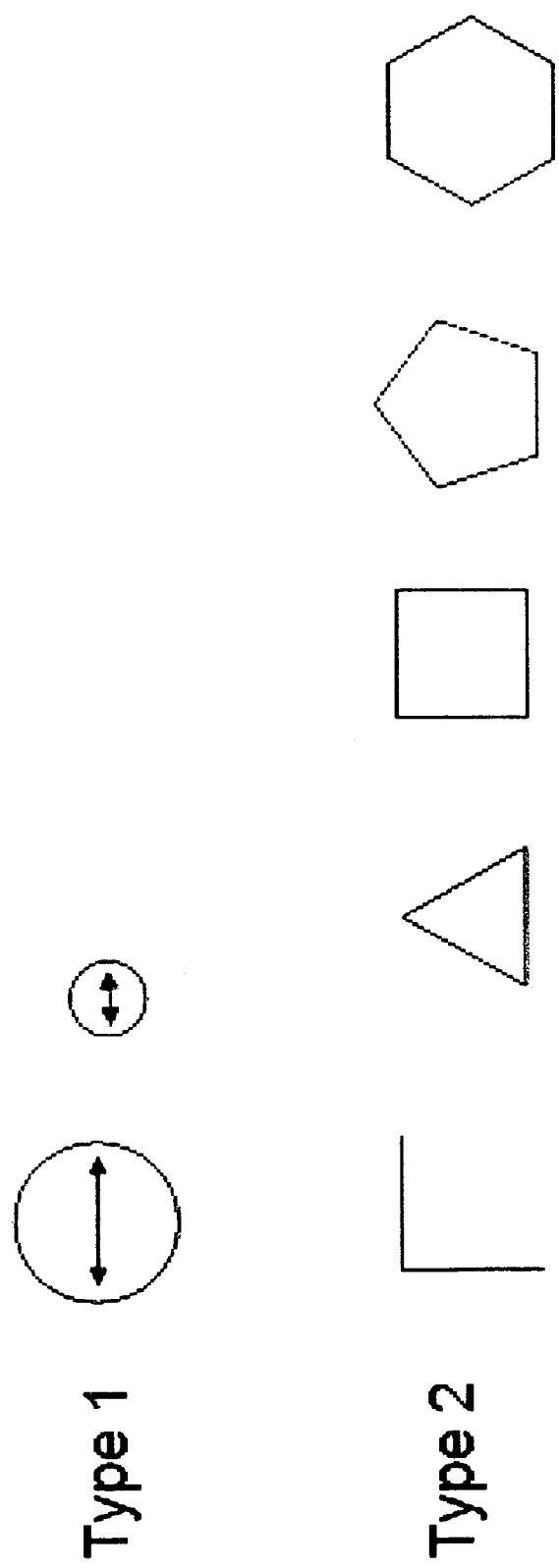
Figure 54:
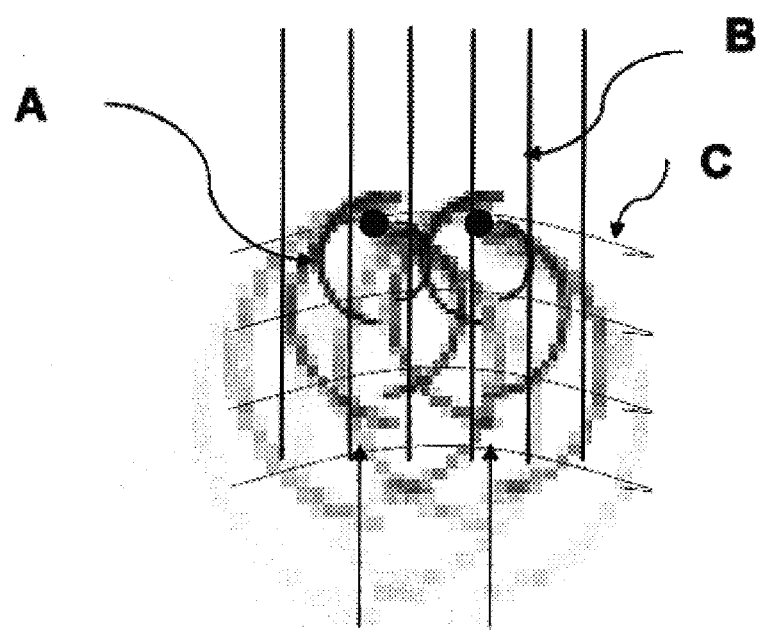
Figure 55:
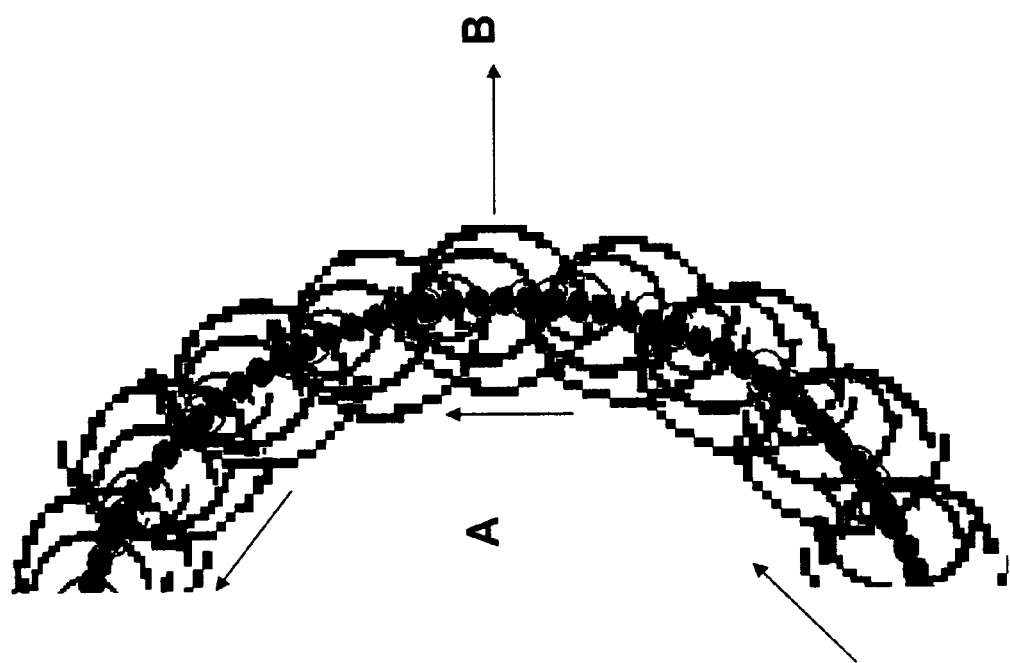
Figure 56:
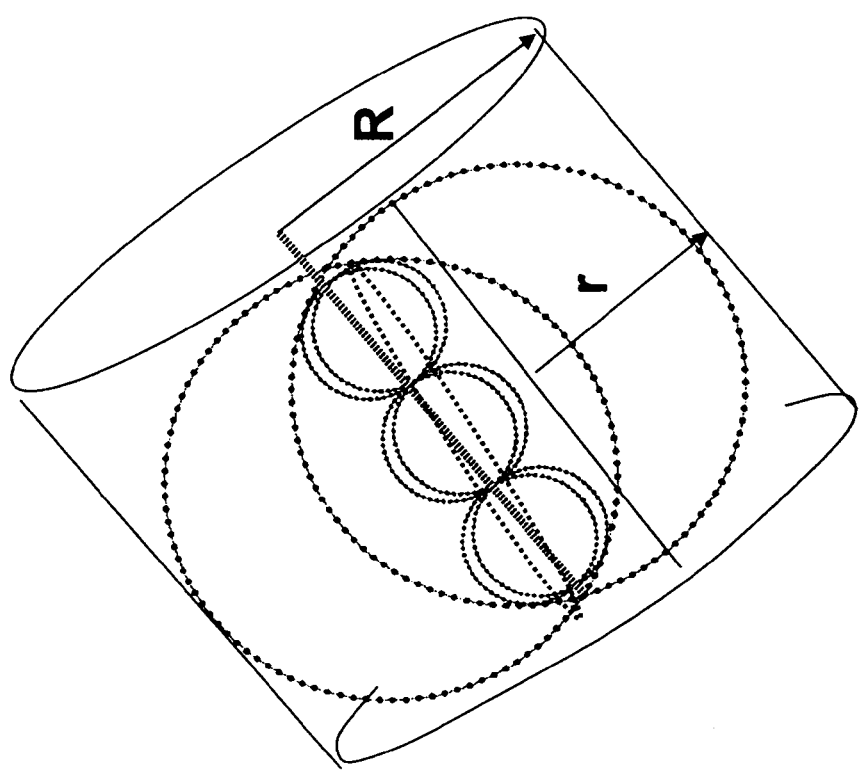
Figure 57:
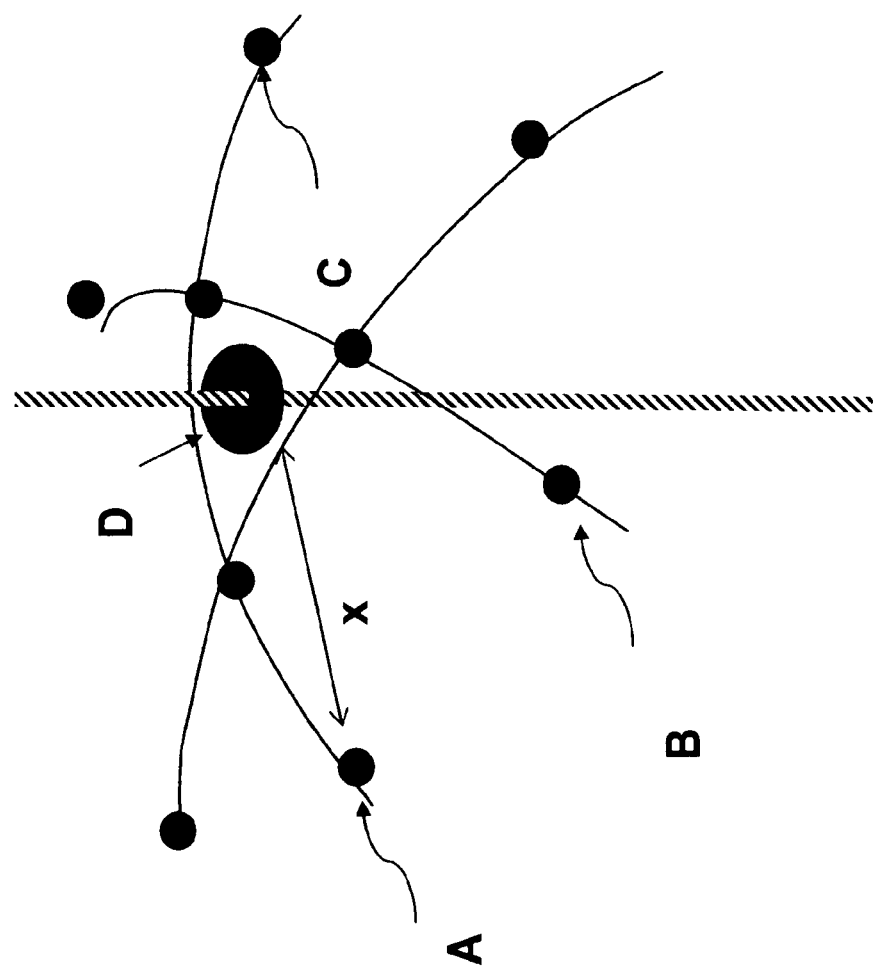
Figure 58:
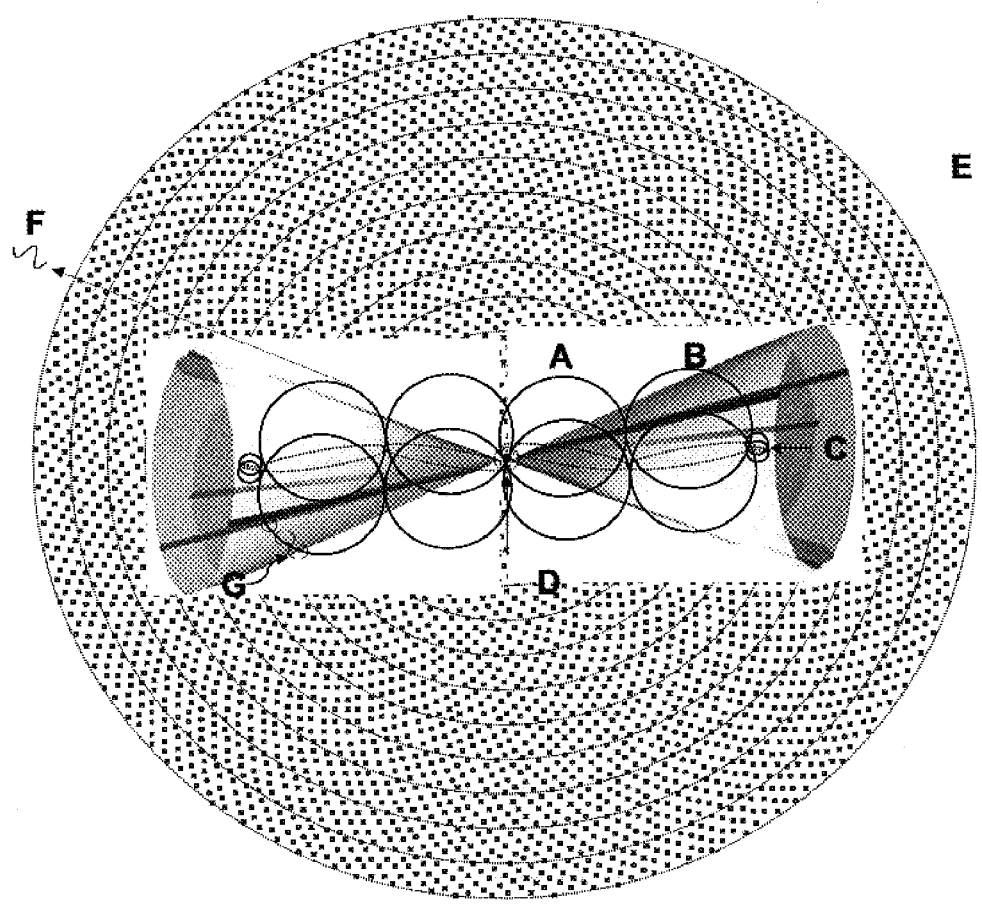
Figure 59:
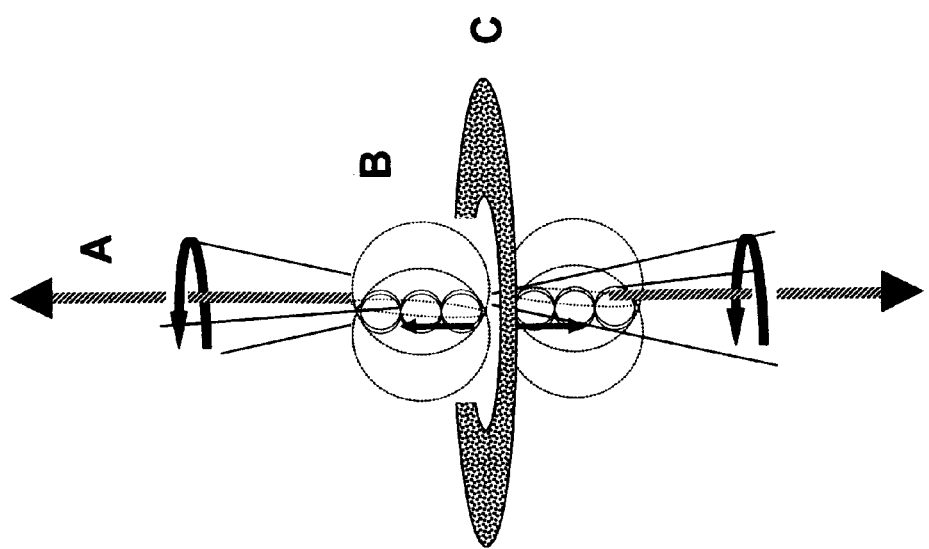

FIG. 21 is a view in perspective of the sequence and tilt of the rotating quantum loop path planes create the radical helicoids according to the present invention. Letters L and R represent the left-handed and right-handed tilt of the quantum loops, respectively. Letter A highlights the auger-shaped radical helicoid generated by the three quantum loops acting as rotating planes as a consequence of the tilt of the quantum loops and quantum loop intersections straddling the radical axis;

FIG. 22 is a schematic view, showing the structure of charge for a neutron or proton. Letter C represents the direction of flow along the radical helicoid. Letters A and B represent the attractive (positive) and repulsive (negative) charges located at the endpoints of the lemon. Attractive and repulsive fields associated with a particle are generated by the direction of energy flow in the particle's quantum loops;

FIG. 23 is a graphical representation of the alternating quantum loop flow direction of the mass-particle lemon alternates between confinement levels. Quarks have significantly lower attractive and repulsive force as the result of the high level of loop overlap relative to the proton;

FIG. 24 is a schematic view, showing the charge, tilt, and flow direction for the proton A and the quark B;

FIG. 25 is a view in perspective showing axial and mirror symmetry. Letters A and B represent the opposite spin of the triplet on either side of the centerpoint. Letters C and D highlight two neutrons exhibiting axial symmetry, sharing the centerpoint and having opposite spin while maintaining 1, 2, 3 sequence. Letters E and F represent the neutron and proton, respectively, exhibiting mirror symmetry on the same side of the centerpoint. Letters G and H highlight the opposite tilt of the quantum loops between contiguous mirror symmetric particles;

FIG. 26 shows schematic representations Intra-mass gap and shared nodes A represent tilted quantum loops intersecting at the end of the spindle torus lemon, straddling the radical helicoid B within a single particle. These quantum loops share discrete four-wave intersections with each of the other two quantum loops;

FIG. 27 shows schematic representations of inter-mass gap and shared nodes. Letters A and B represent the neutron and proton. Letter C represents the direction of energy transfer within the quantum loops for each particle. Letter D represents shared nodes between contiguous mass particles within a triplet;

FIG. 28 is a view in perspective using two of the three quantum loops and corresponding schematic sectional views illustrating complementary spin and confinement for a proton, otherwise defined as major confinement. In the case of major confinement, Letter D shows the structure of a proton with radius of 1105 and 108 lattice points, confining three quarks. Letter D also highlights that the tilt of the outermost sub-particles must agree with the tilt of the confining particle. The overlap of major confinement structures is about 65%. Letter A represents two of the three quantum loops of a proton, Letter B represents two of the three quantum loops of a quark, Letter C shows the point at which the particles share a four-wave nodes;

FIG. 29 is a view in perspective using two of the three quantum loops and corresponding schematic sectional views illustrating complementary spin and confinement for a quark, otherwise defined as minor confinement. In the case of minor confinement, Letter D shows the structure of a quark with radius of 325 and 60 lattice points with five pentaquarks with radius 65 and 36 lattice points. Letters D also represents the opposite tilts of quantum loops within contiguous particles with Letter I representing the tilt of the quantum loop for the quark matches the tilt of the outermost pentaquarks. The overlap of the circles of the minor confinement torus structure is about 90%. Letter A refers to two of the three quantum loops of the quark, Letter B refers to two of the three quantum loops of the pentaquark and Letter C represents the shared nodes between the particles. Letter E shows the position of the pentaquark node that is not confined by the quark structure, facilitating the rapid deterioration of an unconfined quark;

FIG. 30 is a schematic representation of the shared node position of the electron relative to a proton. Letter A represents two of the three quantum loops of the proton, Letter B represents two of the three quantum loops of the quark, and Letter C represents the position of the electron. The negative pole of the electron aligns with the positive pole of the proton;

FIG. 31 is a schematic representation of the Julia fractal representation of the four-wave intersection creating a confined space B as four dimension waves intersect to create a quantum point. The formation of the space and energy transferring in and out of the node can be described with the Julia fractal as the fourth wave enters the space and the fractal moves from being disconnected A to connected B. As the resonant energy leaves the fractal disconnects again C. Connections and disconnections are analogous features of string theory "pants" to describe energy transfer between single dimensions;

FIG. 32 is a view in perspective using a Julia fractal to represent a single dimension wave. Each dimension and its contribution to a series of four-wave intersections is modeled with a single wave;

FIG. 33 is a diagrammatic representation of a quantum loop, shown by dimension wave and four-wave node sets. On the left hand column, dimension waves A, B, C, D, and F are represented as wave functions, across the top of the diagram four-wave nodes from the triplet are represented. Letter X highlights that there are still four dimensions included in the formation of each node (set ABCD), One dimension wave function changes and the next node Y is established (set ABDF). The aspect of negative and positive wave values is inconsequential as either contributes to producing a confining space;

FIG. 34 is a schematic view of a neutron, showing the axial structure of the mass-particle relative to the axial metric. Letters A, B, and C represent 6-choose-4 axes and D represents the radical axis, or the mid point line of the three 6-choose-4 axes;

FIG. 35 is a schematic view, showing the axial alignment of the neutron and proton using the quantum loop and spindle torus models. The axial structure of the centerpoint, neutron, proton, and electron are represented by letters A, B, C, and D, respectively. Letters E and F represent the direction of energy flow in the quantum loop path through the lemon of neutrons and protons, respectively. Letter G represents the path of flow for the outside of the torus responsible for field generation. Letter H represents the conceptual plane where the proton and neutron mirror flow meet. Letters I, J, and K represent more fully developed spindle torus structures;

FIG. 36 is a pictorial view, showing the axial alignment of the neutron and proton using the physical wire loops to represent the quantum loop. While the positions of the quantum loop are only temporary, the Model serves to describe the physical aspect of the radius and shared node connection points. The axial structure of the centerpoint, neutron, proton, and electron are represented by letters A, B, C, and D, respectively;

FIG. 37 is a diagrammatic representation of the atomic shell structure based on the supersymmetric structure of ten light-cones. As the Model shows, Major cone levels are full at the 10, 40, 70, 100, and 130 levels. Minor cone levels are in sets of ten corresponding to the number of base triplet cones in the atom. The sequential order of neutrons, protons, and electrons is organized by the supersymmetric metric, the base ten structures, the conceptual equator, and the selective influence of a single dimension over only 4 of 5 triplet sets;

FIG. 38 is a schematic view of metric tightening as shown by neutron/proton set A tightening to the radial scale of B. Smaller radius quantum loops are more likely to absorb and hold photon and bonding energy. Shorter gaps in the quantum loops mean the loop is less likely to be obstructed, result in a stronger field. Energy transfers more readily with a wider range of elements resulting in improved bonds and greater quantum loop resident energy storage;

FIG. 39 is a schematic view of metric tightening as shown by a single mass-particle or relative radius 1105, A, gaining resident energy and tightening its absolute radius to the point that a second mass particle set of quantum loops can be formed of relative radius 2465, B. This tightening further occurs allowing the third mass particle form within the same cone structure at relative radius 3145, C. Using the cone as a foundation, there are 13 stable neutron/proton pairs that can be formed per cone;

FIG. 40 shows schematic views of the Helium atom according to the Model of the present invention. Shown are models using quantum loops A, spindle torus B, sticks C, and compass model D to highlight the positions of the centerpoint, two neutron, two protons, and electrons related to Helium;

FIG. 41 shows schematic views of the first ten atoms as stick models highlighting the simple axial structure of the axes and particles;

FIG. 42 shows schematic views of selected atoms as spindle tori models. This representation highlights the axial structure and alignment of mass-particles and the resultant electron positions;

FIG. 43 shows schematic views of selected first level atoms as compass models. The addition of larger quantum loops follows a fractal organization where level one and level three spin in the same direction and level two spins in the opposite in any given cone;

FIG. 44 shows schematic views of Argon 36 and Iron 56 as compass models. The addition of larger quantum loops follows a fractal organization where level one and level three spin in the same direction and level two spins in the opposite in any given cone. The actual axial position of the outermost mass-particle set will vary within the four triplets most recently enhanced by the single dimension;

FIG. 45 shows schematic views of the cone/sub-cone formation is regularized and the causal structure for larger atoms is further embellished. As shown in FIG. 8 the base ten cones have a sequence of spin orientation. In this figure, each cone D has a sub-cone. Each level has an opposite rotation sequences as represented by letters A, B, and C. The spin for each level is opposite the cone level directly preceding them. The entire cone and sub-cone set stay within the triplet cone area, forming a single large cone from each of the ten primary cones. One particle set occupies level 1, 3 occupy level 2, and 9 occupy level 3. An additional 27 particle sets can occupy the unstable fourth level;

FIG. 46 is a schematic view of the electron position as a resultant of the proton and neutron quantum loops. Letters A, B, C, and D refer to the centerpoint, neutron, proton, and electron, respectively. Letter E refers to the 5-D determinable positions associated with the electron and the apparent cloud as a resultant of the four-wave triplet particle structure using three sets of four-dimensional spaces to create a 5-D particle;

FIG. 47 is a schematic view of the electron position within the context of the entire axial atom. The Model takes into account the x, y, z, w, and u components of orbits within a four-vector metric structure;

FIG. 48 is a schematic view of the Higgs mechanism according to the Model of the present invention. The strength of the Higgs attraction is governed by several factors: the spurious positive or negative polar orientation of the mass-particle to the atom or more accurately the cone, the alignment of metric scale, triplet sequence, four-wave intersections, and chirality. When these characteristics are aligned, the particle is drawn with significant additional force relative to an otherwise random alignment. The particle-traveling route A is aligned with the cone and subject to the Higgs mechanism of alignment and attraction, the particle on path B is not aligned with the cone and is not subject to Higgs forces. There are five sets of conical alignment in the atom, consistent with the predictions of the Standard Model;

FIG. 49 is a schematic representation of the quantum loop's unique geometry as a generator of unique frequency photons. Photon information is based on the actual radius of the quantum loop and the wave-sets that comprise the loop. A broad generalization can be made that the larger the loop, the larger the frequency at the lowest energy level A. A smaller loop B generates a higher frequency photon. Photon emission follows a single wave crest outward at the speed of light C. Photon absorption is most efficient when the photon is absorbed on the return potion of the quantum loop D. The direction of resonant energy transfer in the loop is indicated by the arrow E. When the centerpoint is bumped, the path is interrupted or the node is overloaded a photon is released. Quantum loop geometry provides the information of a photon;

FIG. 50 is a schematic representation of the four-wave model of a photon where one dimension moves forward at c and the remaining three node dimension waves maintain their period according to the Model of the present invention. On the left hand column, directions A, B, C, D, and F are represented as wave functions. Across the top of the diagram node sets from the triplet are represented. Letters X and Y highlight that there are still four dimensions included in the formation of each node, however, one of the wave functions is continuously moving forward at light-speed and now transfers unencumbered from node-to-node at the speed of light, as represented by letter Z. The remaining directions BCDF maintain the same periodicity they had within the quantum loop from which the photon was emitted;

FIG. 51 is a schematic representation of the five dimension waves involved in the photon according to the Model of the present invention. On the left hand column, directions A, B, C, D, and F are represented as wave functions. Across the top of the diagram node sets from the triplet are represented. One wave moves forward at the speed of light A. All waves involved in all three of the triplet axes, e.g., B, have larger amplitude and are more opportunistic phase alignment in one dimension than where the single dimension is involved in only two of the three triplet lattice sets, e.g., dimension waves C, D, and F;

FIG. 52 is a schematic representation of the advance wave of the photon according to the Model of the present invention. Advance A (and trailing) waves shown in the Quantum Model are consistent with Bell's observations where information is ahead of the occupiable four-space. It is the portion of the Julia fractal where there is connection and disconnection and is not occupiable space;

FIG. 53 is a schematic representation of quantum excitation showing two types of excitation according to the Model of the present invention. Type 1 is where the position of the dimension wave is tightened as the result of short alignments or where two dimensions or more have tightened simultaneously. This type of alignment can persist and is typical in larger atoms and elemental bonds. Type 2 is a more temporary condition associated with high-spin states. In Type 2 alignment, four-wave intersections of dimension waves follow the sweeping dimension as the rouge dimension wave bounces within the centerpoint following various higher energy geometries;

FIG. 54 is a schematic representation of the dimension-wave disturbance pattern created by the forward moving photon A traveling at the speed of light along a dimension wave crest C, according to the Model of the present invention. Phase aligned waves interfere constructively leaving the telltale frequency-dependent pattern of interference B associated with slit experiments. Mass-particles contain quantum loops filled with phase aligned four-wave nodes. Photons create a phase-aligned 6-choose-2 interference pattern when sent through slits or interact with other atomic fields;

FIG. 55 is a schematic representation of the quantum loop's resonant energy generating dimension waves outward from the quantum loop according to the Model of the present invention. These dimension waves are weaker than the centerpoint waves as they are generated within nodes that have a maximum strength that is only the inverse square of the distance from the centerpoint;

FIG. 56 is a schematic representation of the cylinder inscribed with a spindle torus according to the Model of the present invention, where r is the radius of the torus tube, and where R is measured from the radical center of the torus to the outer cylinder. Gravity waves are generated by a finite number of node positions and transfers within the particle confined by a cylinder (e.g., the proton has three quantum loops of 108 nodes, each path using three 6-choose-4 lattice sets for a total of 972 nodes per proton). The electromagnetic field is generated from the centerpoint. The pulse of gravitational waves results from the synchronous flow of resonant energy through quantum loops (out and back) and the sweeping dimension wave that provides sequential nodes at varying rates as the dimension sweeps;

FIG. 57 is a schematic representation of quantum loop nodes for all mass-particles straddle the centerpoint at a variable distance x from the centerpoint. Since four-wave nodes are always a distance from the centerpoint as represented by Letters A, B, and C, the strength of any dimension waves generated from a node is the inverse square of the node's distance from the centerpoint;

FIG. 58 is a diagrammatic representation of the centerpoint, electromagnetic field, quantum loops, light-cone pair, axial triplet, and the generation of a photon from a quantum loop within the context of a Helium atom, according to the Model. Gravity waves are generated by the three finite quantum loop and is partially represented in the figure by letter G. Letters A, B, and C highlight the neutron, proton, and electron mass-particle quantum loops, respectively. The electromagnetic field E is generated by the six directions at the centerpoint D. Photons F follows dimension waves away from the centerpoint from the quantum loops. The model of the present invention unifies the Standard Model and Relativity using a four-wave metric and quantum loops provided by the Quantum Model;

FIG. 59 is a schematic view, showing the quantum loop structure B of a black hole and the organizational helicoid structure A responsible for quasar emissions. Also shown is the accretion disk C.

Figure 60:
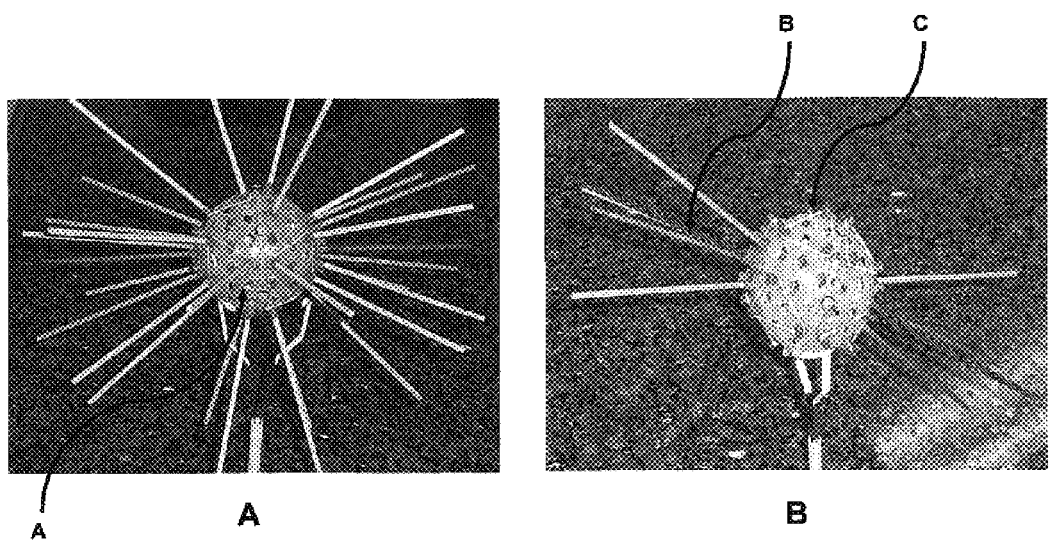

FIG. 60 is a physical model in plastic and wood, showing the axial structure of the metric. FIG. 60A show fifteen axes of four-dimension spaces axially aligned in supersymmetric position about the centerpoint ball A (exaggerated). FIG. 60B show an axial triplet and a radical helicoid represented by the superimposed striped line B. Each model uses a coding system to identify individual axes and axial triplets in supersymmetry; in this case rubber bands between the wooden axes C identify the triplets and each axis has different coloring. The axis colors by triplet are related.

DETAILED DESCRIPTION OF ILLUSTRATIVE EMBODIMENTS

Definitions

The following definitions are used herein.

6-choose-2 (6/2)—The interaction of two dimension waves from any source. The organization tool for many elemental bonds, light interference patterns, and the transfer of resident energy between atoms. Also a bonding alignment.

6-choose-4 (6/4)—The permutational sets of four-dimensional spaces that are formed through which resonant energy can transfer. The six-dimension metric yield 15 axes of four-dimensional lattice spaces, including crests, troughs, and null space, converging through the six-dimensional centerpoint. Also a bonding alignment.

6-choose-6 (6/6)—The atom's single centerpoint (neutrino). Also a bonding alignment.

6-Choose-n—The permutational sets of any given number of dimensions that can be chosen from an initial set of six dimensions.

Absolute radius—The physical distance traveled per unit absolute time.

Atom—A six-dimensional centerpoint structure with mass-particles constructed with quantum loops in five dimensions and resonant energy transfer in four dimensions. The reference to an atom is not limited to a single atom and can refer to small and large groups of atoms. The Hydrogen proton is an exception and is only a five-dimension structure.

Atomic equator—The structural division of the atom where five cones are on one side and their axial pairs on the other side of the atom, orthogonal to the helium triplet radical axis.

Axial metric—The structure of the space created when six dimension waves create four-dimension spaces of determinable distance and symmetry using 15 axes of the four-dimension spaces and the six-dimensional centerpoint.

Quantum Model—The title of the Model that includes the regularizations, i.e., naturally occuring structures or fundamental math sets that account for the consistent duplication of matter.

Axial triplet—The basic four-wave metric structure formed by three contiguous 6-choose-4 axes that provides the lattice structure for particle formation. There are five axial triplet sets per atom.

Bond—The alignment of atomic metrics and transfer of energy between atoms occuring on a 6-choose-2 or higher basis.

Charge—The positive and negative resonant energy flow direction through the quantum loops and spindle torus geometry. Positive charge has loop center flow direction away from the target and negative charge has flow direction toward the target. The fundamental geometry of spindle tori for protons and quarks is directly related to the free particle's attraction to other mass-particle. Associated with the polar orientation of the mass-particle.

Chiral field—The field generated by the organization of the metric, sweeping dimensions and quantum loop sets that naturally twist as a result of tilted quantum loops straddling the radical helicoid. It is the same organization associated with charge, magnetic moment, and gravity.

Completion set—Three quantum loops that make up a mass-particle.

Cone—An axial triplet on one side of the centerpoint in which up to 13 stable particle sets of neutrons, protons, and electrons can organize.

Cone pair—Two cones that are constructed using the full axial triplet and match rules for Lorentz transformation across the centerpoint.

Cone pair cleaving—The release of cone pairs (based on groups of axial triplets) from the atom because the triplet-based cone pair has lost timing with the centerpoint and the sequence of the atom. Usually a function of the centerpoint being moved abruptly.

Confinement, major—A mass-particle having an internal structure comprised of three sub-particles, each ~2.5% of the mass of the confining particle. Electrons, protons, and neutrons exhibit major confinement.

Confinement, minor—A mass-particle set based on having an internal structure comprised of five sub-particles, each ~0.8% of the mass of the confining particle. Pentaquarks and electron quarks exhibit minor confinement.

Dimension frequency—The number of dimension waves generated by a single dimension generator per unit absolute time.

Dimension wave or dimension ("D")—A real wave generated from within the resonant centerpoint of the atom, quantum loops, or photon. Six dimensions or variables identify the location of the centerpoint. Four dimension waves intersect to define the location of an occupiable four-wave space. Individually, the dimension waves are mass-free and are not visible conventionally.

Electromagnetic field—The field of four-dimensional potentiated spaces formed within the six-dimensional metric outward to infinite scales. The field is generated from the centerpoint and is influenced by the interaction of dimension wave variables from inside and outside the atom. Potentiated spaces contribute to metric organization.

Field strength—The strength of the electromagnetic and gravity fields and the organizational potential of the field of four-wave nodes. Field strength is increase with smaller and tighter nodes and an increased amount of energy bound within the quantum loops associated with metric tightening. The four-wave electromagnetic field reduces in resonant energy holding power by the inverse square of the distance from the centerpoint.

Fire—The rapid release of photons from a quantum loop as the result of interaction with a looser metric and paramagnetic (6-choose-2) field.

Flow—The transfer of resonant energy from node-to-node within quantum loops. Resonant energy transfers between nodes at the speed of light following single dimension transfers. In the context of the spindle torus, the quantum loop flow around the outside of the mass-particle is differentiated from flow through the inside, over the lemon. Flow is instrumental in the propagation of field structure, helicity, charge, and gravity waves.

Four-Wave intersection—The intersection of four dimension waves to create a confined, internally reflective resonant space, cavity, or well.

Gravity—The dimension waves generated by the synchronous flow of resonant energy within quantum loop sets.

Helicoid—The auger-like shape of the radical axis within the axial triplet and spindle torus particle created by the three tilted quantum loops.

Hypertube—The constructive intersection of two matched dimension waves.

Information paradox—The conversion of chaotic mass to massive quantum loops sets of resonant energy associated with black hole formation.

Light—Light is designated to be electromagnetic waves of any wavelength across the entire electromagnetic spectrum.

Mass and mass-particle—A particle comprised of three quantum loops. Mass is measured in three dimensions.

Mass gap—The loss of apparent mass between contiguous mass-particles as the atom gets larger. Mass gap is a manifestation of quantum loops sharing nodes.

Material—Related to mass.

Maximal distance—The longest distance between nodes where energy can still be transferred successfully. This distance is the same magnitude as Planck length.

Metric set—A metric set is a group of spaces that can be described by the real (non-negative) distances between neighboring points in a set that is also symmetric.

Metric tightening—The reduction of the relative radius of a mass-particle by adding energy to the particle so that additional quantum loops on larger scales can be formed.

Neutrino—A single six-dimensional point-space that confines six-dimension wave generators located at the center of the atom. It is the focal point for all mass-particles above the mass of Hydrogen. A free neutrino has one dimension that has constant periodicity. Neutrinos vary in size with the scale of the associated metric.

Neutron—A major confinement particle of 108 lattice nodes per lattice set per quantum loop and constructed using five dimensions. The neutron has the exact node structure of a proton except it shares the centerpoint. The positive pole of the neutron is tied to the centerpoint.

Node—A four dimension wave intersection.

Node—It is a four-dimension space within a 6-choose-4 lattice. The smallest lattice space occupiable by resonant energy. In addition, the empty four-wave spaces of the electromagnetic field.

Node density—The product of quantum loop node count divided by the relative radius of the mass-particle.

Obstruction—A force that disrupts the transfer of resonant energy from node to node, at minor energy levels changing the location of a dimension wave within a quantum loop, at larger levels causing quantum loop resonant energy to stop.

Originating—The place from which the metric, mass-particle, quantum loop, photon, or field was initially generated, usually associated with the atomic structure before being dislocated from the atom.

Orphan wavelengths—Individual wavelengths associated with quantum loops that are unique among major groups of that atom's wavelengths, ideally, by at least 7-10 nm.

Path—The sequential transfer of energy from node-to-node within a quantum loop. Nodes are linked by single dimension wave transfers of resonant energy.

Percent overlap—Mass-particle spindle tori have a smaller lemon than apple. The diameter of the lemon to the diameter of the apple expressed as a percent is the percent overlap.

Photon—A set of five-dimension energy emanating from a single quantum loop where four of the waves remain periodic, consistent with the originating quantum loop riding the crest of the fifth wave, allowing the particle to move at the speed of light.

Power—The quality of dimension wave intersections determined by the frequency, amplitude, and alignment of the waves. Waves equal in power and phase alignment have the highest level of interaction.

Proton—A major confinement particle of 108 lattice nodes per 6-choose-4 lattice set per quantum loop (a total of 324 nodes per loop and 972 nodes per proton). It also can generically represent all major confinement mass-particles with torus overlap of about 65%.

Quantum loop—The path of resonant energy within a particle that cyclically and sequentially transfers through three high-density lattice circle sets and shared nodes, back to its original starting position. It is constructed using 3 sets of 4-D lattice nodes creating a 5-D path.

Radical axis—The straight auger shaped centerline of the spindle torus that is the generated by the tilted, rotating planes associated with quantum loops. Radical is defined as the mean distance from each of the triplet axes or quantum loops within a mass-particle. Also a triplet centerline.

Regularization—The naturally occuring geometry or math set that provides the reason for atoms to form consistently.

Relative radius—The quantization metric radius of the scale of quantum loops loop expressed in dimension waves per unit absolute time. The absolute scale of the relative radius is predicated on the loop staying within the maximal distance between nodes. Since nodes and quantum loops change in energy level and therefore tightness, the observed absolute radius (i.e., wave distance traveled at c per absolute unit time) varies but the quantum relative radius does not, regardless of lattice circle solution's scale. This is not the same as absolute radius, which is the physical distance traveled per unit absolute time.

Resident energy—The energy in one through six dimensions that moves in and out of the particle without changing the particle's measurable mass. Also the energy held by the quantum loop. In addition, the energy holding capacity associated with bonds.

Resonant energy—The confined energy that is reflected within the centerpoint, quantum loop nodes, and photons. It generates outward dimension waves that provide massless background disturbance. Each dimension wave is massless.

Reuleaux lemon—The center structure of the spindle torus formed by the intersection of three rotating planes of resonant energy flow.

Secondary wavelengths—Spectral wavelengths of quantum loops within an atom that has undergone metric tightening (the shortest relative radii in an atom). These loops contribute fewer photons to the spectral signature of the element as the paths are always less disrupted or overloaded as the outermost and largest loops. Basically, it includes all wavelengths except the highest spectral intensity for the atom.

Seiche—A four-wave intersection node. A nautical term for the intersection of many waves, usually on a confined body of water like a lake.

Spindle torus lemon—The center overlap portion of the spindle torus. The remainder of the torus volume is called the apple.

Spontaneous and sequential—The formation and dissolution of four-wave potentiated spaces in the electromagnetic field.

Supersymmetry—The 6-choose-4 axial metric alignment that provides four-vector Lorentz transformations providing scaffolding for all mass-particles fields and forces, including gravity.

Sweep—The complex rotation of the metric can be based on (1) a single dimension rotating about the centerpoint, influencing the sequential formation of node points, or (2) multiple dimensions (up to six) rotating simultaneously about the centerpoint. Each dimension propagates two sets of dimension waves and once it has swept 360° the dimension generator has influenced the mass-particle twice.

Symmetry, axial—Symmetry between contiguous particles that share nodes on the opposite sides of the centerpoint within an axial triplet set or light-cone pair.

Symmetry, mirror—Symmetry between contiguous particles that share nodes on the same side of the centerpoint within an axial triplet set or light-cone pair.

Time—An absolute, forward moving and real phenomenon where $t=d/c$.

4-D Supersymmetry Using Six Real Dimensions

Centerpoint Resonant Wave Structure

The Quantum Model presents the atom based on six real dimensions creating a permutational four-dimension metric. Each dimension is defined as a resonant wave alternating within the atom's single centerpoint. When the trapped resonant wave "hits" one side of the centerpoint sphere, a spherical wave is generated. The trapped wave reflects (resonates) back and forth within the centerpoint and causes the continuous propagation of discrete, massless spherical waves outward from alternating sides of the centerpoint. Each confined reflected wave is defined as a one-dimension wave.

The centerpoint's resonant energy is the same energy associated with light. Resonant energy is the confined energy that is reflected within the centerpoint, quantum loop nodes, and photons. It generates outward dimension waves that provide massless background disturbance. Each dimension wave is massless. It is the interaction of these waves that provides the potential for mass.

The electromagnetic field's quantization is achieved when four dimension waves intersect at positions outward from the centerpoint, forming discrete 4-D points within the metric that are occupiable by the energy associated with mass and light.

The dimension waves are moving outward at light-speed, consistent with the light-speed motion of the trapped waves. As each of the six waves is propagated, there is a small separation of distance between the origin points within the complex centerpoint sphere. The Model shows that the tiny difference in position and sequence of the wave dimensions potentiates the surrounding 4-D field in a highly organized manner.

Figure 1:
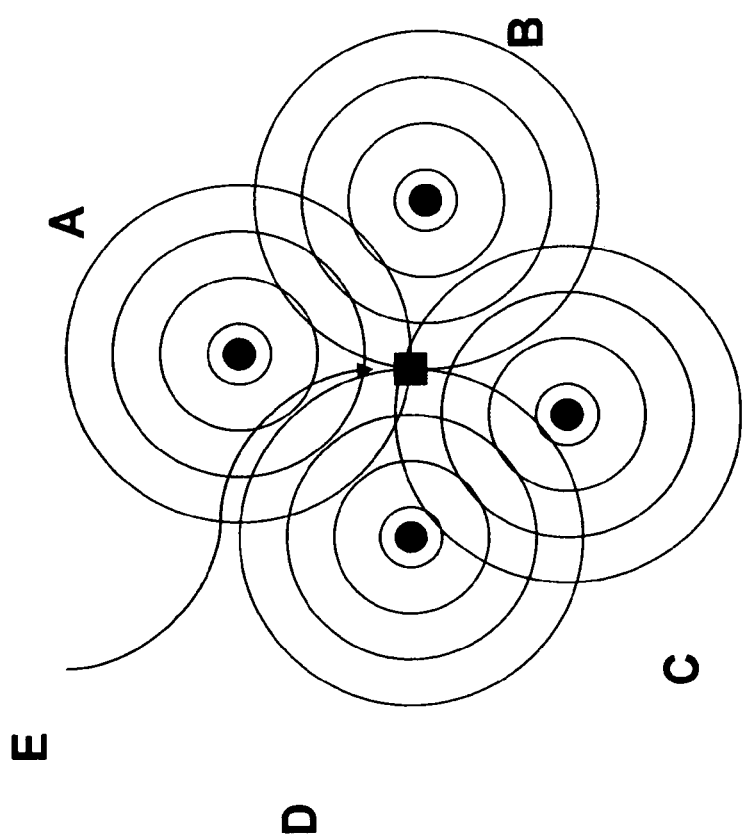
FIG. 1 is a view in perspective of four waves converging to form a four-dimension (4-D) wave crest according to the Model of the present invention. Letters A through D represent four independent waves converging towards the four-dimension centerpoint E.

As an illustrative example, drop four matched stones in a pond (FIG. 1). Waves move outward from each of the drop points, forming temporary positions for discrete four-wave intersection (nodes). Continue to propagate waves from the stone positions, and the four-wave intersections would follow a sequential pattern outward. Move any drop point and the sequence and position of four-wave intersections simply shift.

Figure 2:
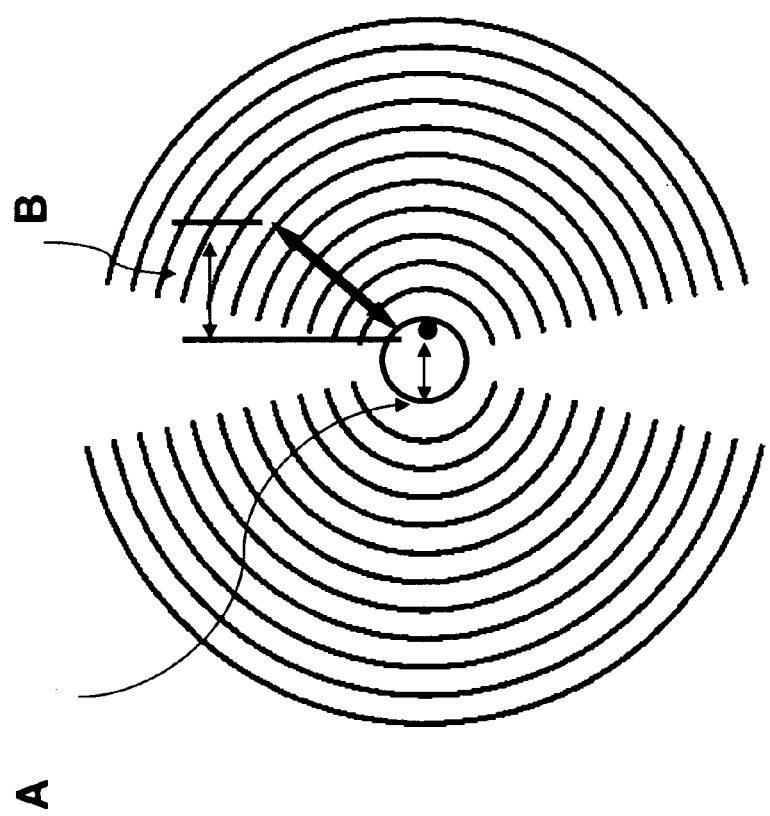
FIG. 2 is a view in perspective of a single wave generator A reflecting at constant light speed within the centerpoint to create single dimension spherical waves on alternating sides of the centerpoint moving outward at the speed of light according to the Model of the present invention. Distances between waves and the centerpoint B are measured using light-speed and absolute time.

Within the spherical space of the centerpoint, the internally reflected trapped waves become resonant generators of new waves outside the centerpoint. Each dimension wave is generated moving at the speed of light away from the centerpoint (FIG. 2). A smaller centerpoint can be maintained, assuming that the frequencies of the trapped waves are each tightened, creating a higher frequency set of dimension waves. Higher frequency waves increase the number of potentially occupiable four-wave intersections within the metric within an absolute period of time.

Resonance can be modeled using the visual analogy of the original video game "Pong". That is where the ping-pong ball always is assumed to move between the paddles at the same speed (in this case, c) and then reflects back to the other paddle. Within the atom's centerpoint, the reflection is moving continuous at the speed of light, moving outward from the centerpoint, sequentially hitting each side of the centerpoint wall. Again, dimension waves are massless, only potentiating spaces within the metric.

There are significant advantages to using wave structures to model the metric. Distances from the defined centerpoint are determinable in wave periods moving at the speed of light in conventional, absolute time units. Each single dimension wave is separated by wave frequency at light-speed, a distance that can be determined within the local metric in absolute time. Each 4-D node is defined by the intersection of four waves, providing a distance that is also measurable in absolute time.

Figure 3:
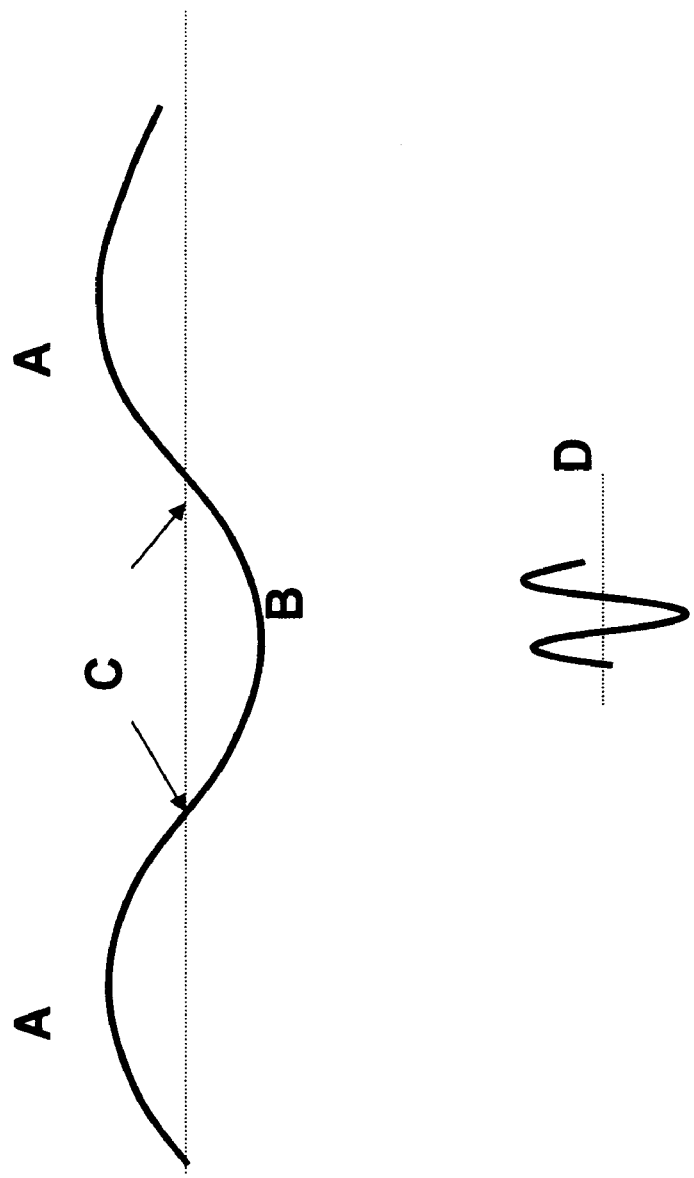
FIG. 3 is a view in perspective of a single wave A providing a discrete structure that provides lattice spacing regardless of scale. Crests A and trough B are separated by null space C according to the Model of the present invention. Shorter wavelengths maintain discrete crests and troughs regardless of period D.

Waves also maintain crest, trough, and null space separation regardless of the length of the wave period (FIG. 3). These characteristics help to naturally maintain lattice spacing regardless of metric tightening. A tighter centerpoint reflective space generates more frequent waves than a larger centerpoint. A tighter centerpoint also holds more energy and creates a tighter 4-D metric field. Further, centerpoint waves generate resultant field strengths that are easily characterized using the inverse square rule relative to the discrete centerpoint.

Four-Dimension Occupiable Spaces

The intersection of those waves outside the centerpoint is a function of the respective wave periods and the positions within the centerpoint sphere from which the waves are generated. A fundamental Model assumption is that intersections of four waves provide discrete, occupiable point-spaces for energy associated with mass, light, and the structure of the electromagnetic field.

Figure 4:
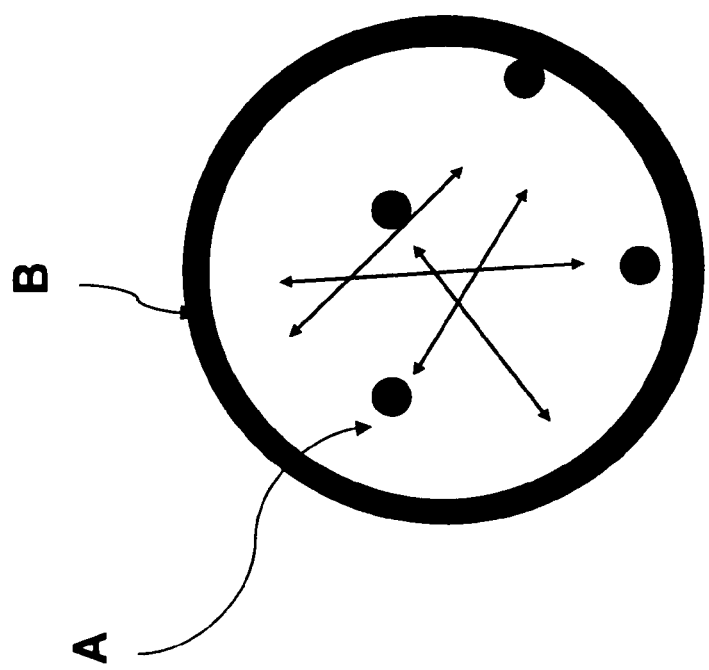
FIG. 4 is a view in perspective of the Quantum Model of the present invention showing four independent wave generators A reflecting within the walls of a four-dimension confined space B. The generators are constantly moving at light-speed.

Using another visual analogy, the centerpoint resonance can be thought of as ping-pong balls bouncing/reflecting within a soccer ball (FIG. 4). Each wave propagates independently and provides an individual dimension variable to the metric. The speed of the pin-pong balls is constant "c", regardless of the speed or direction of the soccer ball. The motion of the ping-pong balls is dependent on the scale of the confining centerpoint, the path of the ping-pong balls (bouncing off one or more walls before returning to its starting point) and any outside influences that may change the path of the ping-pong balls or the soccer ball. (Include light, matter, and fields). Oscillate the soccer ball rapidly and the ping-pong balls act as though the centerpoint is smaller, tighter, and higher energy.

Figure 5:
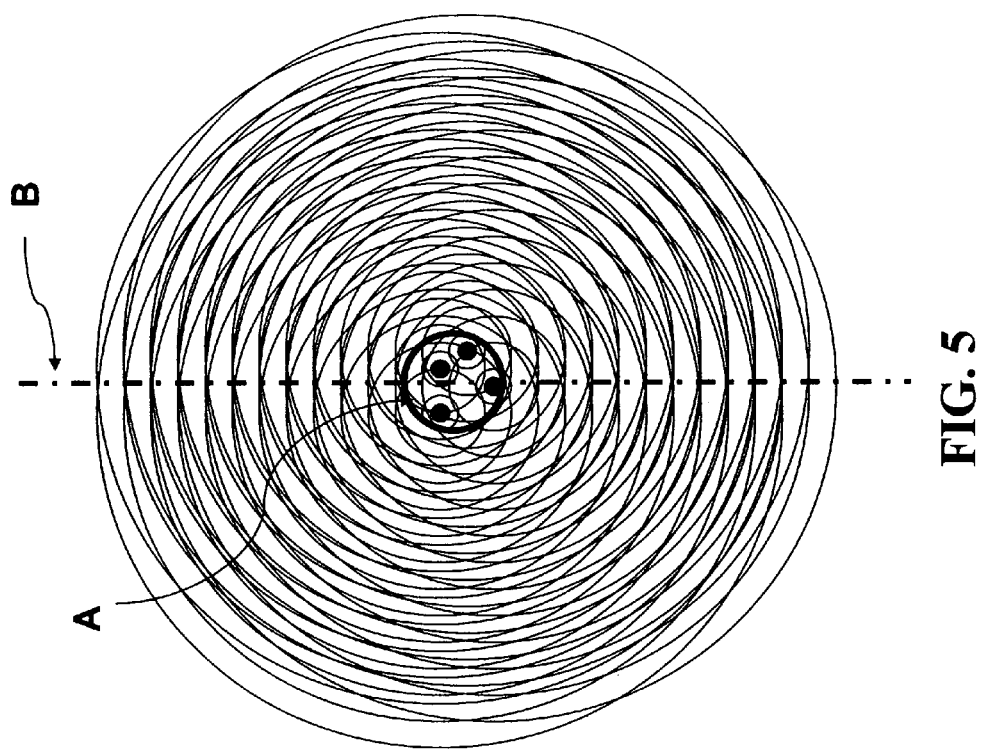
FIG. 5 is a view in perspective of the Quantum Model of the present invention where the spontaneous intersections of four-waves A naturally align axially B creating quantum points. As dimension wave generators reflect from different positions within the confined point, new positions for dimension wave intersections form. The four-wave intersections adjust to create a self-referencing metric.

The intersections of spherical wave sets generated by the centerpoint can be modeled using concentric circles generated from each of the resonant centerpoint trapped waves (FIG. 5). As each new dimension wave propagates outward, the positions of the four-wave intersections form and disappear. These intersections only represent a local field that is only potentiated and do not yet contain mass. The entire set of 4-D spaces is not dependent on an exact set of fixed positions around the centerpoint; rather, the entire metric can shift, twist, and misalign with the shift of one or more of the resonant wave sets. New four-wave intersection positions are created spontaneously, reacting to the slightest change to the centerpoint resonance. New four-wave positions form spontaneously to even the smallest change in a single dimension wave or the centerpoint position.

The Quantum Model provides the mechanism for 4-D potentiated spaces to be created symmetrically on both sides of the centerpoint. This helps to create a 4-D metric that is naturally self-referencing while providing a series of discrete quantum spaces that are sequential, temporary, and definable distances from the centerpoint.

A major aspect of the Quantum Model is that the alignment of four-wave intersections invariably involves an axial alignment of 4-D spaces through the centerpoint. Further, the alignment of spaces follows a shifting pattern based on the spherical divergence and convergence of intersections of the wave sets. This potentiates 4-D lattice to where sequential occupiable four-space positions also develop naturally to the left and right, simultaneously and effortlessly.

The Quantum Model's wave structure provides a massless means for potentiating and organizing fields. The wave structure also provides a foundation for quantum energy transfers (between single lattice points) at light-speed. These transfers do not require instant acceleration of forces or energy; rather, the transfer follows a dimensional wave between 4-D wave intersections already moving at the speed of light. Transferring energy from node-to-node using a sequence of one-dimensional changes is also why light moves at light-speed regardless of the POV of the observer. The scale of the 1-D transfers also aligns with the scale of string theory.

The 6-Choose-4 Permutational Axial Metric with 15 Four-Dimension Lattice Sets

The Quantum Model proposes that there are six independent wave structures generated from within the resonant centerpoint. The Model describes a "6-choose-4" permutational metric based on four-wave intersections. The atom's centerpoint incorporates six single dimension waves independently generated within the resonant centerpoint to create sets of 4-D quantum points of occupiable space in the surrounding metric. The permutational metric incorporates 15 four-dimension axially aligned lattice sets of four-wave intersections. Each 4-D space is real and positive on both sides of the centerpoint. Sets of four-dimension spaces are generated from among the six possible dimensions (Table 1). It takes six variables to define the centerpoint and it takes four variables to define each real 4-D space in the metric.

TABLE 1

6-Choose-4 Axis Permutation Sets $$C(m, n) = \frac{m!}{(n!)(m-n)!} \quad (1)$$

$$C(6, 4) = \frac{6*5*4*3*2*1}{(4*3*2*1)(2*1)} = 15 \text{ axes 4-D sets}$$

Each 4-D axis is aligned through the centerpoint. While there is no specific order or starting point, an example of the 15 axes of 6-choose-4 sets are shown in Table 2. There is no priority of one dimension wave over another.

TABLE 2

15 Axes of 6-Choose-4 Spaces
Lattice sets of four-dimension points chosen
from the six dimension variables: ABCDEF

| ABCD | ABCF | ACDF |
| ABEF | ABDF | ABDE |
| ABCE | ACEF | BCEF |
| ADEF | ACDE | CDEF |
| BDEF | BCDF | BCDE |

Figure 6:
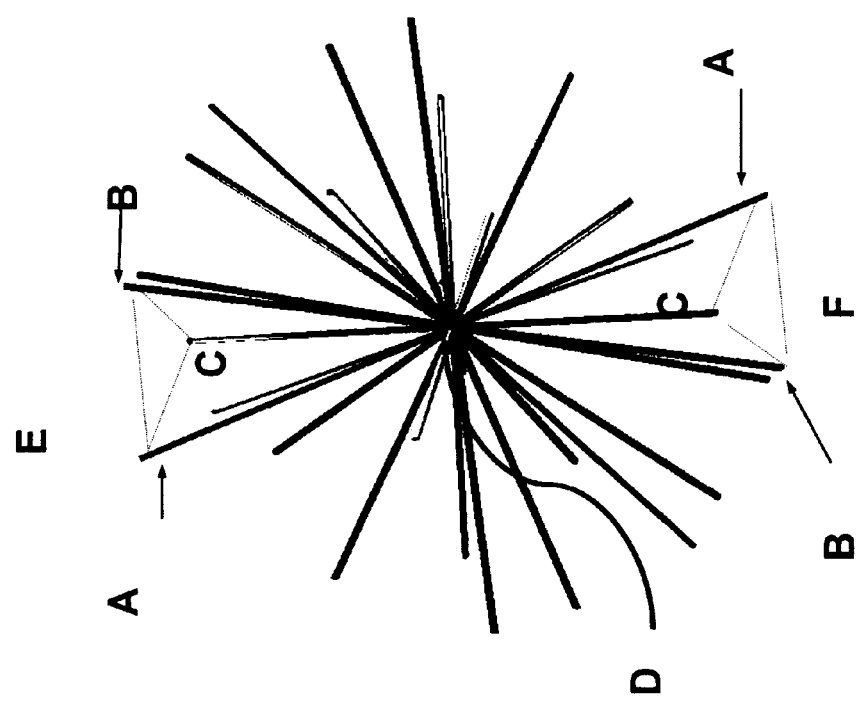
FIG. 6 is a view in perspective of the Quantum Model of the present invention showing that within the centerpoint there are six dimension wave generators creating fifteen "six choose four" axes each having a unique four-dimension lattice set (crests, troughs and null space included). Highlighted in the Model is an axial triplet using axes A, B, and C. Axis A is comprised of sets of four dimensions (e.g., abcd) chosen from six directions in the metric (abcdef). Axis B is comprised of four dimension sets (abcf). Axis C uses another four dimension set (abdf). The four-wave axes converge through the centerpoint D. The symmetry of triangle E is the similar to the symmetry of triangle F, although the relationship is inverted after the axes cross the centerpoint D.

Each of the 6-choose-4 axes of 4-D crests and troughs create occupiable quantum aces with non-occupiable null space between the nodes providing lattice spacing. The structure of the 6/4 metric with the crest and trough wave interactions clearly defines a field that can be tightened, but resists the forces to compact to zero at the single centerpoint. Under ideal conditions, the 15 axes of four-dimensional spaces are separated by equal angles of arcsine 1/3 in $R^6$ (FIG. 6).

In the Model, each wave dimension shifts about the centerpoint independently, creating a periodicity to the spontaneous formation and dissolution of 4-D intersection points. Change any single direction's strength, periodicity, or angle and the entire metric will shift. As one 4-D axis hinges and sweeps about the 6-D centerpoint, each of the 4-D axes associated with the sweeping dimension(s) also shifts. The metric remains both symmetric and self-referencing.

The centerpoint structure also naturally provides a structure for infinite fields, lattice regularization limits, and a deterministic metric structure for quantum loops associated with mass and gravity. Once formed, the centerpoint is the propagator alignment of the centerpoint waves.

Figure 7:
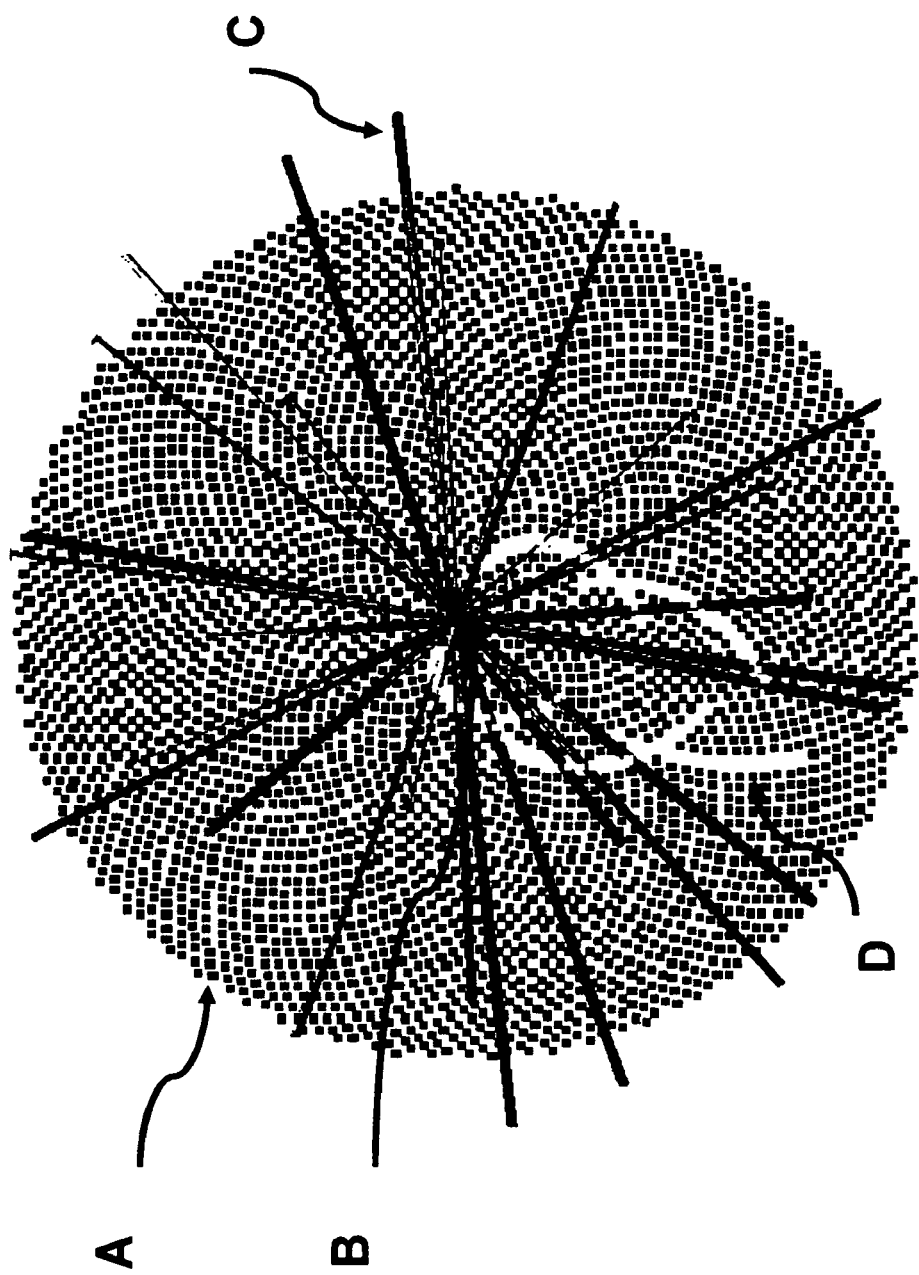
FIG. 7 is a view in perspective of all four-wave intersections A surrounding the centerpoint B in a nested seedhead pattern (e.g., a sunflower seedhead). The fifteen axial alignments of the permutational metric C are self-referencing and self-organizing, created by the centerpoint. A natural organization of sequential spaces is visible D within the 2-D seedhead pattern.

The electromagnetic field—The 6-choose-4 metric provides the structure for the atom's 4-D electromagnetic field. The strength of individual positions within the 4-D electromagnetic field follows the inverse square rules to an infinite distance. The sequential waves and the spherical divergence of 4-D positions naturally create a "nesting" pattern of sequential potentiated positions within the field. Once again, the entire field of 4-D spaces itself is not material (mass-based), rather it represents an organization and potentiation of background waves. These potentiated spaces can be best represented by the natural Fibonacci organization associated with plants, e.g., sunflower seed heads, broccoli florets, and pineapples. Graphically, this is also portrayed as a Fibonacci seedhead©, (FIG. 7).

The dimensions described in the Quantum Model are real (versus mathematically complex dimensions) and create positive real space outward from the centerpoint. The axial four-wave lattice set alignment is added to the potentiated electromagnetic field positions. The axial metric naturally organizes 4-D lattices and provides a foundation to model mass-particles. The Model shows that the underlying symmetry of the atom's field can be described using the four-wave metric. The atom's wave structure generates 4-D fields that are able to penetrate, potentiate, and organize the vacuum of space (vacuum permitivity and permeability).

Changes to the centerpoint resonance are influenced by several factors: 1) the atom's self-generated, self-referencing structure, and 2) by outside influences; e.g., light, fields, and mass. For simplicity, the Quantum Model is idealized with all six dimensions intersecting at right angles, while in nature, this perfect equilibrium occurs rarely. Non-orthogonal alignment of the six dimensions improves the sweeping movement of individual dimensions within the 6-D centerpoint. As one 6/4 axis sweeps, all the related 6/4 axes move, creating a "gearing" effect, hinging at the centerpoint. Sweeping is facilitated by the slight misalignment of the wave generator in sequential reflections within the confining centerpoint. A reflection at 180 degrees is static, but at 179 degrees for example there is a change to the sequential metric positions that causes the sequential "rotation" of the appearance of quantum point positions, or spin.

The scale of the centerpoint is 4.69E-21 relative to the hydrogen proton in six dimensions, consistent with the scale of string theory relative to hydrogen. Individual strings can be modeled as following single-dimension changes between related four-wave intersections. The same centerpoint in three-dimensions is a scale 5.7743E-10 relative to the hydrogen proton, consistent with the scale of the weak force. The relative scales are based on a complex spindle-torus structure with about 65% overlap.

Axial Triplet and Light-Cone Supersymmetry

The Quantum Model defines a further organization to the metric, the "axial triplet" and related light-cone. Mass-based particles fundamentally relying on the symmetry provided by triplets set of axes defined as axial triplets. Within the atom there are five sets of triplets available for particle and field organization as the result of the 15 available four-dimension lattice sets and respective axes (Table 3). There is no formal starting point for the grouping of triplet axes except that the axes tend to be contiguous.

TABLE 3

15 Axes of 6-Choose-4 Spaces
Triplet sets of four-dimension points chosen
from the six dimension variables: ABCDEF

|         |      |      |      | Excludes |
|---------|------|------|------|----------|
| GROUP 1 | ABCD | ABCF | ACDF | E        |
| GROUP 2 | ABEF | ABDF | ABDE | C        |
| GROUP 3 | ABCE | ACEF | BCEF | D        |
| GROUP 4 | ADEF | ACDE | CDEF | B        |
| GROUP 5 | BDEF | BCDF | BCDE | A        |

Each axial triplet is comprised of three 4-D lattice sets (FIG. 1.9). Each triplet naturally follows the rules for Lorentz style transformation using four real variables, without the requirement of either imaginary variables or negative time constructs. The triplets also provide the scaffolding for 4-D "light-cone" structures.

Mass-related symmetry is describable using the axial triplet structures and cones. The axial triplet provides the structure for metric inversion required to describe spin-up and spin-down. The cone naturally inverts through the centerpoint, flipping the sequence of the axes and wave sets. The 6/4 axial triplet space is modeled as conically, axially and locally symmetric, and self-referencing.

Each triplet is actually a structure comprised of 5 dimension variables as derived by using three sets of four-dimension lattices. As shown in the example in FIG. 7, the first triplet is comprised of the axes abcd, abcf, and abdf, which uses the five dimension variables ABCD & F (dimension variable E is excluded from this particular triplet set). These specific dimension combinations are provided as examples, only. As an added note: Even though a given 4-D lattice set is modeled as axially aligned, the reality is that any particular 4-D lattice set (e.g., ABCD) has positions interlaced throughout the metric.

Through the modeling process, it has been observed that most triplets will incorporate two dimension variables in each of the axes, e.g., set ABCD, ABCF, ABDF contains dimensions A and B in each of the triplet axes. Further, a single dimension shift will only affect four of the five triplet sets as one dimension is typically excluded from a triplet set (see Table 3). (While there is a construct where triplets could include six dimensions, the author considers this rare.) Finally, within a given triplet, only one dimension changes between the 4-D axes with triplets if they are arranged in sequence; e.g., ABCD then ABCF, then ABDF, then back to ABCD. This last feature provides an important insight to future modeling of energy transfer between 4-D lattice nodes within an axial triplet field.

The ten light-cone (or five light-cone pair) structure provides a supersymmetric metric structure and is consistent with any four-vector or Lorentz transformation analysis (FIG. 8). Within the atom there are five sets of triplets, each converge through the centerpoint and therefore create ten "cones" or five light-cone pairs. Each cone shares the single 6-D centerpoint. The alignment of the light-cones within the atom naturally follows the structure of the triplets providing further lattice regularization for the formation of particle fields and reinforcing lattice spacing that tends to zero at the centerpoint. The tendency for pairing within the atom or among particles is the result of axial triplet and cone alignment. The 10 cone sets also provides a base ten structure to the atom.

Another point about the axial triplet that becomes clearer once modeled is that there are two types of rotation involved in atoms. First, conventional 3-D rotation is where the entire element spins like a baseball. The second type of rotation is where the cones themselves have rotation based on the independent sweeping of individual dimensions or alignment of axes. This rotation of directions/dimensions is fundamental to excitation states and bonding, and this complex movement results in "gearing" within the atom, as all of the axes move independently, yet, are self-referencing. Even if one, two, or three of the 4-D axes are aligned or "shared" between atoms through bonding, the remaining "excluded" dimension(s) continue to sweep in a complex manner.

With five sets of triplets, the cone sets naturally exhibit a planar "equator" that further organizes the atom on either side of the centerpoint, separating the axially opposed cones (exaggerated in FIG. 8). This equator can be used to conceptually better define mass-particle spin orientation, the sequence of electron orbits and local non-symmetric tightening of the metric for larger atoms.

Quantum Paradox

The Model shows the structure of atomic field quantization and provides points of occupiable spaces that are temporary and follow a relatively simple but unique set of rules. The basic question remains: "Why are the rules inside the atom seemingly different than on larger scales?" Schrödinger offered a wave model, Heisenberg offered a quantum point model, and still relativity seemed to be on another scale completely.

Figure 9:
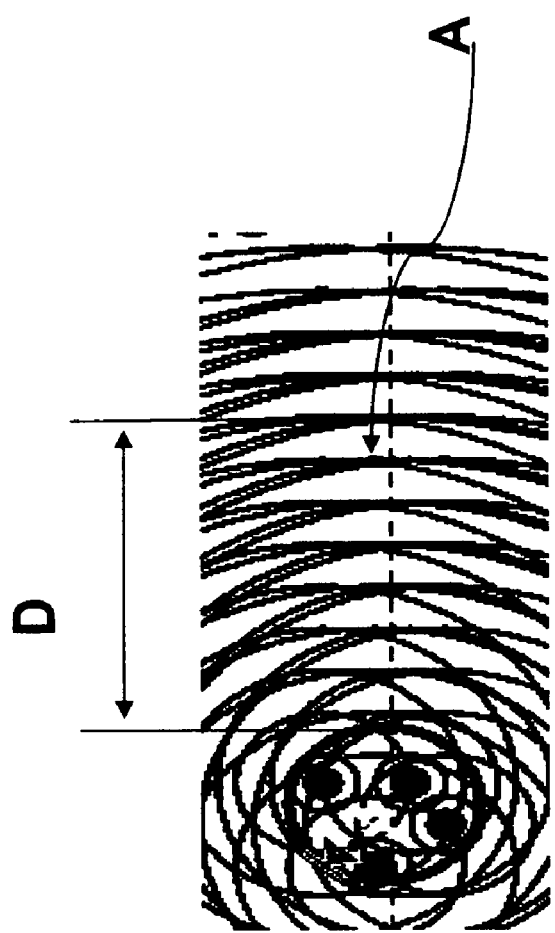
FIG. 9 is a view in perspective of the simultaneous relative locations of real four-wave intersections A that can be determined based on waves traveling at light-speed from the singular centerpoint in absolute time D. Four-vector space in this supersymmetric metric model does not require imaginary time variables or scalar math manipulation.

The answer is that the rules are not different. The Model actually provides a new "metric ruler" that can deterministically measure and describe fields, positions, and quantum effects (FIG. 9). The Quantum Model metric importantly offers a new "ruler" for measurements within the atom; the relative locations of real four-wave intersections can be determined based on waves traveling at light-speed from the singular centerpoint. Four-vector space in this model does not require imaginary time variables or scalar math manipulation. The supersymmetric metric is comprised of real 4-D positive space.

Within the Quantum Model, three-vectors and distance can be always defined in three dimensions, consistent with the macroworld, however, specific determinable field locations for temporary, occupiable 4-D spaces require the intersection of real four-wave sets and four-vector positions as described in the Model.

This view of quantization is fundamentally consistent with quantum views by Schrödinger (waves), Heisenberg (points), and Einstein (general and special relativity). Because the metric is based on temporary node points propagated from the centerpoint, measuring the atomic system using force inherently creates a disturbance at the centerpoint, changing the state of the metric and the alignment of temporary four-wave positions. These factors contribute to uncertainty in measuring absolute positions and can even lead to superimposed states. This measurement difficulty does not, however, reduce the ability to deterministically model the metric changes required to facilitate an elemental bond or the causal field geometries responsible for light frequencies.

The only inherent uncertainty in this model is that any force that disturbs the centerpoint, e.g., attempts to measure the centerpoint, disturbs the resultant, sequential, temporary "interference pattern" of four-wave intersection positions.

Dimension Wave Interactions

Dimension waves of matched scale interact to create spaces which can hold resonant energy. Matched scales include the variables of frequency and phase alignment. Waves appear to interact within the frequency range differences of 5 nm or less or at whole multiples of each other.

Figure 10:
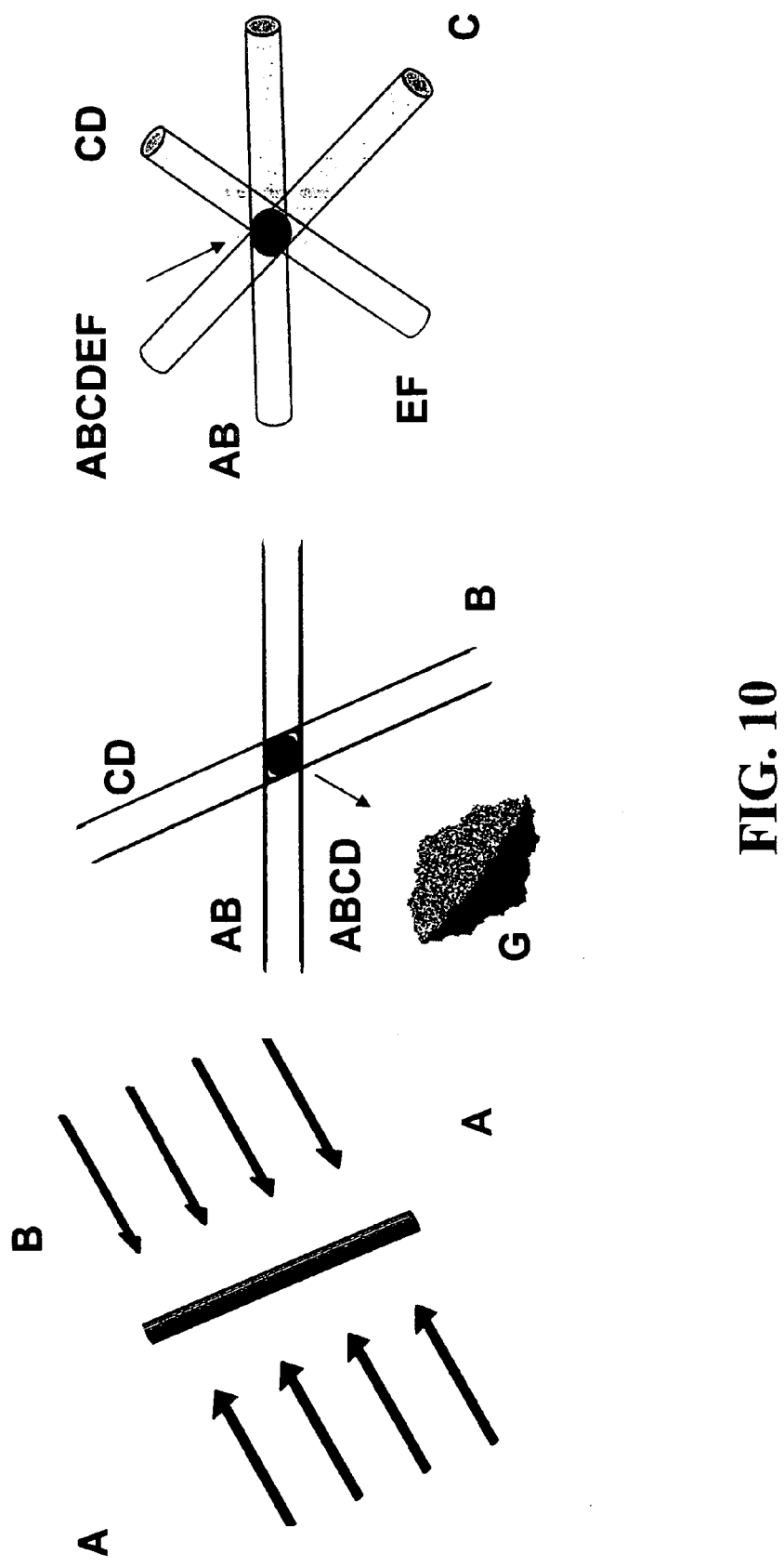
FIG. 10 is a view in perspective of the interaction of matched dimension waves. Letters A through F represent independent dimension waves. Two matched dimension waves A intersect to form a non-confining "tube". Four matched dimension waves B intersect to form a temporary "confined" resonant space that is represented as a single Julia fractal point G. Six matched dimension waves C intersect to form a "confined" resonant centerpoint.

Two matched waves interact to form a tube (FIG. 10). The 2-D tube is a non-confining structure and resonant energy leaks quickly from this structure. Two phase aligned dimension waves intersect at multiple points over a given distance and create a 2-D hypertube field with a pattern dictated by the light's frequency. Three matched frequencies only interact as sets of two to create 2-D tubes, although the tubes created by any two of the three dimension waves are indistinguishable from each other, except for phase orientation.

Four matched waves intersect to form a "closed" or confined space within which resonant energy can reflect. This is the minimum space that can hold resonant energy associated with mass. Within the metric, most four-spaces spontaneously appear and disappear, created all the time, they only represent potentiated positions where resonant energy can be transferred through or held. Four-space is comprised of discrete temporary points within the quantized metric. Resonant energy can be held within these four-space for a brief period until it transfers. The intersection of five waves only interacts as sets of four intersections.

The potentiated positions within the metric are the electromagnetic field. The empty wave intersections decline in their resonant energy confining capacity following inverse square rules as the waves move outward from the centerpoint. These intersections are organized in the surrounding field and influence other local metrics.

Figure 11:
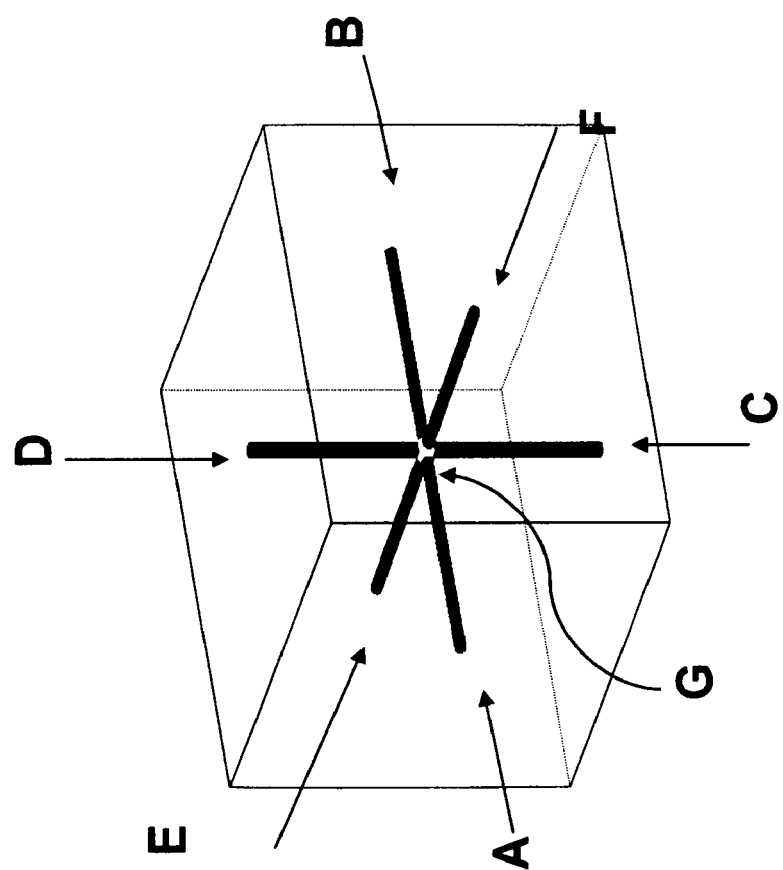
FIG. 11 is a view in perspective of six directions of background dimension waves converging to form a six-dimension (6-D) centerpoint according to the Model of the present invention. Letters A through F represent six independent directions converging towards the six-dimension centerpoint G.

The converging of six matched waves creates a potential confined centerpoint point for the formation of a new local metric (FIG. 11). This convergence is potentiated further if the intersection involves a photon, which also carries resonant energy with dimension wave periodicity. The confined resident energy and periodicity enhance the opportunity for the metric to organize and form quarks. This is the starting point for the spontaneous formation of matter an otherwise "empty" vacuum. Massless dimension waves and intersections carry energy, the grist of virtual particles, fields, gluons, and actions at a distance.

Scattering

Figure 12:
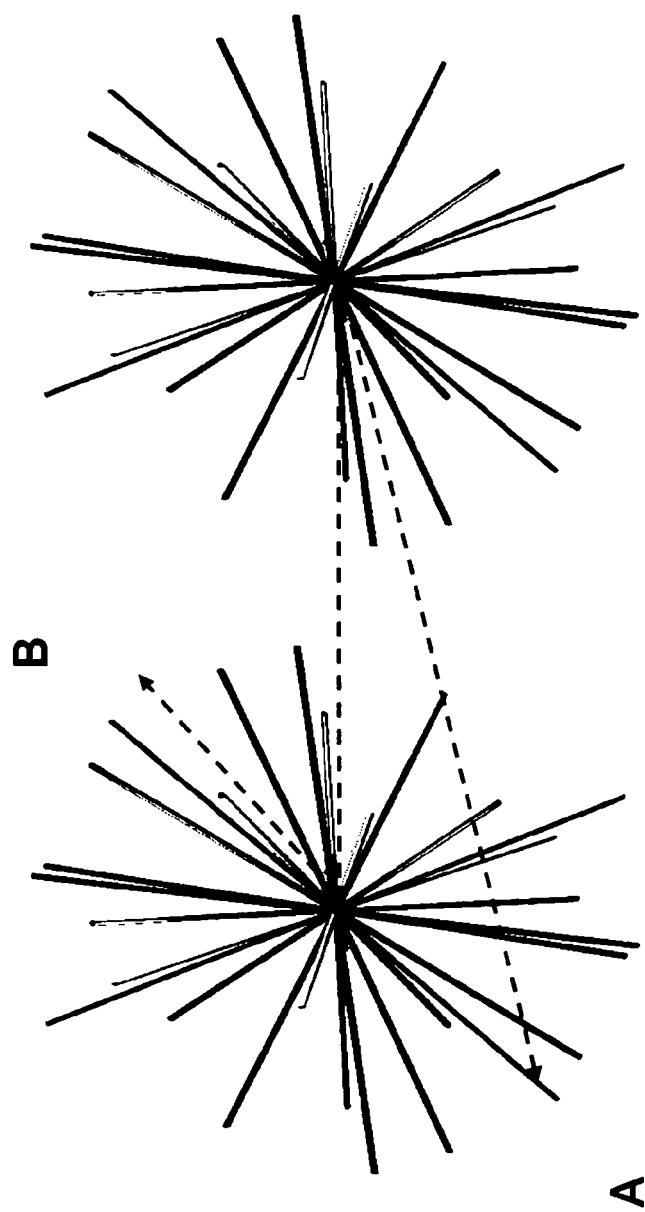
FIG. 12 is a schematic view, showing that centerpoint scattering does not occur when a four-wave metric passes through a four-wave metric A. Scattering only occurs when only occurs when 6-D centerpoints collide B.

Consistent with Rutherford's experimental findings all forces within the atom can be measured through the 6-D centerpoint. Rutherford defined all mass as being actually located at the centerpoint rather than measured through hitting the 6-D centerpoint, as defined by the disclosed Model. The 4-D field organized around a 6-D centerpoint is locally and axially self-referencing and therefore does not interact significantly with other 6/4 energy (photons generally pass through each other). On the other hand, 6-D dimensional centerpoints are internally self-generating but are not self-referencing and will scatter when hit with another centerpoint of similar metric tightness (FIG. 12).

The Quantum Model does not affect Rutherford's experimental findings, rather, offers a reinterpretation of the findings. The Model leads to predictions and information not available from Rutherford style scattering experiments and the Bohr centerpoint mass model. The six-dimensional centerpoint structure also provides a unique causal structure for representing the weak force on the scale experimentally observed.

The Quantum Model shows that when a 6-D centerpoint hits another 6-D centerpoint, the timing of the 4-D field is disrupted and yields scattering data. The space around the centerpoint is 4-D which: 1) minimally interacts with other 4-D fields, 2) is self-referencing within the atom and therefore does not appear to be disrupted and 3) represents positions for 4-D energy transfer which are not visible conventionally.

The Neutrino

The Quantum Model defines the unique six-dimensional singular centerpoint as the probable structure for a neutrino. It is the natural structure at the base of the Quantum Model metric. The neutrino, a six-dimension structure, serves two roles. First, it is the centerpoint of the atom, creating fields and organizing structure.

Second, when free of the atom, the neutrino passes effortlessly through 4-D space and rarely creates a scattering event, except when it hits another, similar scale 6-choose-6 neutrino centerpoint. A neutrino is not self-referencing relative to the 6-choose-4 spaces. A 6-D neutrino is relative "hard" (like a bullet through aero gel). The free neutrino travels at the speed of light following the crest of a single dimension wave.

Dimensions

Four-dimensional space is not simply adding one variable to the conventional 3-D view of the world; rather, it consists of sets of four independent dimensions that do not conform to three-dimensional visualization. While this may appear intuitively divergent from Einstein's math of three dimensions plus time (four variables), it is consistent with experimental measurements. Further, a 4-D space/particle construct would not be visible conventionally.

The Quantum Model provides a unique perspective on most dimension theories, providing a physical structure for the scales of individual strings to the supersymmetric metric of the atom ranging up to 26 dimensions (Table 3). The Quantum Model shows that single strings can be described as changes to one dimension between 4-D triplet axes. Two dimensions are also described by wave sets. Three dimensions describe conventional 3-D vectors, while four dimensions (three plus time) can describe the quantized structure of a photon. Four dimensions also describe confined energy transfers within individual 4-D lattice sets. Five and ten dimensions describe triplet and cones structures (including the flat model of gravity). Six dimensions build the Quantum Model metric and neutrino centerpoint described herein. Twenty-six dimensions of supersymmetry can describe the five 5-D light-cone pairs (plus time).

TABLE 3

Quantum Model Dimensional Structure

| | |
|---|---|
| Force transfer | 1-D/2-D (strings)/4-D (3 + time) |
| Conventional view/Mass | 3-D |
| Occupiable space | 4-D (equivalent to three + time) |
| Particle structure | 5-D/rarely 6-D |
| Helicoid and radical axes | 5-D/rarely 6-D |
| Charge | 5-D based on particle fields |
| Gravity | 5-D (triplets) or 10-D (cone pairs) |
| Atom | 6-D |
| Neutrino centerpoint | 6-D |
| Particle cone pairs - gravity | 10-D triplets or 10 cone |
| Five sets of 5-D triplets plus time | 26-D 15-axis metric, 5 triplets/cone pairs |

The Physical Structure of Mass

Four-Dimensional Energy Transfer

The Quantum Model provides sufficient metric complexity to enable the physical modeling of individual mass-particles and the entire atom. The 6-choose-4 metric creates 15 discrete lattice sets of quantum four-wave intersections nested sequentially around the centerpoint. Further, in the context of axial triplet sets, individual dimension waves provide a mechanism for transfer of energy within closed quantum loops through the metric.

Figure 13:
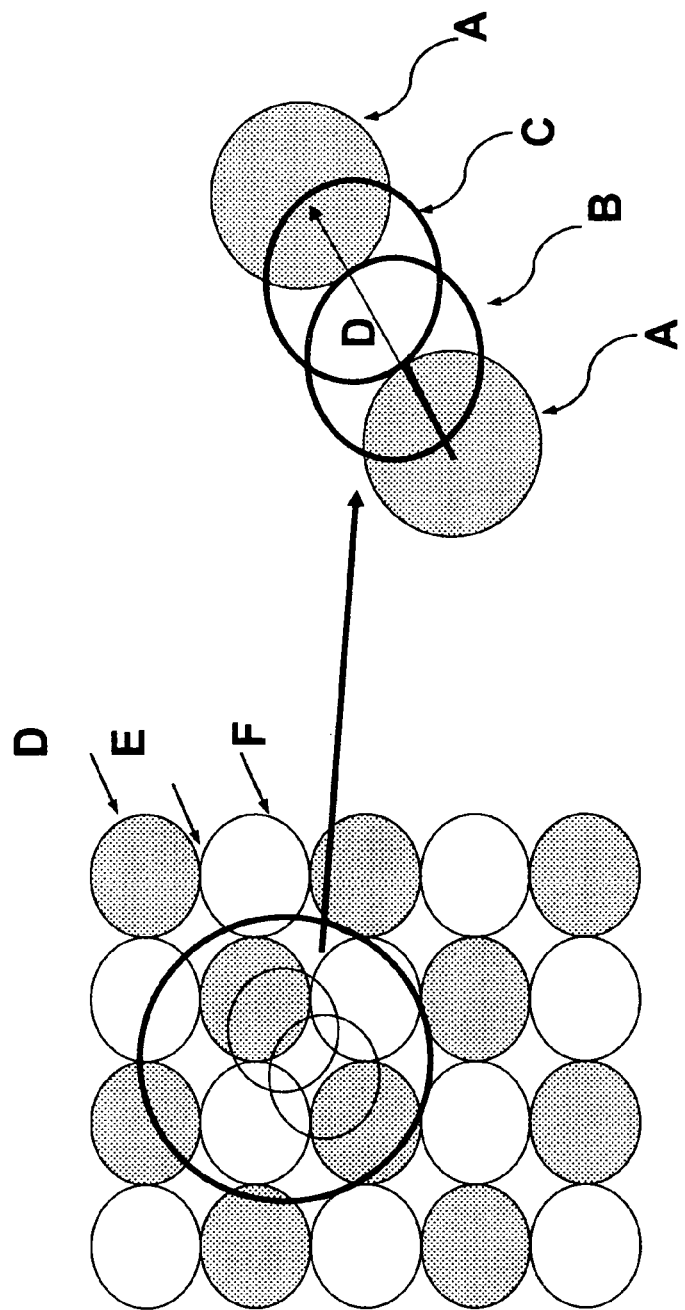
FIG. 13 is a schematic view of energy transfer between two crests points in the ABCD lattice; Letter A, requiring energy transfers between two other lattice sets, ABCF represented by Letter B and ABDF represented by Letter C. The right figure represents a crests D, null spaces E and troughs F in the context of a hypertube field associated with one four-wave lattice set.

The Quantum Model reveals that quantum loops require three sets of 6-choose-4 lattice sets. As shown in FIG. 13, each crest in the 6-choose-4 lattice set ABCD is separated by troughs and null space. Energy transfer from one lattice crest to the next crest in the same four-wave lattice requires the energy to first transfer between the two other 4-D lattice sets within an axial triplet. This transfer is accomplished by sequential single-dimension changes between crests in the triplet lattice sets.

Transfer of energy between nodes (sets of crests or troughs) is always at the speed of light because the changing single-dimension wave is already traveling at the speed of light. The resonant energy associated with the lattice transfer is the same energy associated with photons and the centerpoint. The energy level at any given node within the 15 four-wave lattices is the inverse square of the distance of the node from the centerpoint.

High-density Circle Lattice Sets and Quantum Loops

The 6-choose-4 metric, detailed in Chapter 1, provides a sound foundation for the development of unique sequential paths for energy transfer through the metric. The electromagnetic field is comprised of sequential, nested four-wave intersections. As shown with the Fibonacci seedhead© loop or path alignment begins near the centerpoint and builds outward, transferring through the four-wave intersections. It has been noted that Fibonacci patterns occur throughout nature with the nested patterns theoretically repeating at an infinite number of scales. The 2-D seedhead pattern shown only gives a partial representation of the four-vector metric, although visually it provides clues to metric organization as it reveals partial loops on varying scales. A seminal structure for the closed quantum loops requires a more complete physical model.

Figure 14:
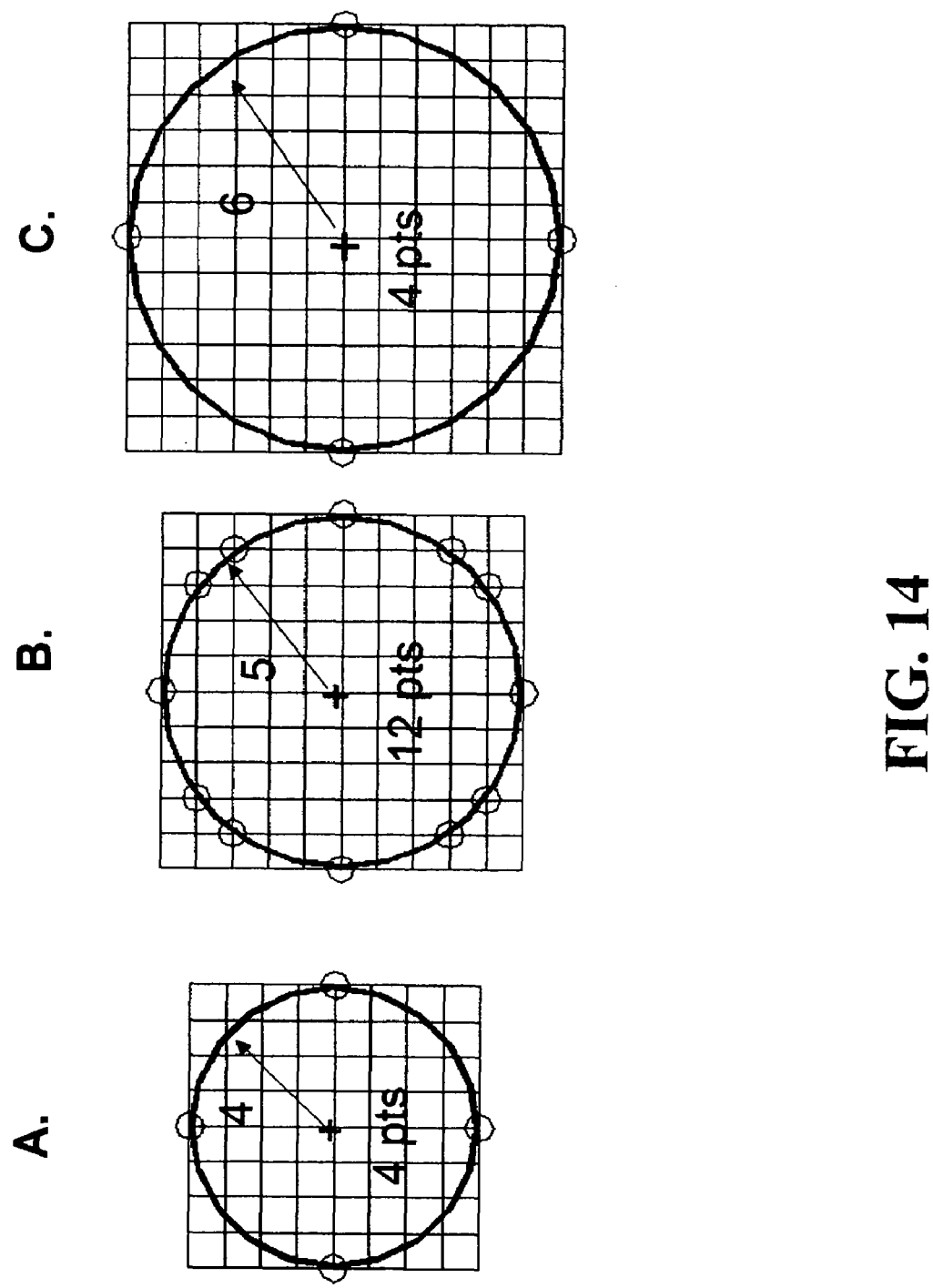
FIG. 14 shows three representative lattice sets that provide natural limits for relative particle hierarchy scales. Letter A represents a circle radius of four with four lattice points on the circle, B represents a high-density radius of five with 12 points on the circle and C represents a circle radius of six with only four points on the circle.

High-density circle lattice sets—It was discovered that high-density circle lattice sets provide the regulation for discrete levels of mass, uniformly consistent between all particles on discrete scales. High-density circle lattice sets occur naturally and include integer radii lattice solutions that lie on a circle (FIG. 14). For example, in a circle of radius five, twelve lattice nodes lie on the circle (a useful high-density lattice set), while using an integer radius of four or six, only four lattice nodes are intersected. Low-energy transfers between 4-D lattice nodes are facilitated when the nodes are closer together. High-density circle solutions provide a unique, quantized, low-energy, closed-loop path with an outward flow and then return of resonant energy.

While the 4-D nodes are "connected" with the circle, each node provides the four-vector quantum view of jumps from point-to-point as required by the Standard Model. The circle radius in this case is not a fixed absolute distance, e.g., five x, rather the radius is measured by absolute wave count, which defines the relative radius. It only indicates a four-wave intersection that is five dimension waves away from the centerpoint. The four-wave intersection naturally requires all four waves to intersect at the nodes on the circle. Shorter or longer waves still meets the definition of relative radius in wave count.

The number of occupiable four-wave intersections on a quantum loop is based on specific high-density integer solutions to circle lattice equations. The path of the confined energy follows these circular paths on each of three axes in the axial triplet (in a 3-D view). The circle having n lattice points, radius r, center (0, 0) is calculated in the following manner:

A. Prime factorization. Every positive integer n>1 has a unique factorization in the form $$n = 2^a (\Pi_{p=1 \bmod 4} p^b)(\Pi_{p=3 \bmod 4} q^c) \qquad (2)$$

Where the p's and q's are prime numbers. Unless specified otherwise, in what follows, p always denotes a prime number of the form 4k=1 and q always is a prime number of the form 4k+3. We shall denote $$P = \Pi_p p^b \qquad (3)$$

B. Expression of an integer as sums of 2 and three squares. For every positive integer n, we write
   a. $r_2(n)$ as the number of pairs of integers (x, y) satisfying $x^2 + y^2 = n$,
   b. $r_3(n)$ as the number of triples of integers (x, y, z) satisfying $x^2 + y^2 + z^2 = n$.

These functions, though known, are very tedious to calculate for lattice points on circles of integer radius; however, the expressions are reasonably simple.

C. Lattice point on circles. The number of lattice points on the circle radius n, center (0, 0), is $$r_2(n^2) = 4\Pi_p(2b+1) \qquad (4)$$

Remark: There is another useful expression, $$r_2(n^2) = 4(d_1(n^2) - d_3(n^2)), \qquad (5)$$

Where j=1, 3, $d_j$, $(n^2)$ is the number of divisors of $n^2$ of the form 4k+j.

As shown in Table 4, the numbers of lattice points for a given radius are presented. At radius of five, twelve lattice points are on the circle. At radius of 25 there are 20 points on the circle. At radius of 65, the first showing of 36 lattice points on the circle appears. Similar counts of lattice points appear at many larger scales, ultimately controlling the generation of larger elements at discrete energy levels.

TABLE 4

Number of Lattice Points on Circles of Radius n < 150
(Radius n = sum of row and column numbers)

|     | 1  | 2  | 3  | 4  | 5  | 6  | 7  | 8  | 9  | 10 |
|-----|----|----|----|----|----|----|----|----|----|----|
| 0   | 4  | 4  | 4  | 4  | 12 | 4  | 4  | 4  | 4  | 12 |
| 10  | 4  | 4  | 12 | 4  | 12 | 4  | 12 | 4  | 4  | 12 |
| 20  | 4  | 4  | 4  | 4  | 20 | 12 | 4  | 4  | 12 | 12 |
| 30  | 4  | 4  | 4  | 12 | 12 | 4  | 12 | 4  | 12 | 12 |
| 40  | 12 | 4  | 4  | 4  | 12 | 4  | 4  | 4  | 4  | 20 |
| 50  | 12 | 12 | 12 | 4  | 12 | 4  | 4  | 12 | 4  | 12 |
| 60  | 12 | 4  | 4  | 4  | 36 | 4  | 4  | 12 | 4  | 12 |
| 70  | 4  | 4  | 12 | 12 | 28 | 4  | 4  | 12 | 4  | 12 |
| 80  | 4  | 12 | 4  | 4  | 36 | 4  | 12 | 4  | 12 | 12 |
| 90  | 12 | 4  | 4  | 4  | 12 | 4  | 12 | 4  | 4  | 20 |
| 100 | 12 | 12 | 4  | 12 | 12 | 12 | 4  | 4  | 12 | 12 |
| 110 | 12 | 4  | 12 | 4  | 12 | 12 | 12 | 4  | 12 | 12 |
| 120 | 4  | 12 | 12 | 4  | 28 | 4  | 4  | 4  | 4  | 36 |
| 130 | 4  | 4  | 4  | 4  | 12 | 12 | 12 | 4  | 4  | 12 |
| 140 | 4  | 4  | 12 | 4  | 36 | 12 | 4  | 12 | 12 | 20 |
| 150 | 4  | 4  | 12 | 4  | 12 | 12 | 12 | 4  | 12 | 12 |

Radius 5, 12 lattice pts
Radius 25, 20 lattice pts

Quantum loops of highest density occur in discrete size levels, usually involving radial multiples of five, and point values divisible by four. The positions of the nodes are not equidistant on the circle.

Quantum Loops—The alignment of the axial triplet and high-density lattice sets creates quantum loops of discrete scales with energy transferring between 4-D spaces contributed by each of the three lattice sets. A full loop uses nodes from each of the triplet's three axes and therefore the resulting quantum loop is five-dimensional. For example: The loop using the triplet axes ABCD, ABCF, and ABDF uses five dimensions, ABCDF within the loop.

Energy travels smoothly between the nodes in a closed path (FIG. 15) as long as the distance between nodes remains below a maximal distance that resonant energy can be transferred across using one dimension. This maximal distance is on the scale of Planck length.

Within particles, the maximal distance occurs naturally at two points: 1) the part of the loop furthest from the centerpoint as the triplet axes diverge and the metric field weaken, and 2) at a point where the natural distance between nodes on the circular quantum loop are farthest apart (they are high-density only, not equidistant).

Figure 16:
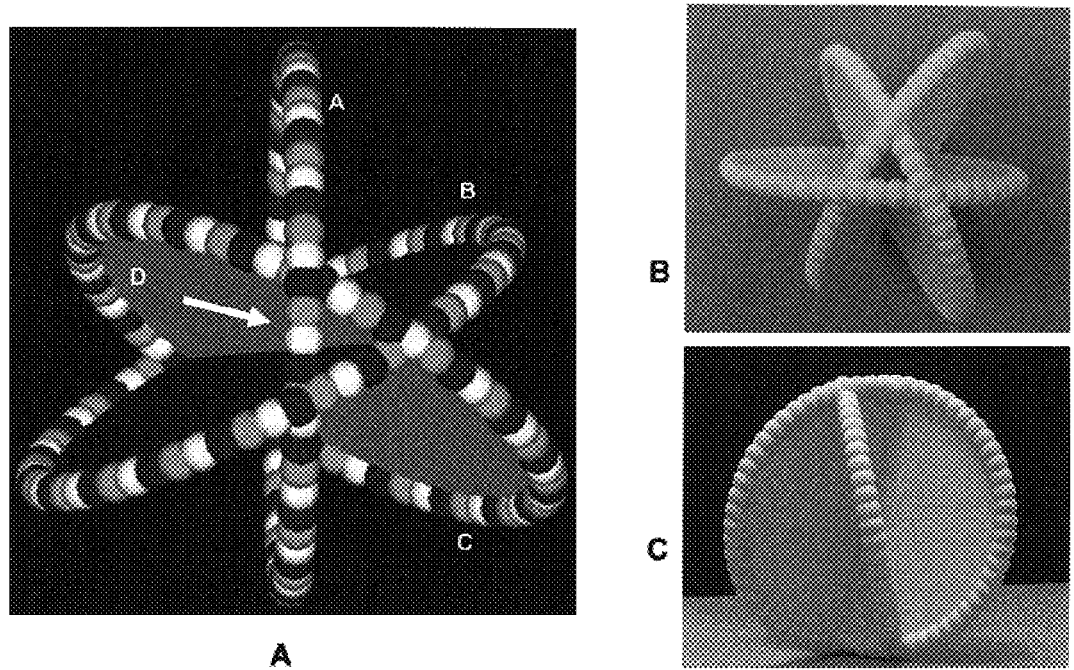
FIG. 16A is a view in perspective showing three quantum loops of the type shown in FIG. 8 forming the 90% overlap spindle torus of a pentaquark. Letters A, B, and C refer to individual quantum loop, which combined represent one quantum loop set. Letter D represents an exaggerated view of the intersection of the three paths straddling the radical helicoid, forming a Reuleaux shape. Energy transfers smoothly within quantum loops using three 4-D lattice sets as long as the distance between nodes is crossable. Three quantum loops comprise a mass-particle. Each loop shares spaces with the other loop, unifying the structure.
FIGS. 16B and 16C represent plasticized plaster models of the quantum loops and the addition of the quantum loop planes.

Three loop mass-particles—Each quantum loop path is built using three sets of 6-choose-4 lattice points. Each particle is made up of three quantum loops (FIG. 16). The paths are naturally related since one path requires alignment of the triplet's three lattice sets; the same sequential and scale alignments spawn the two additional paths within the triplet. Each of the three loops in the completion set is offset by about 120° and tilt based on the sequentially closest node. Each of the three tilting loops has an axis specific starting point. They also have different starting positions relative to the centerpoint.

The three paths share lattice spaces where they cross at both ends of the loops, causing the loops to "straddle" the crossover points sharing nodes with the other two loops. There is no way for the loops to go straight over the "top" and therefore the loops "tilt" left or right from the crossover points. The quantum loops each share a four-space at each end of the mass-particle with the other two loops in the mass-particle. The node count in the loop affects the position of the shared spaces. Higher loop node counts require less path tilting to match nodes in particle loops.

The Spindle Torus Mass-Particle Geometry

A mass-particle is comprised of just three connected quantum loops that naturally align following spindle torus geometry within the axial triplet. A spindle torus is a doughnut with overlapping tubes and no hole. The radii of the loops match the high-density circle lattice sets described earlier. The spindle torus paths yield a mass-particle that appears to be a uniform shell spinning about a definite axis with the majority of the mass held on the complex surface.

Figure 17:
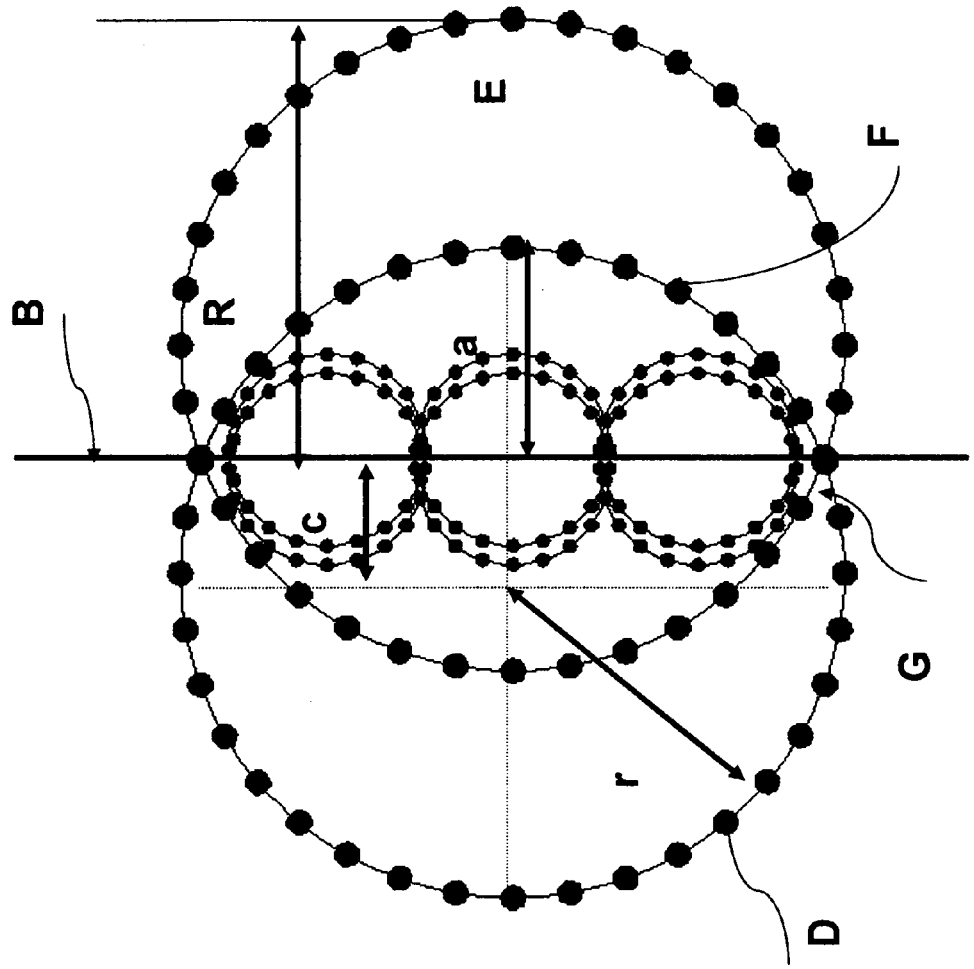
FIG. 17 is a schematic representation of two quantum loops within the spindle torus according to the Model of the present invention. The example shown represents an electron spindle torus D with radius 85, node count 36, and three electron quarks E, radius 25, and node count 20. Letter F highlights the lemon of the torus, Letter R is the radius of the outside of the torus tube from the centerline, r is the radius of the inside of the tube, c is the distance from the centerline of the torus to the center of the tube, Z is the radical center of the torus and G is the intersection of the quantum loops at the end of the spindle torus lemon.

The quantum loops follow well-defined rules for the energy flow through the loops. The centerpoint releases energy outward along its 6-choose-4 axes and builds particles to be nested within bigger quantum loops that encapsulate the smaller particles, e.g., proton loops "cover" quark loops. As smaller particle scales complete, larger ones form over/around the sub particle set outside using larger high-density quantum loops. Each of the three loops shares four-wave nodes, straddling the radical axis, naturally creating a spindle torus (FIG. 17).

As the loops develop, a very distinct spindle torus "apple" and "lemon" character appears. The shape of the lemon is a Reuleaux shape (three-sided football). The multiple flow paths within the torus create intersecting planes within the torus, intersecting at the radical axis of the torus and triplet. The atom's energy is never balanced; rather, there is a constant ebb and transfer of energy within particles in the atom. Within the quantum loops, at any given moment, there are nodes that are unfilled/incomplete or "weak" as well as nodes that are full or otherwise "strong." Photon absorption is an indication of new photons transferring energy into an incomplete system. Equilibration continually occurs between particles through shared dimensions, nodes, cones and through the centerpoint.

A spindle torus is an overlapped doughnut with no hole. The center lens of the torus is the Vesica Pisces or "lemon", the outer surface is referred to as the "apple". The structure for spindle tori is shown in FIG. 17: r is the high-density radius of the inside of the tube; c is the distance from the radical axis centerline of the torus to the center of the tube; a is the radius of the lemon; R the radius of the "apple" or outside of the torus tube from the centerline; the radical axis is the torus centerline, equidistant from each of the three 6-choose-4 axes and quantum loops within the triplet; and, $h=(r2-c2)1/2$. The Model's overlap area is defined as a/r (Table 5).

TABLE 5

Complex Spindle Torus Volumes

| 3-D volume | $W_3 = 2\pi h(2r^2 + c^2)/3 + 2\pi c r^2(\pi - \arcsine(h/r))$ | (6) |
| 4-D volume | $W_4 = (\pi^2/6)(3r - c)(r + c)^3$ | |
| 5-D volume | $W_5 = (\pi r^2/2)(W_3) - (2\pi^2 h^5)/15$ | |
| 6-D volume | $W_6 = (2\pi r^2/5)(W_4) - (\pi^3 h^6)/30$ | |

Figure 18:
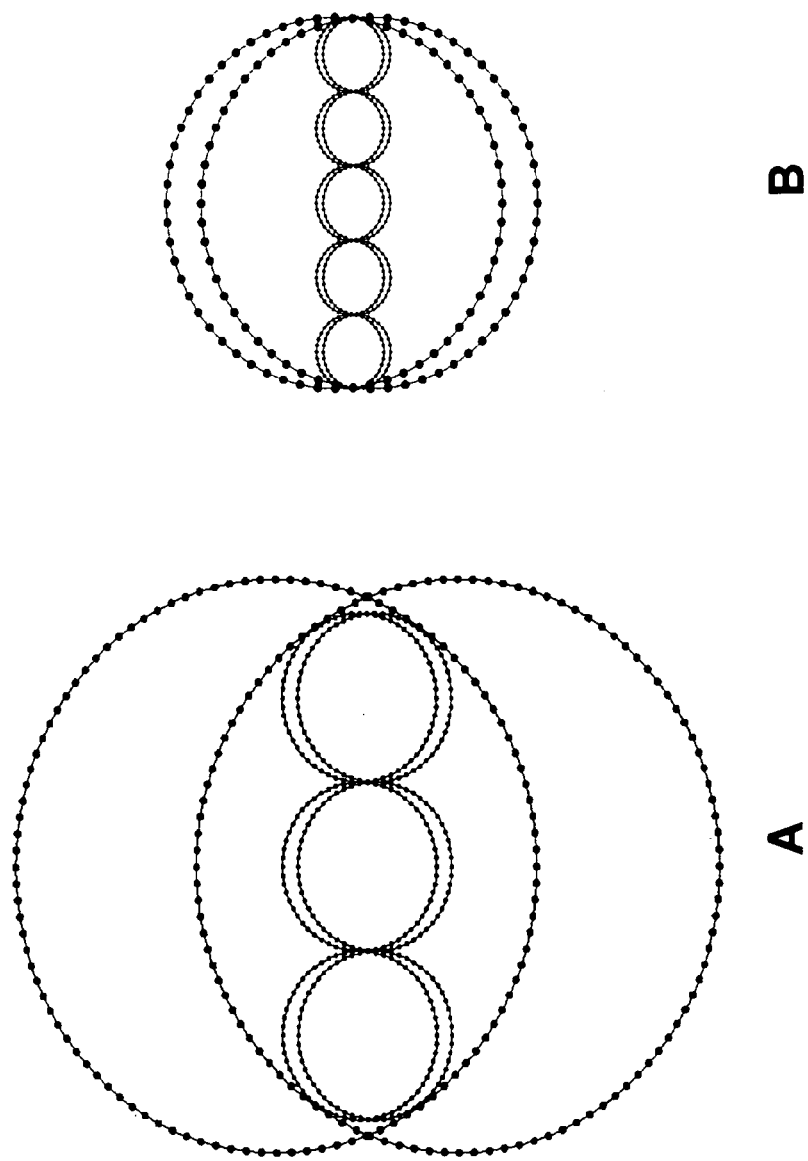
FIG. 18 is a schematic view representing two of the three quantum loops of the proton with three quarks A and the quark with three sub-quarks B.

To determine the scale of particles, the circle radius "r" used for each of the spindle tori as radii for high-density circle lattice sets. Protons, neutrons, and electrons are spindle torus geometry structures confining three quarks (FIG. 18). Quarks have five sub-particles. The quantum loop mechanism is based on transfers of energy through three sets of 4-D lattices and triplet loops describe all mass-particles.

Figure 19:
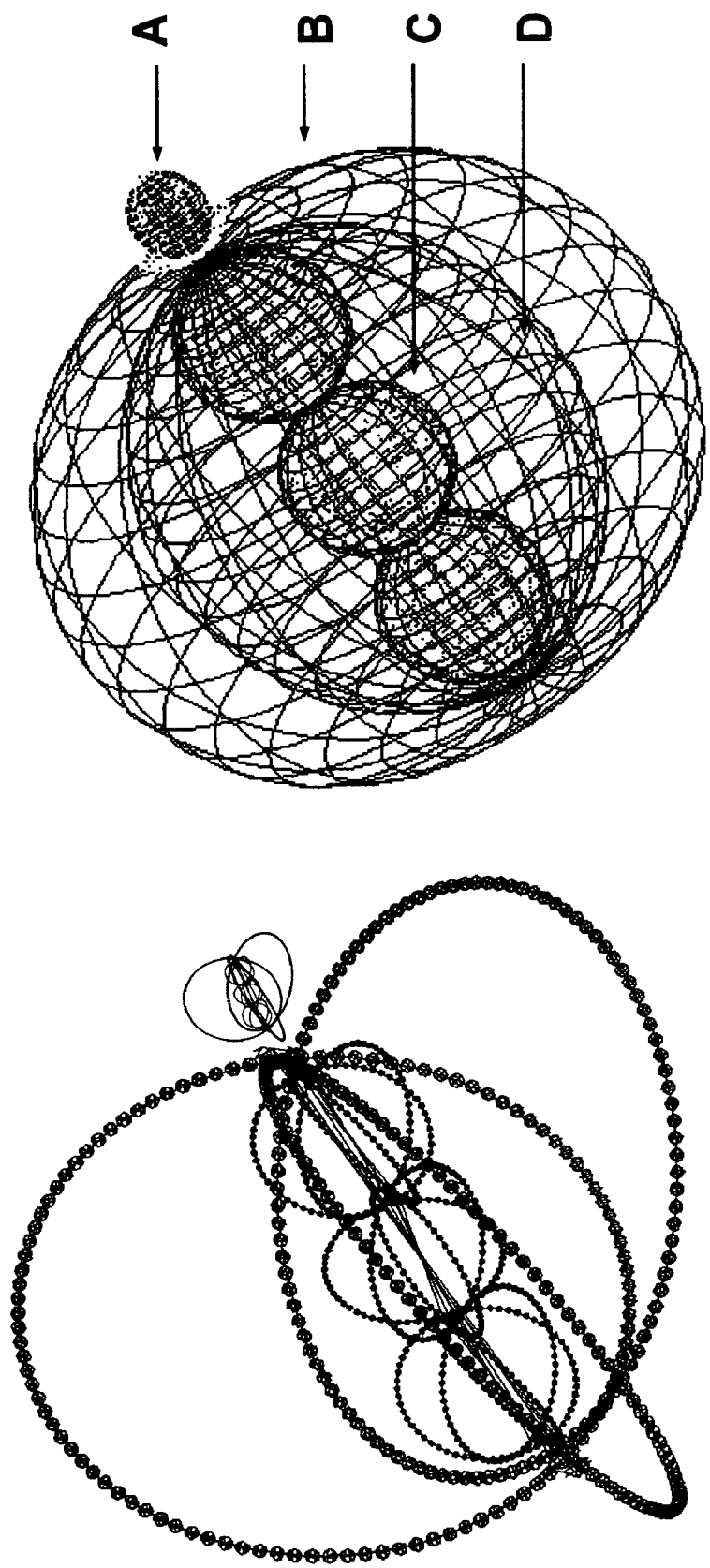
FIG. 19 is a view in perspective of the hydrogen proton and electron modeled according to the present invention. Letter A renders the electron, B highlights the outside of the torus, C highlights the position, and scale of the quarks and D highlights the torus lemon. The hydrogen proton is actually comprised of three intersecting quantum loops, left which confine three quarks. The spindle torus visualization, right, provides the path intersection geometry and makes axial structures physically and intuitively coherent.

The quantum loop structure for the hydrogen proton includes three quarks and the electron (FIG. 19). Hydrogen is most accurately represented as constructed of quantum loops, however, hydrogen is also presented in the Model as a full spindle torus, which gives a better visual representation of the axial structure of the proton and its relative volume compared to the quarks.

Discrete Mass-Particle Scales

The Quantum Model includes the discrete structure of particles from the individual proton down to the individual node. The Model reveals that protons, electrons, and quarks have multiple substructures. The Model is highly accurate in that it matches the scale of the electron to the proton to eight orders of magnitude.

The Quantum Model reveals that while the 4-D electromagnetic field structure is generated by the centerpoint, subtle organization of the field within supersymmetric triplet is influenced by real quantum loops transferring energy through volumetric geometry. That is, all of the field structures for mass-particles and the atom are generated by the centerpoint and quantum loops with real volume. Quantum loop structures fill the space between the electron and the atomic centerpoint, transferring resonant energy through unique 4-D paths.

Each mass-particle trio of quantum loops is organized around the centerline axis of the three triplet axes, otherwise mathematically described as the radical axis. This axis runs in a straight line between the endpoint poles of the particle along the radical axis of the torus and torus lemon.

Figure 20:
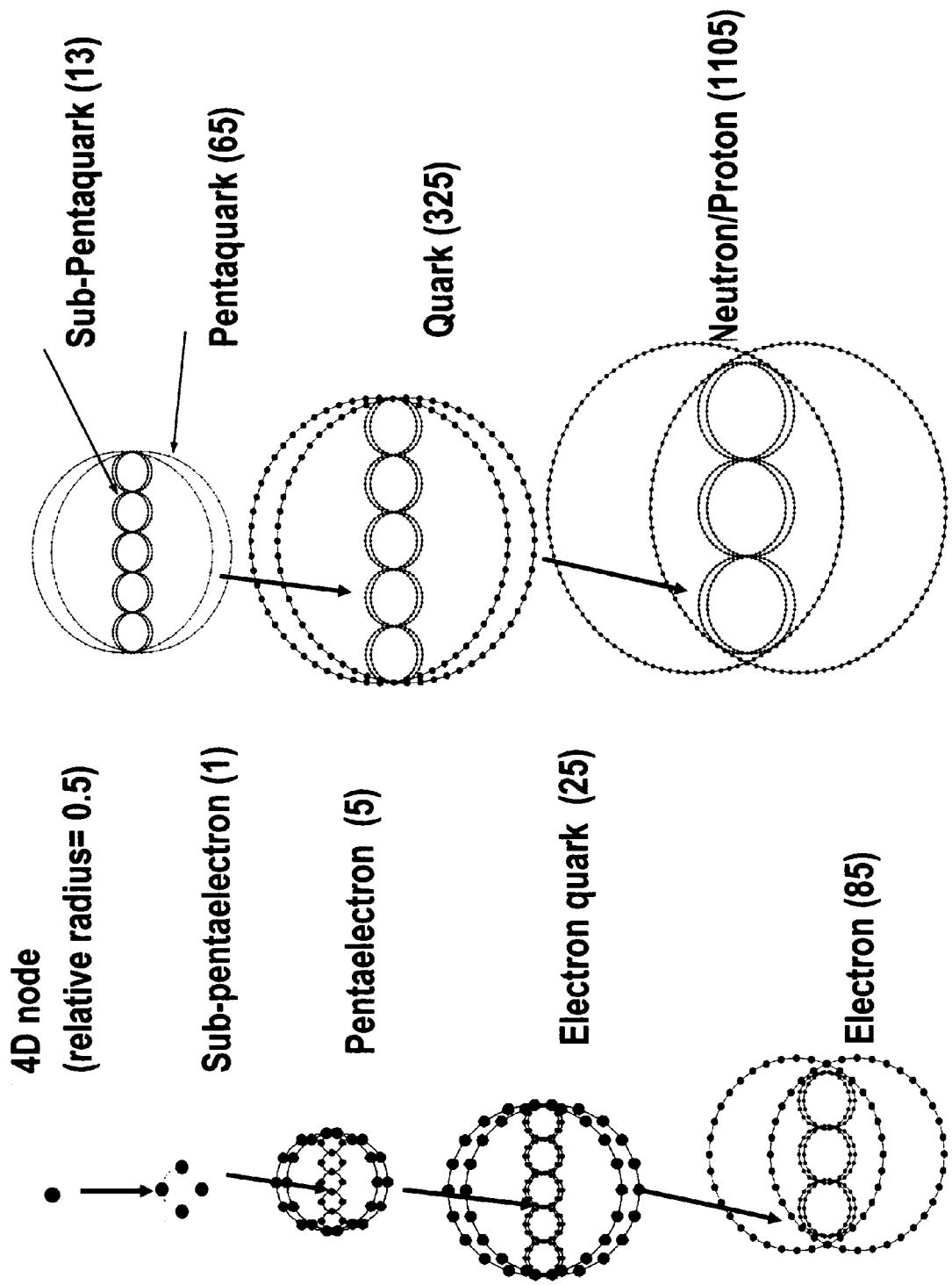
FIG. 20 is a schematic representation of particle hierarchy scales within a single lattice scale. The model represents the following particles from a single node to the scale of a proton, including the "r" relative radius of the spindle torus and respective lattice node count. Major confinement particles are electrons and protons. All particles with a represented five-particle substructure are minor confinement particles.

The Model shows that protons/neutrons and electrons share a confinement structure of three quarks, although on different scales (FIG. 20). The Model also shows that quarks have a five-part substructure. The hydrogen proton (radius 1105) include three quarks (r 325), which each have five pentaquarks (r 65), which each have five sub-pentaquarks (r 13). The Model also reveals that electrons also have multiple quark sub-structures that consist of electron quarks, pentaelectrons, and sub-pentaelectrons.

Some of the mass-particles revealed by the Quantum Model are newly discovered. Shown in Table 6 are the numbers of integer lattice points on the circumference of a circle of radius n with center at (0, 0). Each radius represents important lattice node counts and represent building sets of the high-density among all choices. There have been no skipped values. Additional scale particles are available at many levels of energy and can be created in the laboratory, however, the sets associated with conventional matter and low energy are represented by the base values shown in Table 6. The bolded solutions represent the first presentation of circle lattice sets of that radius among all solutions with no skipped values.

TABLE 6

High-Density Lattice Sets

| Particle | Relative Radius | # Lattice Points on High-Density Circles |
|---|---|---|
| Node | 0.5 | 1 |
| Sub-pentaelectron | 1 | 4 |
| Pentaelectron | 5 | 12 |
| Sub-Pentaquark | 13 | 12 |
| Electron Quark | 25 | 20 |
| Pentaquark | 65 | 36 |
| Electron | 85 | 36 |
| Quark | 325 | 60 |
| Proton | 1105 | 108 |

The proton has a wave radius of 1105 waves and 108 lattice points in one 6-choose-4 lattice. The actual quantum loop uses three 6-choose-4 lattices per quantum loop for a total of 324 nodes per single loop. With three loops per mass-particle, the proton has 972 nodes in total (less six shared nodes). Within the Model, each proton loop is generally shown as 108 points per quantum loop with three different colored loops. This model is portrayed this way for graphic clarity.

Surprisingly, the Quantum Model reveals that the electron and proton are each particles that have similar triplet quark structures. The shapes of the tori are also similar with approximately 65% overlap or a lemon length representing approximately 94% of the torus tube diameter. The radius and lattice node counts for the proton and electron are 1105 and 108, and 85 and 36, respectively.

The relative mass scales for mass-particles are calculated using the volume of the confining torus geometry adjusted for the relative density of the lattice points making up the quantum loops. There are just two adjustments to the raw torus data that are required to calculate the relative mass of particles, 1) the relative node density, and 2) the mass gap associated with the intersection of the quantum loops nodes at the ends of torus lemon.

First, the radius and node count of the particle torus structures reveal the particle's node density relative to its actual torus volume, an important part of calculating relative masses of particles. The relative 4-D node densities (Table 7) reveal that smaller mass-particles have a higher relative node density. This has been translated below into a relative node density factor, which is a function of the raw node count divided by the "r" torus radius and then normalized to the proton.

TABLE 7

Relative Node Density by Mass-Particle

| | Radius | Single Loop/lattice Nodes | 3D Density Node count/ radius Value | 3D Density Density Vs Proton | Intra-mass gap shared node Count |
|---|---|---|---|---|---|
| Proton | 1105 | 108 | 0.097738 | 1.00000 | 1.6 |
| Electron | 85 | 36 | 0.423529 | 4.333333 | 1.6 |
| Quark | 325 | 60 | 0.184615 | 1.888889 | 1.6 |
| Pentaquark | 65 | 36 | 0.553846 | 5.666667 | 1.6 |
| Electron Quark | 25 | 20 | 0.800000 | 8.185185 | 1.6 |
| Sub-pentaquark | 13 | 12 | 0.923077 | 9.444444 | 1.6 |
| Pentaelectron | 5 | 12 | 2.400000 | 24.555556 | 1.6 |
| Sub-pentaelectron | 1 | 4 | 4.000000 | 40.925926 | 1.6 |

Second, intra-mass gap or shared nodes within the three quantum loops are found at the points where the loops intersect at both ends of the torus lemon. Each of the three quantum loops share a 4-D node with the other two loops as they cross. Sharing has the effect of reducing the measured mass of any particle by a determinable amount of −1.6 nodes per 4-D lattice. This is important because the node count and density are the primary determiner of 3-D mass measurements. This phenomenon can also be seen in mass gap loss associated with contiguous axial and mirror symmetric particles.

The rules for intra-mass gap are the same for all mass-particles: at each end of the lemon, the path "ABCD" shares one 4-D node with path "ABCF" and one node with path "ABDF". These are added [(4+4)/5-dimensions=8/5] and multiplied by 2 to account for both lemon ends (8/5*2=16/5). Assuming 50:50 sharing this product is divided by 2 to yield −1.6 unique nodes per quantum loop lost to intra-mass gap within the particle. For the proton, this means a reduction from 108 unadjusted lattice points to 106.4 adjusted lattice points. The electron drops more mass on a percentage basis, from 36 lattice points to 34.4 adjusted points relative to the proton.

The lattice structure for the neutron and the proton are the same. Neutrons straddle the 6-D centerpoint, increasing its loop node count relative to the proton, which contributes to the neutron appearing to have a larger mass. The centerpoint is the origin of the radical helicoid, and is straddled by the quantum loop intersection. This adjustment adds back 6/5ths of a node to the intra-mass gap calculation and thereby increases the path count nodes by +1.2 nodes which accounts for the larger apparent neutron mass.

Table 8 shows some of the variables to determine the relative 3-D masses of these particles. To calculate the node density, the torus r radius is multiplied by the adjusted node count/radius value (less intra-mass gap); the node count is normalized and then simplified to match the simple node count by adjusting for: 1/×2 frequency, the squared radius factor of the Rydberg constant, and the inverse square relationship of node strength relative to the centerpoint (discussed later).

TABLE 8

Particle Surface Density Based on Node Count and Spindle Torus Radius

| Particle | Torus tube Radius | Raw Node count | Intra-Mass Gap Adjusted Node count | Count/radius Scale to Proton Normalized | $(n^4)^2$ Power Mass Adjustment |
|---|---|---|---|---|---|
| Proton | 1105 | 108 | 106.4 | 1.00000000E+00 | 1 |
| Electron | 85 | 36 | 34.4 | 4.20300752E+00 | 1.1965890 |
| Quark | 325 | 60 | 58.4 | 1.86616541E+00 | 1.0811072 |
| Pentaquark | 65 | 36 | 34.4 | 5.49624060E+00 | 1.2373946 |
| Electron quark | 25 | 20 | 18.4 | 7.64360902E+00 | 1.2894732 |
| Sub-pentaquark | 13 | 12 | 10.4 | 8.30827068E+00 | 1.3029832 |
| Pentaelectron | 5 | 12 | 10.4 | 2.16015038E+01 | 1.4682855 |
| Sub-pentaelectron | 1 | 5 | 2.4 | 2.49248120E+01 | 1.4947859 |

Table 9 shows the adjusted volumes of the particles based on the spindle torus volume using radii of high-density lattice sets and adjusted for mass gap and node density.

TABLE 9

Particle Mass Hierarchy Order of Magnitude, Spindle Torus Adjusted*

| | Lattice Points | Radius | Est. % overlap | Adjusted 3-D Volume | 6-D Volume** |
|---|---|---|---|---|---|
| Node | 1 pt | 0.5 | 90% | 5.7743E−10[a] | 4.69E−21[b] |
| Sub-pentaelectron | 4 pt | 1 | 90% | 6.9051E−10 | 3.00E−19 |
| Pentaelectron | 12 pt | 5 | 90% | 8.4783E−08 | 4.69E−15 |
| Sub-Pentaquark | 12 pt | 13 | 90% | 1.3224E−06 | 1.45E−12 |
| Electron quark | 20 pt | 25 | 90% | 9.3073E−06 | 7.32E−11 |
| Electron | 28 pt | 85 | 65% | 5.4465E−04 | 2.07E−07 |
| Pentaquark | 36 pt | 65 | 90% | 1.5698E−04 | 2.26E−08 |
| Quark | 60 pt | 325 | 90% | 1.7144E−02 | 3.53E−04 |
| Proton | 108 pt | 1105 | 65% | 1.0000E+00 | 1.00E+00 |

*Calculated based on spindle torus structure, adjusted for relative node density and mass gap within the particle (less 1.6 nodes). The mass calculation is not adjusted for mass gap with contiguous particles.
**Unadjusted
[a] A single node scale in 3-D (unadjusted) relative to the scale of the proton shows the measured scale of the weak force in 3-D relative to the Hydrogen proton with a radius ratio of 0.5 to 1105.
[b] A single dimension scale matching the scale of a single string to the scale of a proton.

Electron-proton mass ratio—The Model matches the electron-proton mass ratio to eight orders of magnitude based solely on the Model's torus geometry, high-density lattice sets, field density, and intra-mass gap. Mass gap within a particle is based on nodes shared by the 6-choose-4 triplet lattices (Table 10).

TABLE 10

Electron-Proton Mass Ratio in 3-D
Adjusted for Mass Gap and Node Density

|  | Electron-Proton Mass Ratio | Proton-Electron Mass Ratio |
|---|---|---|
| Known Experimental Measurements | 5.44617E–04 | 1836.1527 |
| Model Predicted | 5.44647E–04 | 1836.0522 |
| Difference: Experiment vs. Model ratios | 2.9786E–08 | |

The calculations for the electron/proton mass ratio confirm that mass is measured in three dimensions, energy transfers in four-dimensions, and that the atom is actually a six-dimension structure. The calculations also confirm the structure of intra-mass gap and inter-mass gap as shared nodes.

Neutron-proton mass ratio—The Model also predicts the neutron-proton mass ratio (Table 11). The neutron has extra mass because it is tied to the centerpoint neutrino. The intra-mass gap for the proton is −1.6 shared nodes and for the neutron are +1.2 shared nodes.

TABLE 11

Neutron-Proton Mass Ratio in 3-D
Adjusted for Mass Gap and Node Density

| Experimentally measured neutron-proton mass ratio | 1.001378419 |
|---|---|
| Model predicted neutron-proton mass ratio | 1.001402867 |
| Difference: experiment vs. Model ratios | 2.4414E–5 |

Electroweak Force—The individual node has a calculated 3-D scale of 5.7743E-10 (Table 9), which can be related to the scale of the single centerpoint and the scale of the weak force described in Chapter 1. It is also consistent with the scale of the scattering mass center determined by Rutherford style scattering experiments. The force gets stronger approaching the centerpoint because the metric is tighter as all moments converge and axes converge.

The Model demonstrates definitively that mass is measured in 3-D, which is a function of the number and radius of high-density node points, less shared nodes, within particle completion sets. The quantum loop resident energy in and out of a particle is constantly changing within a 4-D to 6-D context, tightening and loosening the metric and quantum loops. The energy capacity of matched particles are not confined to three dimension measurements as evidenced by atomic excitation states and bonding energies that change field strength, photon frequencies, and influence chemical or biological interactions, but do not affect the mass of an element. The constant flow of energy within the particle structure and quantum loops provides the causal structure for inertial mass and gravity mass calculated as appearing to be the same value.

String scales—There has been the significant scale disparity between the scale of single-dimension force transfer in string theory and the scale of the proton. Strings are theorized to have force transfers starting on scales some 20 orders of magnitude smaller than a proton. In some gauge theories, lattice volumes are described as zero, while other theories declare the smallest material dimension as a Planck length. The Quantum Model shows that the string scale can be related to the scale of resonant energy following a single-dimension transfer and Planck length scales in 6-D down to 4.69E-21 relative to the proton (Table 9). This is the smallest scale of interaction.

Space and time—It should be noted that in the Quantum Model, the backgrounds of space and time are smooth, not predetermined, and do not exist in whole numbers. Time is only forward moving. Four-dimensional, four-vector nodes provide discrete quantization of matter and mass.

The discrete four-wave intersections are responsible for the quantization of space. The formation of a given four-wave node is based on the alignment of four dimension waves emanating from the atom's centerpoint. Four-wave intersections are based on matched integer scales among the involved dimension waves. Four dimension waves interact to form nodes, representing the first material organization of matter. Four waves intersect to form a definable closed space that can hold energy, in fact, containing some of the internally reflective character of the resonant centerpoint. Two aligned waves also interact, creating interference but the geometry of a hypertube cannot confine resonant energy; e.g., phase aligned photon interference in double slit experiments.

Quantum Loop Resident Energy—The Quantum Model introduces the concept of "resident energy." Resident energy is the total level of energy within quantum loops. The tighter the loop, the higher the level of resident energy as the node energy confining capacity is governed by the inverse square rules. Consequently, the energy holding capacity of the loop is limited by its outermost node position and the tightness of the loop. The energy of the quantum loop is not matched to mass and is constantly undergoing equilibration within the atom. Resonant energy within the atom is measured by the strengths of the electromagnetic field, 6-choose-4 axes, and the quantum loops. The strength of the electromagnetic field and quantum loop resident energy within any given atom naturally organizes the location of neighboring atoms. The underlying quantum loop resident energy for each atom has input to the resultant electromagnetic field structure.

The measured mass of a given particle is based on the number of nodes on a quantum loop which can only approximately be represented on a 3-D plot. Regarding energy, however, the tightness of the local four-wave metric defines the quantum loop resident energy of the particle. While four dimension waves are aligned to form an intersection, the closer the intersections are to the centerpoint and the higher the potential energy of the nodes.

Mass-particles in a given atom are not often the same absolute radius, the local metric can be tighter or looser depending on the local environment, or the distribution of resonant energy held within the particle or atom, and the resident energy of an elemental bond. The chemical concept of quantum loop resident energy can be explained in the context of quantum loop and metric changes.

The Radical Helicoid

The radical helicoid is a focus of organization for electromagnetic fields, charge, gravity, and formation of photons. The three rotating planes of the particle's completion sets (FIG. 21) refer earlier create a helicoid through the radical axis of the Vesica Piscis (torus lemon) along the radical axis center of the spindle torus. As each path circulates in sequence, the auger is developed. The helicoid determines handedness for the particle. The three quantum loops within a mass particle always share the same tilt direction under low-energy conditions.

The character of the radical helicoid (twist, scale, and coherence) is determined by the order of the three quantum loops and the sequence, excitement levels, and relative radius of the particle. The relative radius is the metric radius of the quantum loop expressed in dimension waves per unit absolute time or dimension frequency. Since quantum loops constantly change in energy level and therefore tightness, the absolute radius (i.e., wave distance traveled at c per absolute unit time) varies but the quantum relative radius does not, regardless of the metric scale.

For a triplet to transfer energy through quantum loops, the lattice points for a given completion set straddle the radical axis of the torus/axial triplet following the geometry of a spindle torus. These loops each share nodes with the other two triplet lattices. For example, the first lattice points of the proton are at 1.6666° on either side of the radical helicoid within a radius lattice set of 108 nodes/360° (3.3333° between neutron and proton lattice points).

Charge

Charge is the organization of the attractive and repulsive fields associated with the direction of loop's energy flow direction through the spindle torus lemon. Every mass-particle has positive and negative poles (FIG. 22).

Mass-particles automatically exhibit a left-handed or right-handed spin as the result of the tilt of the quantum loops straddling the radical axis. (Not to be confused with spin-spin associated with the sweeping of a dimension wave.) Each mass-particle has inherent left or right "rotation" built into it based on disturbance to the EM field by resonant energy flowing through the quantum loops which are tilted relative to the radical helicoid.

At low energy, quarks and sub-particles eventually clear due to incongruent energy flow directions with the confining particle loops. Sub-particles can be "reconstituted" with sufficient applied energy.

It must be said that the electromagnetic field is fully involved in establishing a quantum loop. A loop is not an arbitrary path, rather, each of five dimension waves have to align and maintain a regular periodicity (or whole multiples in the case of excitation). The loops stay within their 6-choose-4 metric triplets on the scale they were initially formed. The exclusionary character of quantum loops ensures that mass-particle loops do not cross directly through each other's triplet four-space (Pauli exclusion). Even if loops from different triplets pass by each other, they do not cross in the same four-space and the metric always remains self-referencing based on the contribution of each dimension to multiple four-wave sets. Likewise, larger loop scales in the same triplet are exclusionary.

Magnetic moment—The magnetic moment is determinable without perturbation or uncertainty and is calculated to be 1:2197 for the electron-proton ratio based on the raw, unadjusted quantum loops and torus geometry in 3-D (Table 12). The energy calculation is then broken down to cover 4-D energy transfer and 5-D particle field generation.

The raw geometry of the quantum loop intersections and the node density generate the field and define the magnetic moment of the mass-particle. Magnetic moment is currently viewed as a rotation based on a 2-D view from outside of the atom. The Quantum Model describes the path's full 3 by 4-D geometry not only representing the quantum loops straddling the radical helicoid, but flowing outward and back inward from the centerpoint, with no uncertainty required.

TABLE 12

Magnetic Moments Relative to a Proton

|  | Radius* | 3-D | 4-D | 5-D |
|---|---|---|---|---|
| Proton | 1105 | 1.00E+00 | 1.00E+00 | 1.00E+00 |
| Electron | 85 | 4.55E−04 | 3.50E−05 | 2.69E−06 |
| Quark | 325 | 1.59E−02 | 4.43E−03 | 1.25E−03 |
| Pentaquark | 65 | 1.27E−04 | 7.09E−06 | 3.99E−07 |
| Electron Quark | 25 | 7.22E−06 | 1.55E−07 | 3.36E−09 |
| Sub-Pentaquark | 13 | 1.02E−06 | 1.13E−08 | 1.28E−10 |
| Pentaelectron | 5 | 5.77E−08 | 2.48E−10 | 1.08E−12 |
| Sub-pentaelectron | 1 | 4.62E−10 | 3.97E−13 | 3.44E−16 |

*Hydrogen

The actual transfer of energy that generates the moment is based on the quantum loops and can be calculated within 6-choose-4 triplets. Further, the density of the shared nodes at either end of the particle lemon is popularly described as the theoretical location of the magnetic monopole. The magnetic monopole is not a particle; rather, it is the convergence of the quantum loops over the spindle torus, straddling the radical axis.

The Model includes that the dipole moment per unit spin angular momentum is twice the unit orbital angular momentum because of the doubled-over quantum loop in 4-D and that each dimension has two dimension waves to offer for each full sweep of the dimension about the centerpoint.

The quantum loop flow direction of mass-particles alternates between confinement levels (FIG. 23). The substructure is always an odd count such that the confining structure apparent charge and flow direction is opposite to the first and last sub-particle. For example, the first and third quarks are in the opposite direction from the confining proton loops.

Mass-Particle Axial and Mirror Symmetry

The Model defines two types of symmetry: mirror and axial. The axial triplet and 6-choose-4 structure account for atomic symmetry as shown in FIG. 24. While this type of symmetry is well understood in chemical bonds, it is a novel construct offered by the Quantum Model and related directly to the supersymmetrical organizational structure of the 6-choose-4 metric and axial triplets.

Mirror symmetry is symmetry on the same side of the axis. Protons/neutrons and axial triplet groups of quarks are examples of particles exhibiting mirror symmetry. Mirror particles share nodes.

Particles easily form through mirror symmetry as the result of sequential transfer of energy through shared 4-D nodes. If the metric is sufficiently organized and strong, a minor change in one of the dimension wave periodicity or position at the right moment can create a new mass-particle that shares a node with the original particle. Maintaining all other variables causes the path to come back to itself.

It is important to note that both the charge and spin of contiguous mirror particles is in opposite directions. The loop path in the mirror particle tilts back to across the radical axis and the contiguous particle now has an opposite energy flow path direction and spin to the originating particle.

Axial symmetry is symmetry on opposite sides of the centerpoint within the same axial triplet or light-cone. The axial sequence is inverted on opposite sides of the centerpoint. The axes within the triplet cross over at the centerpoint, underpinning the framework for equal and opposite symmetry, handedness, entanglement, and field effects. Axial symmetry is shared through the centerpoint. When the axes invert, so does the helicoid sequence, yet the axis-toaxis sequence remains the same. Axial symmetric particles have opposite handedness as the result of axial sequence changes across the centerpoint.

Matter tends to form within doublet, triplet, and quintuplet particle sub-structures within the context of the axial triplet. There are numerous relationships between position of the different particles and the resonant properties they develop. The character of each sub-particle is based on the relative positions and energy flow involved: mirror or axial. Mirror alignment (para) of two particles takes less energy than axial alignment (ortho) since mirror particles share quantum loop nodes.

Particles can form from "scratch" building from the neutrino up to a proton by hierarchal steps, or a particle can form from contiguous particles matching the scale and geometry of the original particle within the range of its electromagnetic field.

Entanglement is the alignment of axial or mirror symmetric particle pairs. Change the character of one mirror/axial symmetric particle within the atom and the field changes on both sides of the triplet. The spin and character of a photon or particle is always determined within the construct of the triplet. Even at a distance, particle axial alignment is expressed using the triplet structure.

Mass Gap and Shared 4-D Nodes

The Model sets out parameters for two kinds of mass gap: 1) intra-mass gap (FIG. 26), where the quantum loops within the single mass-particle share nodes among the three quantum loops, and 2) inter-mass gap, where contiguous mirror symmetric particles and confined particles share 4-D nodes (FIG. 27). Mass gap and confinement are both a function of quantum loops sharing contiguous 4-D nodes in their respective loops. Within the mass-particle, quantum loops share nodes as the three quantum loops intersect at the ends of the torus lemon.

Mirror particles share nodes accounting for the more traditional view of mass gap. Mirror symmetry particles share nodes on their respective quantum loops. Axially symmetric particles only share the centerpoint.

The Strong Force

Sharing nodes is the focal point of the strong nuclear force within the atom. The organization of the sweeping dimensions and the resulting subtle organization of sequential points in the metric provide the opportunity for the node to be shared between quantum loops. The strong force gets stronger at closer distances because of the organization of metric is more than just the shared node.

At least one node per 6-choose-4 lattice is shared between mirror symmetric particles, accounting for mass gap. The scale of the strong force is significant. For example, of the proton's 108 nodes in one 4-D lattice path, the proton's quantum loop of 108 nodes shares one node with the quantum loop of the neutron; or 0.94% (1/106.4) of the respective paths. The interlocking system of energy flow through quantum ensures the durability of protons even without dependence on the neutrino; e.g., hydrogen.

Confinement—Major and Minor

There are two classifications of mass-particle confinement defined by the Quantum Model: (1) major confinement, and (2) minor confinement. Confinement is the structure of smaller particles sharing four-wave nodes and spindle torus geometry confined within the lemon of the spindle torus. Major and minor confinement structures have sub-structures of odd numbers of sub-particles.

In order to confine a set of quarks, for example, the larger quantum loops of the proton must be directionally aligned (flow and tilt) with the first and third quarks to create confinement. This requires that the first and last positions of the confined sub-particles have to have the same node sequence and match the geometric position for shared nodes with the proton loops. Low energy scales are the most revealing for the atom's structure since almost any scale/structure particle can be made at high energy in the laboratory (numerous quantum loops exist at higher energy and mass scales and larger relative radius, e.g., top quarks).

Major confinement—Major confinement (e.g., electrons and protons) is where three sub-particles align inside of the torus lemon (FIG. 28). The ratio of the radius of the proton to confined quarks is exactly 3.4 to 1. The length of the lemon is approximately 94% of the diameter of the torus and the torus overlaps at about 65%. The percent overlap will vary. These are very stable confinement structures, because the quark quantum loop positions for the first and third quarks match the node position and resident energy flow direction for the proton loop, with no direct escape to the outside of the particle. The Reuleaux lemon structure provides tremendous conformity (straight) to the radical axis and helicoid for particles and sub-particles.

The scales of the quark loops fit perfectly within protons, neutrons, and electrons. The energy flow direction through for the first and third quark is opposite that of the center quark and the proton loop. The mirror symmetry tilt of the first and third quarks match the proton while the center quark has mirror tilt and the same flow direction as the proton loop. The inner flow and apparent charge of the first and third quarks is conversely opposite of the proton or electron. Therefore, the charge of the center quark is the same as the proton or electron. This structure sheds significant light on apparent quark charge within a proton, for example.

Minor confinement—Minor confinement is quark and sub-quark confinement where five sub-particles share the lemon of a torus particle. The radius of the torus tube to the sub-particles for a minor confined particle is exactly 5:1. Pentaquarks have a lemon length of about 99.6% of the diameter of the quark torus tube, or 90% overlap. The quark confines the pentaquark at the quark's 3° node point, matching the geometry and sharing nodes with the first and fifth pentaquarks at their 15° node points, yielding a total lemon length of 99.6% or 90% overlap (FIG. 29).

What is remarkable about the pentaquarks, however, is that the first and the fifth pentaquarks have a lattice point node at 5° that are not shared with the quark loop, placing pentaquark nodes actually outside the quark. This structure accounts for the lack of confinement and short stand-alone quark and sub-quark lifetimes relative to the proton.

Five pentaquarks of radius 65 would appear to not fit within a spindle torus with a quark tube radius of 325. However, the positions of the nodes within the sub-quark loop straddle the centerpoint and the first node is therefore not directly at the top of the loop, but offset by several degrees. The sub-particle paths are each tilted back and forth across the radical axis, further shortening the lemon length to 99.6% of the torus. Both of these factors allow the minor confinement of these sub-particles within an exact 5:1 quantum loop ratio.

The negative pole of the electron naturally aligns with the positive pole of the proton, although the relationship is not confining (FIG. 30). Electron positions are lost when the energy flow and sequential positions of the proton loops is either too excited or disrupted and quantum loop fields or axial alignment are disorganized (e.g., in the case of plasma).

Mass Four-Wave Model

The four-dimension Julia fractal provides a useful model for single dimension changes creating an occupiable 4-D space for the resonant energy associated with mass. As the four variables of the Julia fractal shift into position, it creates a complex 4-D space (FIG. 31). Disconnection describes energy transferring in or out of the connected node space. The formation of the space and energy transferring in and out of the node can be described with the Julia fractal as the fourth wave enters the space and the fractal moves from being disconnected to connected. As the resonant energy leaves the fractal disconnects again. Connections and disconnections are analogous features of string theory "pants" to describe energy transfer between single dimensions.

There are several factors that are important about the math used to represent the transfer of energy. The Julia Z Power fractal is $Z_{n+1}=Z_n^2+K$ where K is a fixed complex number and where $Z_n$ does not equal infinity.

$$J=\{c \in C | \lim(n \to \infty) Z_n \neq \infty \text{ Where: } Z_0 = c\} \quad (7)$$

$$Z_{n+1}=(Z_n)_2+K$$

The Julia set represents a four-wave intersection, a point, which spontaneously appears, and fills in with resonant energy. The Julia fractal also provides clearer descriptions for a "curled" or iterative space as reservoirs of potential energy. The Julia fractal set represents the math for the smallest occupiable 4-D "space" associated with mass and quantum loops and is an essential regularizer of matter.

In accordance with the Model, potentially occupiable nodes form and disappear sequentially as dimension waves leave the centerpoint. Depending on the sequence, energy transfers classically from one node to the next. Four-spaces form and disappear spontaneously throughout the metric.

A map of the contributions of one-dimension wave within the axial triplet and the occupiable positions of the quantum loop can be modeled as a wave (FIG. 32). The period of the individual dimension are shown through a cycle of crests and troughs with the Julia fractal cycling through connection and disconnection.

The Julia fractal also illustrates that each of the three quantum loops within the particle is made up of five-dimensional sets of periodicity (FIG. 33). Within a particle or photon, a single wave dimension occupies two or three full nodes. In other words, a photon fully occupies at least two points and sometimes three points in a single quantum loop at any given time. Further, the Model includes involvement of an advanced "wave" where the fractal is reconnecting about one-third of a wave ahead of the first node (Julia Z power fractal i value of 0.665, 0), consistent with Bell's observations. Disconnection also is exhibited as a one-third trailing wave of similar magnitude.

Within a metric, quantum loops can have a range of geometric organization related to its level of resident energy and the state of the Julia fractal (see FIG. 31). Just above mathematical disconnection, e.g., 0.665 to 0.799 (FIG. 31A), the quantum loop transfer between nodes can be described as narrow, and easily disjointed. Between imaginary values of 0.800 and 1.000 (FIG. 31B) the loops are fatter with relatively fewer transfers from node-to-node, and less likely to be interrupted. When a centerpoint is moving, and metric parameters are changing, the loops are more likely in the range of disconnection. As the metric tightens, the loops are in the higher range of connection and nodes hold higher levels of resonant energy.

In the Model the dimension wave is considered a real wave without imaginary variable or reverse-time implications. This interpretation allows the causal definition of a specific point in space relative to the centerpoint, at a given time, overcoming limits imposed by both the transactional and Copenhagen interpretations. While this discussion is normally reserved for light, it is a function of 4-D transfer from node-to-node whether in a photon or in a quantum loop.

The Mandelbrot fractal equation is closely associated with the Julia fractal and is useful for descriptions of 6-choose-2 interactions. The 2+dimension Mandelbrot fractal describes the interaction of any two matched dimension waves associated with matter, including photon interference patterns when photons are phase aligned in double slit experiments. Photon patterns are based on the frequency of the interacting dimension waves. The Mandelbrot equations define the structure of the 4-D Julia fractal "space" as connected, disconnected, or changing depending on the variable's position inside, outside, or on the Mandelbrot borderline, respectively.

While the transfer of resonant energy from one point to the next in connected loops is a basic rule. Resonant energy transfers to the next closest position through one-dimension transfers, consistent with the one-dimension foundations of string theory at Planck scales.

The quantum loop transfer of resonant energy outward from the centerpoint may appear simple enough with the next closest position following a wave already moving outward. The transfer of resonant energy back inward to the centerpoint is also based on transfer to the next closest four-wave intersection; however, the next closest sequential position is backward and inward. This transfer, in the absence of an elemental bond, requires the individual dimensions to sweep (even slightly) so the sequential inward positions are available and are closer than the outward positions.

If the resonant energy does not eventually transfer, that is, if a sequential node is not available, the node will stay resonant, in place, for a brief period and the resonance will either 1) move forward, or 2) reverse back downward to the centerpoint, or 3) dissolve to the background, or 4) excess resonant energy is often released as photons. The iteration mechanics of the Julia fractal, and in particular, the use of the borderline (inside, outside, or on the borderline) provide a mathematical description for the internal reflectance.

The Physical Structure of Atoms

The Axial Alignment of Mass-Particles

As disclosed earlier, the electromagnetic field is generated by the resonant 6-D centerpoint. Quantum loop transfers of resonant energy through the electromagnetic field define discrete mass-scales and field characteristics, including spin, charge, and moment. Three quantum loops per mass-particle extend outward from the centerpoint and return ultimately through the centerpoint in closed loops that intersect near the positive and negative mass-particle poles. Each mass-particle quantum loop follows a unique path based on the unique sets of four-wave spaces in the quantum loop set. These loops are axially organized about a straight centerline or radical axis between the positive and negative poles of each mass-particle.

Mass-particles are axially organized within the axial triplet and the ten light-cones (FIG. 8) associated with the 15 6-choose-4 axes. The supersymmetric four-wave metric provides the natural self-referencing lattice structure in which quantum loops associated with mass are organized. At its most fundamental level, particles organize within triplets of 6-choose-4 sets of four-wave intersections. Resonant energy, originated from the centerpoint, is transferred through quantum loops following sequential four-wave intersection sets and one-dimension transfers between four-wave nodes.

The radical axis of a mass-particle (FIG. 34) is aligned with the radical axis of the 6-choose-4 triplet and associated supersymmetric light-cone structure. Even though none of the quantum loops actually pass through the radical axis, the loops closely straddle the radical axis. The radical axis under ideal conditions is perfectly straight.

The radical axis can become "bent" when the conventional spin of the atom, or excitation of a single dimension, prohibits sequential transfer between nodes, or when the loop itself holds insufficient energy in its nodes to maintain its quantum loop path. For a quantum loop to be sustained, it had to stay within the maximal transfer distance usually restricted to an absolute radius.

Protons, Neutrons and Electrons

In a departure from the Rutherford centerpoint mass model, the Quantum Model shows that the space between the centerpoint and the electron is the home of mass-particle quantum loops through the electromagnetic field. Further, the electron's position is a resultant of the positions of the quantum loops. While mass is directly affected by changes to the centerpoint, the loops themselves are the basis for subtle field organization and the conventional volume associated with mass.

Axial alignment is fundamental to the organization of atomic particles, the expression of charge, and the generation of fields. The Model shows the axial structure of the neutron and proton pair and the mirror symmetry of the particle pair (FIGS. 35 and 36). The neutron and proton pair has the exact same quantum loop structure and share the same axial triplet set and lattice scales. Within the pair, both the neutron and proton radii have 108 nodes within their quantum loops and follow the same spindle torus geometry. The proton and the neutron quantum loops each share a node, the lemon flow of the loops is opposed, and particle spin is opposed, consistent with mirror symmetry.

The neutron has no apparent charge because the attractive side of the particle is tied to the centerpoint. The neutron's lemon flow direction is always outward, away from the centerpoint as a result of the sequential build-up of subparticle quantum loops. This configuration makes the neutron have no net apparent charge. The proton, on the other hand, has flow through the lemon inward with the attractive or positive pole exposed, holding the negative end of the electron.

Protons and neutrons use the same number of nodes within high-density lattice sets, 108. There are several differences between neutrons and protons: 1) the centerpoint acts as an extra point in the neutron node set; 2) the neutron's attractive charge is tied to the centerpoint, effectively negating its visible charge, 3) the proton's attractive charge is tied to the electron, 4) the neutron has a tighter relative metric scale compared to the proton within the same lattice set as it's lattice set solutions are closer together than the proton, and 5) the neutron draws energy from the shared centerpoint and consequently is the primary equilibrator of energy in the atom.

The neutron has a smaller radius by approximately 15.2%, compared to a proton measured in 3-D within the same axial triplet lattice set as evidenced by relative magnetic moments. This scale difference is a result of the metric being tighter closer to the centerpoint as the 6-choose-4 lattice sets converge. The neutron has to reduce in size before a proton can be added to the triplet because the four-wave metric diverges outward away from the centerpoint. The proton cannot form until the quantum loop's distance between all nodes is within the maximal distance between nodes that energy can transfer across. This also explains why neutrons are often added (costing less energy) before additional protons.

The flow of resonant energy through the proton and neutron follow the rules of mirror flow. That is, the flow through the respective torus lemon is opposed and the spin of the particles is opposed.

Neutrons within a triplet share the centerpoint, although each has its own path. While the positive end of the neutron is attached to the centerpoint, it is not a position that can exhibit charge since the triplet crossover is at the centerpoint. The flow of resonant energy through neutrons on opposite sides of the centerpoint is opposed in sequence as a result of the alternating reflected waves generated from within the centerpoint. Neutron/proton pairs form on both sides of the centerpoint within a common axial triplet and metric scale.

Base Ten Light-Cones More Magic Numbers

It is important to discuss the conceptual equator at this point highlighted in FIG. 8. While there is no official starting point within the metric, once the first triplet or light-cone has been established (with spin "up", +, and spin "down", -) the orientation of the remaining triplets and cones is determinable. As shown in FIG. 8 light-cones contiguous to the first "up" light-cone are all spin "down" and conversely, all cones contiguous to the spin "down" cone are spin "up". This rule directly applies to the first ten atoms and with additional rules applies to the remaining periodic table.

The atom has a shell structure based on the supersymmetric structure of ten light-cones. As the Model will show, Major cone levels are full at the 10, 40, 70, 100, and 130 levels (FIG. 37). Minor cone levels are in sets of ten corresponding to the number of base triplet cones in the atom. While each cone does not fill in order, the structure highlights islands of stability and the mechanism for magic numbers, e.g., the concentration of iron 56 with 30 neutrons or the decay of potassium 40 to argon 40. The sequential order of protons and electrons is organized by the supersymmetric metric, the base ten structures, the conceptual equator, and the selective influence of a single dimension over only 4 of 5 triplet sets.

Metric Tightening

Higher levels of resonant energy tighten the metric, the quantum loops, and the centerpoints. As the metric tightens to specific levels, additional quantum loop paths become possible to add to the atom. As energy is added to quantum loops, they become smaller and tighter. It is important to note that adding energy to an individual node or quantum loop, or changing excitation levels or temperature does not affect the 3-D measurement of mass; however, as the metric adds more energy, the quantum loops and centerpoint get smaller and tighter (FIG. 38).

Metric tightening is accomplished by adding absorbable photon energy to the atom below levels associated typically associated with heat for an extended period of time. Heat adds chaos and does not contribute to metric tightening. A tighter metric has several advantages over a looser or softer quantum structure, including:

smaller radius quantum loops are more likely to absorb and hold photon and bonding energy, shorter gaps in the quantum loops mean the loop is less likely to be obstructed, result in a stronger field, energy transfers more readily with a wider range of elements resulting in improved bonds and greater quantum loop resident energy storage, In addition, the quantum loops are compact and defined vs. loose and diffuse.

Protons in different elements are not all the same size or energy level, although mass measurements in 3-D are consistent. Free protons are similar in absolute radius. All particles of major confinement with 108 nodes are described as a proton, regardless of the radius of the lattice scale from which they were formed. Metric tightening has been observed in recent experiments where adding a lambda 7 particle to a lithium nucleus tightened the radius of the atom by 19% (Tanida, K., et. al., "Measurement of the B (E2) of Lambda 7 Li and Shrinkage of the Hypernuclear Size," Physical Review Letters, 86, 1982. Print issue of Mar. 5, 2001).

The only limiting factor to successful determination of a quantum loop is a maximal distance between nodes that energy can be transferred across. Within a tightened metric, a new particle can form when the scale of the existing mass-particle absolute radius has reduced to the point where the next largest radius particle can form within the distance constraints of the maximal distance rule. Using protons as an example, the new 108-point proton will have the same three-dimensional mass value and a similar absolute radius, despite having a larger relative radius measured in dimension waves per unit time (FIG. 39). This accommodates nesting of protons on successive scales within a single atom, while always measuring mass of each proton as about "one". Metric tightening is inherently asymmetric as resonant energy from the centerpoint and quantum loops disturb the local field strength and ability to transfer energy or equilibrate.

Mathematically, there are numerous lattice circle solution sets that provide a 108-point lattice solution with appropriate matching quark substructures. The relative radius scale of the lattice is different and definable for each axial triplet set. A neutron/proton pair must reduce in size to add additional proton/neutron sets to a cone. In sequence, to add another proton/neutron set, the metric has to tighten further. The tightening structure does not collapse to zero since there is natural lattice spacing within dimension waves and four-wave intersections. While massive amounts of energy can be stored as structure tightening is close to infinite, lattice spacing within the particle is maintained. The Julia fractal is an iterative complex system (similar to "curled-up" string language) that has tremendous energy-holding power in four dimensions.

New quantum loops within triplet sets matching the lattice count and relative radius of the proton occur at discrete scales. Table 13 shows the relative radius of each quantum loop for pentaquarks, quarks, and protons by axial triplet set. When one quantum loop path is used, a new path based on a larger lattice scales is added. Each newly added proton or neutron has its own set of sub-particles, including quarks and pentaquarks. The relative radius of a proton does not change its 3-D mass measurement only the 5-D energy level as the radius tightens.

All successful particles with circle node count of 108 nodes are considered a proton regardless of the metric scale or relative radius. The table shows that the relative radius in dimension wave units for a hydrogen proton is 1105 dimension waves. The relative radius of the last proton in Iron is 9605. Both are considered protons and are of similar absolute physical scales in meters. Not all paths with 108 lattice points can be protons because some do not have the required substructure set confinement parameters (e.g., relative radius 2210, 108 nodes). Similarly, all particles with lattice circle solutions of 60 nodes are considered quarks, regardless of relative metric scale.

TABLE 13

Proton Scale Sets - Torus Relative Radii "r"
Measured in dimension waves per unit time

| Triplet Number | Pentaquark 36 nodes | Quark 60 nodes | Proton 108 nodes | Proj. Elemental Scale |
|---|---|---|---|---|
| 1 | 65 | 325 | 1105 | H |
| 1 | 145 | 725 | 2465 | He |
| 2 | 185 | 925 | 3145 | Li |
| 3 | 195 | 975 | 3315 | Be |
| 4 | 205 | 1025 | 3485 | c-12, Singlet O |
| 5 | 265 | 1325 | 4505 | 0, Ne |
| 6 | 305 | 1525 | 5185 | |
| 7 | 365 | 1825 | 6205 | |
| 8 | 435 | 2175 | 7395 | |
| 9 | 445 | 2225 | 7565 | |
| 10 | 455 | 2275 | 7735 | Ar |
| 11 | 485 | 2425 | 8245 | |
| 12 | 505 | 2525 | 8580 | |
| 13 | 545 | 2725 | 9265 | |
| 14 | 555 | 2775 | 9435 | |
| 15 | 565 | 2825 | 9605 | Fe |

Quarks with 60 nodes exist in numerous scales which have multiple levels of energy and, geometrically, they can be substituted within protons in high-energy experiments because the distance between nodes fit within the proton. Further, the tightening metric highlights why the atomic table shows atoms generally shrinking in radius as one moves to the right on each level, generally increasing significantly at major cone levels and slightly at minor cone levels.

To add mass-particles to an atom requires the simultaneous reduction of the absolute radius and the increase of the relative radius, otherwise metric tightening. Relative radius is not an absolute radius measurement like meters, rather, relative radius is based on the number of dimension waves required to achieve and maintain energy transfer between nodes in a new quantum loop. The absolute radius controls the ability to transfer resonant energy across the maximal distance between nodes and is regularized for the most recent mass-particle added.

The First Ten Atoms

The base structure of the atom is ten light-cones with five radical axes within the 6-choose-4 lattice. Each cone can contain a neutron/proton pair and an electron aligned on the radical axis, filling the four-dimension space between the electron and the centerpoint nucleus. The first element, hydrogen, has quantum loops with radii of 1105 light waves and can be represented in its exact form of three quantum loops (with confined quarks and the electron represented) or in the more graphically oriented spindle torus geometry (FIG. 16).

Hydrogen is a five-dimension structure with loops constructed of three sets of 6-choose-4 lattice. It does not contain a six-dimension centerpoint. Deuterium contains a neutron and a neutrino centerpoint. Hydrogen nodes are at the maximal distance that resonant energy can transfer successfully.

Helium operates on a different metric scale although it is still within the initial axial triplet. Relative to the hydrogen metric, the helium metric is significantly tighter with 2465 light waves in the local lattice required to have the quantum loops complete. Four particles align axially and at the same time are limited by the maximal distance rule (FIG. 40). The helium atom consists of a 6-D neutrino centerpoint, two neutrons, two protons, and two electrons and can be represented in a number of mathematical, graphical, or conceptual models, including: quantum loop, spindle tori, stick, and compass models. They can also be represented physically in a similar fashion using a variety of material including wire or solid loops, tori, stick and compass models.

The first ten atoms can be graphically represented as simple axial stick models (FIG. 41) where hydrogen is a simple proton; helium is still within the first triplet; Lithium adds a proton and two neutrons with an additional triplet. Boron, carbon, and oxygen also add parts of triplets. Neon is symmetric on five triplet axes. The metric fills in with a preference for local metric tightening at the neutron position due to a generally tighter metric and on the same side of the equator as local resonance provides a stronger influence on metric tightening on one side of the atom in preference to the undeveloped side of the atom. This preference exists for all atoms and provides a partial foundation for Hund's rules and the sequential insertion of up or down electrons in larger mass atoms. The most basic elements can also be represented graphically using a spindle tori model (FIG. 42). The spindle tori highlights the axial alignment of particle sets while the compass model highlights the addition or subtraction of mass-particles and their relative positions to each other and flow direction relative to the centerpoint.

A more complex model is a compass model (FIGS. 43 and 44). A compass model the atom aligns the neutron and proton pairs on five axes, highlighting the charge, spin, and most recently added mass-particle(s) relative to the previous element as a compass model. This compass model highlights the position of the electron and the magnetic characteristics of the element by the relative balance of up and down cones per half of the equator. The Model also highlights the stability level of the element. For example, iron has 30 neutrons, completely filling the 2b shell.

This model and breakdown of the respective shells and sub-shells for the position of the neutron/proton/electron sets has significant implications for extremely large atoms and islands of potential stability.

Larger Atoms

Metric tightening is very important for the formation of larger atoms. However, several additional rules are required to organize larger atoms. Larger atoms build on the ten cone metric and quantum loops, adding loops as the original metric is tightened and shrinks.

First, in order to make the metric suitable to additional particle formation, the frequency of a single dimension must be increased. This serves to increases the number of dimension waves available to provide the metric parameters for the higher relative radius quantum loops of larger atoms. It is very important to note, the tightening of any single dimension only affects four of the five cone pairs. Thus, it is an improvement that allows only four of the five axes to add protons, prohibiting the fifth triplet axis from forming particles until another dimension wave intensifies its frequency. The result of this mathematical phenomenon is that protons in successive shells only add 8 protons before reaching a level of stability (for one dimension).

This phenomenon explains why the first ten atoms are a full set while the next group cuts off at eight additional protons for argon and then eight additional to get to iron. These are stable, but are not complete from a base ten viewpoint. It also explains why successive shells appear to fill in one pair of electrons a level "below" before moving on to larger atoms; the increase in a new direction is filling out the underlying base ten shell.

Second, using the Model, the cone/sub-cone formation is regularized and the causal structure for larger atoms is further embellished. Sub-cones have an opposite rotation sequences and flow paths versus the cone level directly preceding them (FIG. 45). The entire cone and sub-cone set stays within the triplet cone area, forming a single large cone from each of the ten primary cones. As the metric paths fill and tighten, the next sub-cone or particle position can form farther out from the centerpoint, in effect branching within the context of the base cone. Two of the three original triplet axes (2, 3) and a new, resonant third axis ($1^{prime}$), across from the original third of the triplet axis form the new triplet.

Strictly speaking, the loops are not contained within the cone. The quantum loops are interwoven within and throughout the metric structure, occupying the axial triplet set lattice spaces; sometimes well outside the strict boundary of the cones. In addition, the quantum loops for a neutron actually drop behind (to the other side of the centerpoint from the cone), before looping forward or away from the centerpoint.

The cone is more than a visual metaphor; it provides the organizational limits to the position of the radical axes in larger atoms. As shown, the cone is formed by the triplet axis. As the cone gets larger, the sequence of the axes changes as the next subcone uses two of the axes and the prime (negative) of the opposite 6-choose-4 axis as part of the quantum set. Between sets of triplets, contiguous cones actually overlap; however, because 6-choose-4 quantum loop is based on independent four-wave sets of dimensions and lattice scales, they can never intersect.

Within each of the ten primary cones out from the centerpoint there is an additional level of three subcones (level 2) and out again from the three sub-cones is another level of sub-cone positions forming nine new sub-cones (level 3). As the cone axis rotates, the next level sub-cone "gears" in an opposite direction from the level below it. As the 6-choose-4 base cone axes (e.g., 1, 2, 3) rotate in sequence, the sub-cones form using the related axes set (2, 3, $1^{prime}$) and, therefore, have an opposite sequence. Each base cone sub-divides to three sub-cones. Each of the three sub-cones can further divide into three subsequent sub-cone sets (thirteen stable particles per cone).

There is a total of thirteen stable cone and sub-cone positions for each of the ten base cones, yielding a total of 130 potential positions for protons and 130 potential positions for neutrons; a total of 260 potential particle positions. On an even larger scale, there are an additional 27 sub-cones per base cone on level four (270 total additional sub-cones or 540 potential neutron/proton particles for level 4); these are not stable structures as they describe extended axial structures of radioactive elements larger than uranium. Islands of stability occur at increments of 72 neutrons and 90 neutrons.

Electron Orbits

The Model defines the position of the electrons using five dimensions within the triplet cone. Electron orbits do not intersect because of the 6-choose-4 lattice configuration providing separate metric paths for the particles within the triplet. Each cone has a separate and unique path through the metric. Further, each successive particle within the cone has a different scale for its quantum set assuring particle paths will not intersect short of catastrophe. Finally, the neutron, proton and electron share nodes, tied together, ensuring cooperation.

The complex 6-choose-4-D structure defines the "cloud" movement of the electron at the end of the proton/neutron axis (FIG. 46). The electron is a major confinement, 5-D particle. The flow of the electron is outward and mirror opposite that of the proton, just like the neutron is mirror opposite the proton. The distance and position from the centerpoint for the electron depend on the five dimensional variables of the neutron and proton as well as the fermion's asymmetric structure within the supersymmetric metric.

Interior and exterior positions within the light-cone structure also affect the apparent structure of the orbit. The Model takes into account the x, y, z, w, and U components of orbits within a four-vector metric structure (FIG. 47). The positions of the axis align with the measured positions of the orbits as shown in Table 14.

TABLE 14

| Triplet | Orbit |
|---------|-------|
| X axis  | 1s, 3s, 4d, 5s, 6s . . . |
| Y axis  | 2s, 3dz, 3d, 4s, 4d . . . |
| Z axis  | 2p, 3p, 3d, 3d, 4d . . . |
| W axis  | 2p, 3p, 3d, 3d, 4d . . . |
| U axis  | 2p, 3p, 3d, 3d, 4d . . . |

Further, the sequence of electron orbit positions can be modeled based on the base ten cones, the axial supersymmetric metric and the orientation of the light-cones to the base cone pair. These five axes of 6-choose-4 axes are only possible with the four-vector axial supersymmetric metric. Even the orbit of electrons reveals the metric tightening, ebb and flow of the energy, and dimension sweeping in the atom. The electron is released when the three shared nodes with the proton (one for each quantum loop) is no longer occupiable.

Spin and Spin-Spin

The inherent sweeping of individual dimensions, and consequently the sweeping of the 15 6-choose-4 axes, shows that a dimension wave sweeps a particle twice for every full 360° rotation. Earlier it was shown that a 6-choose-4 axis set creates matched sets of waves alternating on both sides of the centerpoint. For mass-particles in the atom these waves sweep at 180° and again at 360°. As a result, the actual lattice set for the neutron starts at the centerpoint and appears to return through the centerpoint twice for every single full sweep of a dimension. This double motion is why the spin-spin and the spin-orbit ratios are close to 2:1.

The ratio measured experimentally is slightly above two because the intersection of the three quantum loops straddles the radical axis. Therefore, to complete a full path, returning to a measurable single starting point, the calculation must go to the next lattice point beyond the radical axis (approximately 1.666° for a neutron or proton and 5° for the electron, plus or minus one triplet node). When measuring a single loop, therefore, it appears to be slightly more than two, but is actually just two.

Particle Entanglement

Particle entanglement is the separation of mirror and axial symmetric particle from the local metric. The chirality and particle characteristics are always determined from the point of origin unless acted upon by an outside force (FIG. 24).

Non-locality is not possible if the alignments of two particles, axial triplets, or centerpoint position are disturbed. Any measurement of one mass-particle only reveals the measurement of the other particle and the relative positions of the two mass-particles to the centerpoint and originating metric, there is no instant reverse communication possible.

Two dimension waves can interact along a plane and create a 6-choose-2 interaction that develops orthogonally faster than the speed of light, e.g., two matched dimension waves converging/intersecting at 179° where the interaction would develop at faster than light speeds. However, information, as in the transfer of resonant energy from node-to-node, cannot travel faster than the speed of light. Further, for the orthogonal intersection, the individual dimension waves must already occupy these "advanced" positions to potentiate four-wave intersections; hence, the information had already "arrived" at conventional light-speed to create the 6-choose-2 interaction.

The Higgs Mechanism

The Higgs mechanism is the attraction of a mass-particle to the supersymmetric light-cone structure. The strength of this attraction is governed by several factors: the spurious positive or negative polar orientation of the mass-particle to the atom (or more accurately, the cone), the alignment of metric scale, triplet sequence, four-wave intersections, and chirality. When these characteristics are aligned, the particle is drawn with significant additional force relative to an otherwise random alignment (FIG. 48). There are five sets of triplet/conical organization within the supersymmetric metric that enable the Higgs mechanism, consistent with predictions by the Standard Model.

A relatively unattractive force in the atom is the lack of attraction of a free quark to a proton, for example. The lemon flow of the quark is inherently weak because of the 90% overlap structure of the quark lemon to apple ratio. Consequently the apparent positive and negative charge is weak, although moment and spin remain quite strong.

Just as the Higgs provides an attractive organizing force, it also provides repulsive force for mass-particles misaligned with the light-cone.

Antimatter

Each mass-particle is constructed with three quantum loops and has positive and negative poles with volume and spindle torus geometry maintained by the quantum loops. The mass-particle has one end of the loop lemon flow over the top of the torus and then inward (positive or attractive) and each has a lemon flow outward, (negative or repulsive). Like a compass magnet on a pivot next to a strong bar magnet, the compass axis immediately orients itself to the bar magnet's field. Likewise, force alignment of two similar charge poles of mass-particles and they are repulsive. Since all mass-particle have two poles, the measured matter: antimatter ratios are about even by experiment, but the alignment of electrons, protons, and neutrons are the same for all atoms as the result of the build sequence of quantum loops. This quantum structure results in the overwhelming appearance of an excess of matter. Higgs attraction takes advantage of this attraction property, orienting the electron to the proton so the electron always appears negative.

Further, the number of protons available limits counting the observed electrons to proton ratio in the universe. A higher number of electrons certainly exists but cannot be measured using the count of available protons. Electrons have a smaller relative radius, a much higher node density, and form more easily within a spontaneous metric than substantially larger neutrons or protons.

The Quantum Model, through its descriptions of super-symmetry, charge, quantum loops, spin, and mass-particles each with positive and negative poles, provides the natural structural mechanisms for charge conjugation (particle/antiparticle) and parity inversion (mirror symmetry), consistent with the requirements of the Standard Model.

Uncertainty

Uncertainty is based largely on the inability to measure the atom directly without disturbing the element you are trying to measure. According to Feynman, Heisenberg's uncertainty principle in general stated, "one can not design a piece of equipment in any way to determine which of two alternatives is taken, without, at the same time, destroying the interference pattern"; and more specifically, "The uncertainties in the position and the momentum at any instant must have their product greater than Planck's constant." (Feynman, Richard, "Six Easy Pieces", 1995, California Institute of Technology, p136.)

It is clear from the Quantum Model that even the slightest disruption of the resonant centerpoint will change the sequential position of four-wave intersections and is consistent with the general uncertainty principal. The four-wave ruler, Planck scale node transfers, relative radius, and the machinery for mass provided by the Quantum Model alleviates much of the uncertainty for field structure and forces at the Planck scale. Direct measurement of the atom may be best-accomplished using light absorption and emission spectra which the Model shows are a direct result of the particle's conventionally hidden geometry.

Elemental Bonding

The Quantum Model includes that there are two primary contributions that an atom can offer an elemental bond: field organization and energy transfer. First, an atom can contribute its organizational structure, including its axial field structure, strength, and chiral organization. This organization is the foundation for elemental bonding. Elemental bonding requires alignment and matching scale of the metrics.

Second, atoms can exchange energy. Energy exchange can be accomplished through the direct transfer of photons or equilibration of energy within the 6-choose-n field structure. For example, alignment of just two dimension wave structures between atoms holds two of the six dimensions in synchronous alignment while still allowing complex rotation of the remaining four axes. Energy exchange is facilitated when the field structures are matched for chirality and frequency, an indication of metric matching often-requiring one atom to tighten and the other atom to relax. Higher energy systems are tighter and lower energy systems are looser. The potential energy of the bond is stored in the quantum loop and centerpoint which both reflect the resonant energy of the system.

Elemental bonding, therefore, is substantially controlled by the character of the electromagnetic field and respective helicoid axes (tightness, alignment, twist). Importantly the metric coherence between atoms is the determiner of the angles, distances, type, and strength of bonds. Spectral hole burning and magnetic monopole structures are a result of the organizing effects of the helicoid axis.

The Model projects that there are two primary bond structures between two atoms, (1) bonding associated with dimension wave sets 6-choose-2,6-choose-4 or 6-choose-6 wave structures, and (2) axial bonding associated with aligning triplet axes which require chiral alignments as well.

The Model as based on sharing 6-choose-2 organization can project bonding associated with center-faced cube structures. Changes in quantum loop resident energy and metric tightening facilitate the metric matching, alignment, and bonding of elements. The energy that is associated with a chemical bond is captured by the change in quantum loop resident energy.

The Four-Wave Photon

Particle Geometry

The photon is a resonant energy packet whose frequency, amplitude, and helicity are determined directly from the geometry of the quantum loop from which the photon emanated.

Each mass-particle quantum loop within an atom has a unique geometry based on the relative radius of the axial triplet and the tightness of the local metric. As shown in FIG. 42, carbon is constructed on four axes; two of which are complete with two neutron/proton pairs and two axes hold single pairs. Each axis is built with a unique relative radius (highlighted) that contributes quantum loops of specific geometry.

Each particle in an atom the respective sets of quantum loops has a unique geometry. Photon information is based on the actual radius of the quantum loop and the wave-sets that comprise the loop. As shown in FIG. 49, a broad generalization can be made that the larger the loop, the larger the frequency at the lowest energy level. A photon follows a single wave crest outward at the speed of light. When the centerpoint is bumped, the loop is interrupted or a node is overloaded a photon is released. A photon is generated by the quantum loop when one dimension has constant periodicity and the wave travels along a single dimension wave crest, at the speed of light. The remaining wave periods of the quantum loop define frequency and chirality information.

Each four-wave node of a light wave is shown to have three dimension waves with the periodicity consistent with the quantum loop information from which the photon was generated and a fourth dimension with continuous period, following a crest (or trough) forward at the speed of light (FIG. 50). The fourth dimension is represented as the time variable in Special Relativity and the forward motion is represented as "c", or the speed of light. The Quantum Model's four-vector construct is consistent with definitions of Minkowski space for a given node where the fourth dimensional variable is replace by c, t and i. In the Quantum Model, each photon comprised of three dimensions plus one dimension undergoing a change, transferring resonant energy forward at the speed of light.

The positive or negative value of the crests and troughs is inconsequential to the Model in that the utility of the dimension wave is only to provide a closed four-space. Null space provides lattice separation, regardless of metric scale.

Each photon is comprised of three nodes of periodicity contributed by each of the three lattice sets in the quantum loop. Therefore each photon is a combination of five total dimension waves. In each of the three nodes the same dimension wave variable is used to move forward. This reveals that the structure of a photon has four dimensions of wave periodic influence, while the fifth dimension wave results in the free photon traveling at the speed of light, following a straight four-vector path away from the centerpoint. The photon follows the same dimension wave sequence as the quantum loop from which it is released.

Consistent with the torus and quantum loop from which the photon escapes, the photon will either be auguring in a left or right rotation, consistent with the periodicities of the originating quantum loop. Quantum loops and photons always share three lattice sets. In some cases, the triplet exhibits using dimensions in two or three of the lattice sets. (e.g., the triplet set ABCD, ABCF and ABDF uses dimension A in all three paths and D in only two paths). Dimension waves involved in all three-lattice sets have larger amplitude and are more opportunistic phase alignment in one dimension than where the dimension is involved in only two lattice sets (FIG. 51). Wave phase alignment is achievable with photons through polarization techniques because of the photon's cyclic wave structure. Two photons from quantum loops in the same mass-particle are matched for sequence and photon alignment.

The resonant photon is generating/emitting dimension wave information as it travels. The photon maintains its resonant energy through internal reflectance and four-wave confinement and generation of new waves in a manner similar to the centerpoint. While one wave moves forward the remaining waves maintain the periodicity of the loop and metric from which they came giving light its characteristic frequency and information signature. Telling the dimension waves apart is difficult as there is no material difference between the waves other than frequency and intensity.

The range of frequency between gamma rays and visible light waves is about six orders of magnitude; this directly reflects the scales of the tightened quantum loops from the hydrogen proton down to the black hole (Table 14). It should also be noted that the scale of the loop is relatively consistent with the scale of the free proton, 10E-15 meters.

TABLE 14

Light Frequency Range

| Visible Frequencies: | $4 - 7.5 \times 10^{14}$ Hz |
| UV Frequencies: | $7.5 \times 10^{14} - 3 \times 10^{16}$ Hz |
| X-Ray Frequencies: | $3 \times 10^{16}$ Hz upward |
| Gamma Ray Frequencies: | typically $>10^{20}$ Hz |

Excited state photon emissions appear as longer wavelengths. When atoms release photons from excited states, the "disturbed" dimension wave is, for example, emitting twice as many waves per unit absolute time and the relatively slower dimension information about the remaining periods appears stretched. This is because the increased frequency dimension wave captures a smaller slice of the quantum loop periods before it is released, making the periods appear longer as the proton is measured.

The Model's geometric character provides utility in that the position of each particle on each axis can be determined along with its light signature based on the radii of the quantum loop from which the photon emanates.

The photon adds the third level of disturbance to the background associated with matter. First, the centerpoint generates dimension waves moving outward to create the potentiated magnetic field. Second, quantum loops hold and transfer resonant energy through the alignment of the fields to create the subtle organization of the atom. Third, the photon creates its own wave set as confined resonant energy transfers through space.

The Quantization of Light

Light is emitted in quanta because quantum loop nodes must be aligned to transfer resonant energy within the quantum loop or to emit photons. Quantum loops that are misaligned cannot transfer energy through the loop or emit photons without first realigning. The single rouge dimension wave that is not in alignment has to change frequency to reestablish four-wave node alignment with the quantum loop. Realignment only occurs when the misaligned wave function changes in "whole numbers" in alignment with the remaining dimension waves that make up the loop.

Excitation alignment can only occur in whole integer steps. For example, if a four-wave intersection is at distance x from the centerpoint, the misaligned wave must either relax or tighten to some multiple of distance x, in whole steps, for node realignment to occur. Only when four-wave alignment occurs can the loop resume or the photon be emitted. Emitted photons will have the energy difference between the excited state and the rest state when the flow renormalizes. Even when the misaligned loop scale matches the remaining dimension waves, four-wave realignment may not occur and consequently energy emission levels can be skipped as the excited state drops from four to one, for example; possible absorption/emission points are often skipped.

The Speed of Light

The speed of light is limited by the speed of the reflecting dimension wave generator within the centerpoint. It constantly shuttles back and forth within the confined centerpoint at the speed of light. Even if the centerpoint moves, gets bumped, or travels at speeds near the speed of light, the speed and motion of the generator is always the same. Similar to the early video game "Pong", the ping-pong ball moves at constant speed as it reflects from each paddle, regardless of the position of the paddles.

For both the quantum loop and the photon, the energy transfer between nodes, when it occurs, is at the speed of light. The transfer of resonant energy from node-to-node follows a one-dimension wave between the nodes. The resonant energy transfer does not happen at a speed faster than a traveling dimension wave (light-speed), nor can resonant energy be absorbed at a faster rate. The transfer of energy in the quantum loop can be stalled and forced to wait for alignment of a sequential node.

Even though the photon transfers indefinitely through materially "empty" space, it is effectively transferring from four-wave node to four-wave node of its own making. The traveling photon has an advantage of always moving with a dimension wave crest, so the transfer is constantly moving forward in one dimension with the periodicity of the remaining four dimensions within the photon. For the photon, the closest next intersection position is on a four-vector line from the centerpoint. This is a straight line. The local effect of other metrics can alter the position of the next available space (curved space). If the local electromagnetic or gravitational field changes the position of the next available point, light bends in a similar fashion to the quantum loop in a particle.

Photons travel straight because the next closest four-wave intersection is straight away from the centerpoint on a four-vector. This only changes if influenced by another metric.

The Speed of the Emitter and Observer

The speed of the emitter does not change the speed of the internal reflectance of the resonant centerpoint. The faster the mass-particle moves, the resonance maintains its speed (c). The reflectance is always at light-speed. Move the centerpoint and it may take more or less time for the internal reflectance to reach the border to create a new dimension wave. In effect, this compresses the waves in front of the moving centerpoint and stretches absolute distance between waves behind the centerpoint. The forward metric compression causes the entire atom to tighten.

The metric compression on the lead side of the particle/atom causes: 1) metric tightening in direct relation to the speed of the particle (absolute time intervals and lengths change according to the speed of the system relative to the observer's frame of reference—Einstein); 2) exponential energy gain as centerpoint tightens (requires all dimensions to tighten); and 3) the remaining period wave information is "stretched" resulting in longer wavelength photons.

Applied oscillation, light, heat, or Brownian motion can cause centerpoint movement "stress" and change excitation states, field characteristics, and photon emission frequencies. This models the causal structure for the observer always measuring light at a fixed speed regardless of the speed of the emitter or the point of view of the observer.

Bell's Advance Wave

Advance (and trailing) waves shown in the Model are consistent with Bell's observations where information is ahead of the occupiable four-space forming (FIG. 52). The Julia fractal representation of the wave shows reconnection about one-third of a wave ahead of the first node ($R^4$ value 0.665, 0). The Quantum Model thereby overcomes limits of the transactional and Copenhagen interpretations. The advance wave It is the portion of the Julia fractal where there is connection and disconnection and is not occupiable space.

Einstein-Podolsky-Rosen

In a normal collection of atoms, the handedness of light appears random. Within a specific atom, however, the handedness of the particle and the light it emits is fixed and determinable (barring outside manipulation) and is solely based on the triplet and mass-particle from which the photon was released. The handedness of the photon is always determined at the quantum loop source.

Excitation

No increase in the atom's radius is required to model excitation states within the Quantum Model. A change in resonant energy within the atom causes at least one dimension wave to: 1) faster/slower sweeping, or 2) change direction and increase the number of sequential reflection positions within the resonant centerpoint, or 3) tighten the centerpoint to increase the number of waves per unit absolute time. As individual dimensions achieve whole integer wave alignment with the remaining dimension waves in the axial triplet or light-cone, the four-wave intersections and quantum loops realign and the quantum loops resume flow.

"Hit" or move the centerpoint and the resonance of a singe direction can be altered; changing the position or motion of the dimension wave generator. As discussed earlier, the dimension wave generator resonates or reflects back and forth within the centerpoint at the speed of light. Rapid oscillation of the atom creates/simulates a tighter metric and longer and stronger waves are emitted.

There are two types of QED excitation (FIG. 53): Type 1 is where the position of the dimension wave is tightened as the result of short alignments or where two dimensions or more have tightened simultaneously. This type of alignment can persist and is typical in larger atoms and elemental bonds where the wave density is increased by a dimension wave in four of the five cone pairs.

Type 2 is a more temporary condition associated with high-spin states. In Type 2 alignment, four-wave intersections of dimension waves follow the sweeping dimension as the rouge dimension wave reflects within the centerpoint. Hydrogen is a unique case where there is no discrete 6-D centerpoint. It is a five dimensional object (or, more accurately, three sets of four dimensions), the resonance is maintained by the quantum loops. As one or more dimension waves are disturbed, the mathematics for excitation is modeled using Type 2 resonance. Larger atoms add a component of metric tightening and Type 1 excitation. In either case, the radius of the atom does not increase when the atom is excited in a manner described originally by de Broglie.

Type 1 resonance can also be applied to the atom's six dimensions simultaneously in order to tighten or relax the metric. This type of excitation does not require whole step changes and is the fundamental tool for metric tightening. It is also the source of change required for elemental bond metric alignments.

Rotating plate example—A visual analogy to the interaction of sweeping dimensions can be constructed using two spinning pie plates, each with a single hole in the same part of the plates, near the edge. Rotating the plates in opposite directions only allows alignment of the hole where and when the holes overlap; one plate can spin at exactly two or three times the speed and the same position and the open space appear in the same position. While each increase in plate rotation speed reflects added energy to the system, the alignment of the open space occurs only in whole numbers of spins.

The Interaction of Dimension Waves

Dimension waves interact on a number of scales providing the mechanism for transferring energy between bound atoms and yields information regarding the nature of the interactions of dimension waves at the most fundamental level.

On the most basic level two matched waves interact to form an open tube, e.g., paper towel roll tube (FIG. 10A). Two dimension waves interact constructively when phase aligned and matched for scale, frequency, and direction. The two-wave organization is measurable as interference patterns but does not confine resonant (reflective) energy. The alignment of waves generated by resonant energy from a centerpoint, quantum loop or photon are typically matched for scale, frequency and direction and therefore these waves interfere with one-another in double slit experiments. The frequency of the light determines the pattern of interference. The formation of constructive and destructive interference organization reveals 6-choose-2 crests and troughs. These waves also create fields of 6-choose-2 interaction. Many atoms naturally organize on the basis of 6-choose-2 fields, including some center-faced cube crystal alignments.

In more dramatic cases of 6-choose-2 interaction, the release of multiple-node energy is rapid and appears conventionally as fire—a multiple photon release on a large scale with two or more dimension parameters changing at the same time. The metric is loosened. Paramagnetic and lower relative radius atoms such as oxygen can facilitate such rapid node release and broad-scale change.

Random interactions of matched waves occur spontaneously in a vacuum and predictably in elemental bonds. Two-wave interactions can be characterized with the Mandelbrot fractal as the precursor to the four-wave Julia fractal intersections.

Since the quantum loops follow the surface of the spindle torus, photons are released from the surface. For example, when a change in dimension occurs photons are emitted predominantly from the particle's outermost pole area as mass-particles have the largest distance to cross between the outermost contiguous nodes. (Quantum loop nodes and circle lattice solutions are not equidistant.) Further, the total energy any node can hold is directly a function of inverse-square of the node's distance from the centerpoint. The outermost nodes cannot hold as much energy as inner nodes. Therefore, the upper limit of quantum loop resident energy held by a quantum loop is based on its absolute radius. Excess energy is released as photons.

Quantum loops rarely operate at maximum resident energy (total loop energy) holding capacity; i.e., the resonant energy of each node to full capacity. Even as the loops are close to capacity, the atom is constantly undergoing equilibration, an ebb, and flow of resonant energy throughout the atom. The addition of matching photons typically fills in empty node positions and tightens the metric. Each additional absorbed spectral photon strengthens the structure and puts more energy into the system by: 1) strengthening weak 4-D nodes; 2) filling more quantum loop nodes; and 3) tightening the metric (higher values of Julia connection, 0.8 to 0.99). Additional photon energy, over time, adds energy to all mass-particles throughout the atom and tightens the metric for useful applications.

Absorption

Light is absorbed into the particle as a photon interferes with a corresponding frequency (matched) dimension wave. This 6-choose-2 to 6-choose-4 interaction takes energy from the higher energy system, the photon, to the lower energy system, the empty metric, quantum loop of centerpoint. As light is absorbed by a mass-particle, energy has a propensity to be released at a fixed angle. This is a function of the axial structure of the atom, absorbing through one dimension and emitting through a quantum loop at a different angle/axis. The emitting axis is fixed, bound in a compound or crystal.

When the atom is emitting photons its metric is loosening. When the atom is absorbing energy without emitting photons its metric is tightening.

Light is absorbed principally at the point in the quantum loop where the loop is returning to the centerpoint. The metric organization that yields the quantum loop also absorbs photons easier on the inward side of the quantum loop where node-to-node transfer is stronger closer to the centerpoint and dimension wave transfers align with the photon.

Photons are released on the outward transferring side of the quantum loop as the nodes are weaker further from the centerpoint, increasingly less capable of holding excess energy. Photons also follow a single dimension wave vector away from the centerpoint. Phase alignment of light-speed transfers is dependent on 6-choose-2 and 6-choose-4 alignments. Alignment of 6-choose-2 waves from the photon and the local metric are also improved in approaching parallel positions.

There is no meaningful interaction of three dimension waves except as three sets of 6-choose-2 interactions. Even though a photon transfers though four-wave nodes, it is maintaining its four-wave structure with the use of 3 sets of periodicity per four-wave node moving along one dimension wave crest, retaining its four-wave resonant structure.

Four-wave intersections create a "closed" reflective space that is occupiable by resonant energy associated with matter (FIG. 10B). Most four-wave intersections are "empty", that is, they do not contain the resonant energy associated with quantum loops and mass. These four-space intersections spontaneously form and disappear within the electromagnetic field.

The number of empty four-spaces far outnumbers the four-wave nodes associated with quantum loops. For example, for hydrogen there are 10E+17 "empty" four-wave spaces for every resonant four-wave node in the quantum loops. Resonant energy transferred from the centerpoint through quantum loops can independently generate dimension waves within the electromagnetic field structure.

There is no meaningful interaction of five dimension waves except as three sets of four-waves.

The 6-D neutrino is a resonant point, holds energy, but, no mass loops (FIG. 10C). If it is moving at light-speed, the neutrino is 5 wave variables of internal reflection with the sixth dimension wave moving forward at light-speed (similar to a four-wave plus c photon). The fact that the point is six-dimension allows it to pass through conventional matter effortlessly, interacting only with matched scale dimension waves, like photons. It is also unlikely to interact with conventional centerpoints as they are less likely to match. Hydrogen does not contain a neutrino.

Neutrinos within different elements are different sizes based on resonant centerpoint scales and geometries, just quantum loops. Free neutrinos expand to a regularized level when they leave the centerpoint, much like single protons expand resulting in hydrogen. Resonance is the source of the observed oscillations in the neutrino.

Slit Experiments

A photon is seen as both a particle and a wave because different measurement techniques yield different observations about the same structure. A photon's resonant energy transfers from node-to-node as modeled by the Quantum Model, acting as an energy packet. However, when the waves of a photon are phase aligned, the interference of the dimensions between the point sources is the dominant visual signature. The photon energy is still transferring from point to point, but is not visible as it is made up of a collection of 2-D and 4-D waves. The same is true for similar particle experiments.

What is important about slit and delayed choice experiments is the concept of phase timing. If the constituent waves within a photon or particle are phase-matched (6-choose-2 or 6-choose-4) upon passing through two parallel slits, the waves will interfere creating the well-known interference pattern based on frequency. If waves are not in phase, they will not create an interference pattern (FIG. 54). When light is polarized, it is sorted for phase. If the slits are orthogonal, there is no visible interference. If the light is filtered through orthogonal slits again, phase alignment is returned and the interference returns. This experiment demonstrates the intensity of interaction between phase-aligned 6-choose-2 waves.

The propensity for dimensions to mutually interfere, particularly when phase aligned is very important to the interaction of particle waves. Further, each photon node contains the period information of the entire photon (four-wave resonance plus one moving) and immediately reconstructs upon leaving the slit, yet when phase aligned, interferes with itself.

When a particle passes through a slit, it only acts as multiple photons because the four-wave nodes are in phase alignment with each other (although different waves from the same generator) and thereby create interference patterns. The interference to the background is generated by the photon as it is disassembled and the resonance is lost to two-wave tube interactions that pass through both slits. An intact photon or particle only passes through one slit.

Mass-particles contain quantum loops filled with phase aligned four-wave nodes. These also create a 6-choose-2 interference pattern.

Revised Equation for Hydrogen Spectra

A revised equation for the excitation of atoms and the resultant photons is based on the following parameters: (1) the excitation of specific dimensions included within the triplet (within a quantum loop, five dimension independent wave variables are considered, $A^2$, $B^2$, $C^2$, $D^2$ and $F^2$ where one dimension has constant periodicity; and, (2) the relative radius of each atom's quantum loops. The Rydberg constant for hydrogen $R_h$ can be substituted with the value nine times the (relative radius)$^2$ with some minor adjustments for differences in node separation in the quantum loop.

Particle Influences

There are a select group of influences that electromagnetic radiation has on an atom. These include, excitation, stimulation, metric tightening, chaos, cooling and their respective opposites. Each influence is achieved through different techniques, and they are broadly defined below:

Excitation—The process of adding energy to an atom such that the complex interaction of at least one of the six independent dimensions is changed and the four-wave intersections are misaligned and then resume alignment to emit/absorb a photon. This is a short-term effect as the atom seeks the lowest energy state unless acted upon by an outside force. It does not contribute to quantum loop resident energy significantly.

Heat and chaos—The process of adding broad-spectrum radiation or excessive amounts of narrow wavelengths to an atom that disrupts flow and causes a cascade of photons to be absorbed and reemitted with no residual increase to the quantum loop energy of the atom. Heat actually causes the reduction of quantum loop flow and charge for the particle. Plasma takes this to the extreme where without quantum loop flow maintained, electrons are released and magnetic properties are lost.

Stimulation—The process of adding single wavelength energy at high intensity to an atom usually matching its most intense spectral line(s) to add and release photons usually of very short duration measured in seconds or parts of seconds. These involve rapid changes in energy but have little effect on quantum loop resident energy levels as excited atoms seek equilibrium rapidly.

Laser "cooling"—Adding single wavelength light to an atom at intensity sufficient to prevent the atom from reaching a stable excited state prevents quantum loops from transferring from node-to-node and four-wave node alignment, disrupting photons from being absorbed/emitted and disrupts bonds. This technique has the effect of keeping five of the atom's six dimensions (or four of five triplet sets) from flowing. This is controlled disruption of quantum loop flow such that the atom exhibits limited spectral absorption/emission (electromagnetically induced transparency). This technique does not allow for realignment of the four-wave intersections and therefore does not significantly add to quantum loop resident energy. Frozen light and electromagnetically induced transparency experiments take advantage of this phenomenon. Numerous experiments have also shown that lasers and controlled magnetic fields have the ability to organize matter and fields.

Fine and Hyperfine Structures

As shown in FIG. 16, three quantum loops cross each in two places, creating two additional alignment points providing the fine structure wavelengths (between points on lattice set ABCD). Based on the Model and projecting forward, the hyperfine structure is revealed when the three sequential positions within a quantum loop (using three 6/4 lattice sets) provide unique resting points for the rotation of the dimension to come to rest (between ABCD, ABCF or ABDF within the triplet).

The quantization of the photon energy is the result of the specific geometries associated with quantum loop sets. Each dimension sweeps independently. The Model includes that a single dimension is part of two or three node positions and this results in there being more than one possible rest value within a single quantum loop or completion set to realign four-wave nodes.

Because there are several options (e.g., multiple holes per plate) for that alignment, frequencies that are emitted have small differences in spectral energy. These differences can account for the fine structure and Lamb shifts from the basic frequencies associated with excitation states. The Lamb shift is associated with the difference between two nodes within the same lattice and fine and hyperfine structures are likely represented by the energy difference between two nodes in different lattices ($1/(n^4)^2$ scale). Smaller steps (fine structure) are based on equilibrating at a different alignment positions on the quantum loop sets and information on the remaining wave sets in the photon. Nodes are not equidistant and differences in distances between nodes on protons quantum loops contribute to observed frequency differences.

The Model shows that the diameter of the atom does not need to change as the frequency of one dimension is changed. This allows the excitation rules to apply to many-electron atoms and not just single-electron atoms.

Gravitation and Larger Scales

The Machinery of Gravity

The causal structure for gravity is simply the quantum loop. Resonant energy transfers through the quantum loop nodes causes new dimension waves to be generated along the loop path outward from the node, in all directions (FIG. 55). Resonance is generated on a four-dimension basis within the closed four-wave node using the same reflective mechanism as the centerpoint. The maximum strength of the dimension wave generated by a quantum loop node is based on the inverse square of the node's distance from the centerpoint. Each resonant node further from the centerpoint generates a weaker wave.

Gravity waves travel at the speed of light based on the speed of the dimension-wave resonance generated from the four-dimension nodes. Since each five-dimension particle geometry is unique to its axial triplet and light-cone set, gravity is also generated on a five-dimension basis, consistent with the Standard Model. This helps to explain why gravity is popularly viewed as a five-dimension (single cone) or ten-dimension (cone pair) phenomenon. In supersymmetry models, 25 dimensions are represented by the five axial triplet sets or the Quantum Model's five light-cone pair physical structure.

Gravity waves are generated by each mass-particle quantum loop within a 5-D cone. In the case of protons and neutrons, quantum loop energy travels traveling synchronously through 108 nodes, regardless of the particle's relative radius.

The centerpoint and the quantum loops are constantly renewed by other dimension waves. In the absence of local dimension waves associated with gravity and electromagnetic fields (e.g., deep space), particles lose resonant energy, resulting in weakened fields, failed bonding, and diminished atomic level interactions with other elements (e.g., calcium loss by astronauts). Gravitation and centripetal forces do not have the same effect on atoms.

The full model of helium shows that the centerpoint creates the four-wave electromagnetic field, and quantum loops are responsible for the generation of photons, gravity, and the organization of fields including: charge, spin, chirality, and moment. The strong force results from shared nodes between the proton and neutron quantum loops and the organization of the metric that facilitated the quantum loop organization. The weak force is a result of the resonant neutrino centerpoint while the strong force is the result of shared quantum loop nodes and the metric organization that facilitates sharing.

Gravitation Scale

The scale of gravitation is miniscule compared to the scale of the electromagnetic field, with gravity generally theorized at an incredible 10E-40 in scale relative to the strength of the electromagnetic field. To provide a comparison of the scales of the electromagnetic field to the bed within a cylinder (FIG. 56). The complex cylinder math is shown in Table 15.

TABLE 15

Volumes of Complex Cylinders (8)

| Dimension n | Cylinder Volume |
|---|---|
| 3 | $2\pi r(r + R)^2$ |
| 4 | $(8/3)\pi r(r + R)^3$ |
| 5 | $\pi^2 r(r + R)^4$ |
| 6 | $(16/15)\pi^2 r(r + R)^5$ |

Where r is the radius of the torus tube and where R is measured from the radical center of the torus to the outer cylinder.

Gravity waves are generated by a finite number of node positions and transfers within the particle confined by a cylinder (e.g., the proton has three quantum loops of 108 nodes, each path using three 6-choose-4 lattice sets for a total of 972 nodes per proton). The electromagnetic field is generated from the centerpoint. In the case of the confining 5-D cylinder for hydrogen proton quantum loops, the height is r=1105 and the cylinder radius is R=1492 (at 65% overlap torus). As a 5-D cylinder (to match the torus) the electromagnetic field nodes for hydrogen within just the cylinder are 2.20404E+19. The count for the proton particle is 972 ((3 loops*108 nodes/lattice)*3 lattice sets); the resulting ratio of the node counts of gravity to electromagnetic field measures exactly 4.4100E-17 using five dimensions.

As shown by the Quantum Model, the electromagnetic field is generated from the centerpoint and gravity is generated by the quantum loops. Quantum loop nodes are always at some distance from the centerpoint. This distance can be generalized as "x" distance from the centerpoint (FIG. 57). The field strength of the any node position on the quantum loop relative to the centerpoint is weaker than the centerpoint by a ratio of $1/x2$, no matter the position or distance it is measured. It follows that the strength of the source of the electromagnetic force to the source of any gravity wave is ×2.

Logically then, the ratio of the hydrogen proton gravity wave to its electromagnetic field is $(4.41E-17)^2=1.95E-33$ in 5-D. The ratio of gravitational to electromagnetic field strength for hydrogen is much higher than theorized today for atoms in general. This result is explained using further analysis based on the concepts promulgated in the Quantum Model.

Further exploration surprisingly revealed that the scale of gravity to the electromagnetic force is not the same for identical particles in different elements (Table 16). The gravitation to electromagnetic field scale for outer protons in heavier elements such as carbon is actually lower than helium (the first atomic triplet) because the relative radius of the carbon atom, 3,485, creates a cylinder volume of 2.17E+22, and an adjusted gravity to electromagnetic ratio of 2.01E-39 for the outermost carbon proton. For iron, the relative radius for the outermost proton is 9,605, creating an adjusted ratio of 1.05E-44. The true ratio for the iron atom between the innermost triplet (He), 1.28E-37, and the outermost and largest proton 1.05E-44, creating a calculable value for each of the triplets as shown in Table 2, reveals an average value for all iron triplets of 9.39E-39. Hydrogen is excluded in the average calculation for iron as it shares the first triplet with helium.

TABLE 16

Gravitation to Electromagnetic Field Ratio For Iron in 5-D using Protons

| Triplet | Element | Cylinder Height/torus rel. radius | Proton @65% cylinder relative radius | 5-D Cylinder Volume | Proton Quantum Loop Node Count | Raw Node Count of G/EM Field | G/EM Ratio by Triplet |
|---|---|---|---|---|---|---|---|
| 1 | H | 1105 | 1492 | 2.20256E+19 | 972 | 4.41304E-17 | 1.94749E-33 |
| 1 | He | 2465 | 3328 | 2.71429E+21 | 972 | 3.58105E-19 | 1.28239E-37 |
| 2 | Li | 3145 | 4246 | 1.17079E+22 | 972 | 8.3021E-20 | 6.89248E-39 |
| 3 | Be | 3315 | 4475 | 1.60567E+22 | 972 | 6.05356E-20 | 3.66455E-39 |
| 4 | c-12 | 3485 | 4705 | 2.16756E+22 | 972 | 4.4843E-20 | 2.0109E-39 |
| 5 | 0, Ne | 4505 | 6082 | 1.0114E+23 | 972 | 9.61043E-21 | 9.23604E-41 |
| 6 |  | 5185 | 7000 | 2.35097E+23 | 972 | 4.13446E-21 | 1.70938E-41 |
| 7 |  | 6205 | 8377 | 6.90566E+23 | 972 | 1.40754E-21 | 1.98117E-42 |
| 8 |  | 7395 | 9983 | 1.97872E+24 | 972 | 4.91228E-22 | 2.41304E-43 |
| 9 |  | 7565 | 10213 | 2.26782E+24 | 972 | 4.28606E-22 | 1.83703E-43 |
| 10 | Ar | 7735 | 10442 | 2.59129E+24 | 972 | 3.75102E-22 | 1.40702E-43 |
| 11 |  | 8245 | 11131 | 3.80101E+24 | 972 | 2.55722E-22 | 6.53937E-44 |
| 12 |  | 8580 | 11583 | 4.82701E+24 | 972 | 2.01367E-22 | 4.05486E-44 |
| 13 |  | 9265 | 12508 | 7.65292E+24 | 972 | 1.2701E-22 | 1.61316E-44 |
| 14 |  | 9435 | 12737 | 8.53505E+24 | 972 | 1.13883E-22 | 1.29694E-44 |
| 15 | Fe | 9605 | 12967 | 9.50033E+24 | 972 | 1.02312E-22 | 1.04678E-44 |
|  |  |  |  |  | All triplets | Avg. (ex H) | 9.39461E-39 |

The scale of gravitation to the electromagnetic force is not the same for all particles. A careful examination of the data reveals that the gravity scale and the resulting scale of the electromagnetic field relative to the scale of the quantum loops (e.g., 972 nodes per hydrogen proton, relative radius 1105 versus 324 for the electron relative radius 85) for each of the triplet and mass-particles is different due to the differences in the relative radii and node count for each of the mass-particles and elements. The electron, for example, has a gravitation/electromagnetic force ratio of only 4.537E-20.

Gravitational Pulse

While all transfers between nodes occur at the speed of light following a dimension wave, there is an inherent sinusoidal pulse of disturbance generated by the quantum loops as the loops rotate inward and outward from the centerpoint. Further, dimension sweeping potentiates node positions at varying rates as the individual dimension sweeps. This is characterized as high and low node density (FIG. 5.5).

The sinusoidal pulse provides an organizing "rhythm" between atoms in a large body of atoms. Further attraction is also associated with the infinite four-wave nested electromagnetic field providing organization that gets stronger as atoms get closer.

While the electromagnetic field is generated from the centerpoint at a somewhat constant rate, gravity waves serve a subtle role, moving outward and inward, and sweeping dimensions potentiating nodes at different rates around the loops, synergistically organizing four-wave fields on larger mass scales. Gravitation by a large body is generated by individual atoms whose quantum loops are ebbing and flowing in sync. One scale up from the atom, chemical bonds provide an alignment of axes and quantum loops. Larger still, biological systems also provide synchronous organization, e.g., heart muscle. The electromagnetic field of a planet or sun also provides evidence of organization.

Each quantum loop and each cone generate its own gravity pulse, which explains why gravity has been described as a 5-D (or 10-D) phenomenon, consistent with the mass-particle's quantum loop through three lattice sets.

Black Holes

The axial structure of the atom appears to be the same for the black hole (FIG. 59). In a black hole, the energy is enormous since the black hole is operating as a quantum loop system with unified flow and large high-density resonant paths, generating extremely strong electromagnetic fields and gravity. High-density quantum loops can form on large levels, as long as the 4-D path returns to the original node and there is sufficient energy and lattice density for particle growth.

Regardless of scale, the black hole will follow the same quantum loop rules as mass-particles described throughout the paper. A black hole operates as a mass-particle system with quantum loops and a centerpoint (like a giant neutron pair), generating extremely strong synchronous quantum loop fields and gravity.

A direct result of the radius of the black hole, quasar gamma rays exhibit frequencies six orders of magnitude shorter than visible light. Following the rules of confinement, the black hole would have a high-density lattice set with relative radius in the range of 2,158,203,125 with a node count of 756 for a single lattice within a quantum loop and each confined quark would have a relative radius of 634,765,625.

Quasar ejection aligns along the radical axis and is influenced strongly by the rotating quantum loops, providing a straight axis of departure and organization. Rotation of the black hole provides the pulsing character of the quasar. Energy absorbed by the black hole on the return side of the quantum loop is released along the outward potion of the quantum loop where the loop turns back towards the apex of the loop.

A black hole is a unified quantum loop structure. In contrast, a planet or any non-homogeneous material acts as a multi-particle system and the gravitational effects are not as unified since it acts as many incoherent/incompatible small systems.

High-energy quantum loops for a black hole cannot be interrupted or disturbed with standard photon energy levels, so there are virtually no chaos effects associated with conventional temperature; therefore a black hole is cold and the quantum loops are dark. In any system, the higher the uninterrupted energy flow level, the "colder" the system. Energy is taken in and released by the remaining eight cones structures in the black hole system at more conventional levels and four-vectors. Mass quantum loops are destroyed and information is lost entering the black hole.

The axial and centerpoint for a black hole and an atom are the same. The atom has a 15-axis structure based on the alignment of four-wave axes. A physical model of the atom's axis structure is shown in FIG. 60 with the use of a centerpoint and wooden stick representing axes.

Neutron Star Collapse

The Model describes the real field generated by the neutron to maintain its volume in a neutron star while lattice spacing maintains the structure until the quantum loops are broken. As a neutron star collapses, it releases neutrinos and high-energy photons causing the "second explosion" for larger mass stars. Large amounts of energy can be released while leaving plenty of energy for the formation of the black hole.

As shown by the Model, the quantum loop is a narrow transfer of energy from point-to-point. In the context of the star, most of the energy and matter could be blown away and still yield a massive black hole. This is the source of the black hole information paradox.

As a neutron star's energy is transformed into a black hole structure, the strength of the gravity waves can be many times that of the original star, using only part of the original energy. The complex flow of the black hole torus is not visible conventionally. When the massive quantum loop system is undisturbed (unfed), it does not emit light and the lack of free photons would indicate a very cold structure. This explains a black hole's occasional dark or inactive appearance. The black hole, consistent with a neutron structure, would have no apparent charge. The tightness of the metric down to the centerpoint singularity, and the immense electromagnetic and gravity fields would follow the same rules as any mass-particle. The black hole has a very high frequency per unit absolute time.

Dark Matter

Projecting forward with the Model, there are several possible sources for "missing dark matter". First, the calculations for mass gravity need to be adjusted to account for real fourth, fifth and sixth dimensions. Second, the gravitational scale relative to the electromagnetic scale is not the same for all particles. Calculations and analysis reveal that hydrogen has a higher gravity value per proton than does iron. Third, within the cosmos there are scales of dimension waves larger that those required for mass, possibly providing a hidden level of organization to stellar matter. Finally, there are numerous dimension waves of energy on scales associated with matter and larger and smaller waves that provide organizational force.

EXAMPLES

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

Materials and Methods

Models can be prepared according to the present invention from a variety of materials and through a variety of media. The models can be expressed in a variety of materials and media depending on the communication objective, including: mathematical, static, dynamic, topical, animated, physical, rendered in precision AutoCAD, or rendered freehand. The models may represent all or part of the atomic structure including appropriate field organization or mass-particles to describe and teach the interaction of atoms and the influence of fields.

Among the many ways to describe the fundamentals of the Quantum Model from Planck scale to molecules, particles and atoms can be described using words, math sets, graphical and physical structure to describe, four-wave nodes, lattice sets, quantum loops, spindle tori, sticks, topological features, and compasses as well as hybrid arrangements. A variety of dimension variables are available to describe the multitude of dynamic interactions, including but not limited to generation of background disturbance and the formation of four-wave dimension intersections.

Example 1

A Framework for Supersymmetry

This example demonstrates that the Model provides the fundamental organization of the metric that provides the foundation for supersymmetry. The centerpoint resonance as in FIG. 4 creates alternating dimension waves from the centerpoint as represented by FIG. 2. Using the four-wave intersection model discrete quantization of the metric is modeled as in FIG. 5, with one-dimension waves controlling transfers of resonant energy from node-to-node at lightspeed. This nested metric can be further organized using permutational sets of 6-choose-4 dimension waves to create temporarily confined spaces using the math of Table 1. These 15 sets represented in Table 2, naturally organize into axial alignment through the centerpoint with a self-referencing metric as graphically represented by FIG. 7. Further developed, sets of axial triplets organize to a supersymmetric light-cone structure represented by FIG. 8.

Example 2

A Mathematic Tool for Calculating Particle Scale Relationships

This example demonstrates that the Model provides mathematical tools for calculating a scale relationship for different mass-particles and sub-particles. Using the equations from Equations 2-5, radii and count of high-density lattice points on circles can be derived as in Table 4. These sets are assembled to describe the relative radius and node count for mass-particle quantum loops and structure, yielding Table 6.

Further, using the complex spindle torus volume equations from Table 5, the volume of the spindle torus particles derived from the geometry of the three quantum loops can be determined. The relative node density and mass-gap of the respective loops can also be calculated and when combined with the volume results yields the mass-particle scale relationships described in Table 9. The mathematical analysis also yields the mass ratios for electron-proton mass, proton-neutron mass, and the magnetic moment of the electron and proton.

Example 3

A Mathematic Tool for Calculating Mass Relationships

This example demonstrates that the Model provides mathematical tools for calculating a scale relationship for different mass-particles and sub-particles. Using the equations from Equations 2-5, radii of high-density lattice points on circles can be derived and possible solutions of radii for quantum loops of discrete node count and relative radius as in Table 4. These sets are assembled to describe the relative radius and node count for mass-particle quantum loops and structure, yielding Table 6 and FIG. 20.

Example 4

Representing Particle Confinement and Mass Gap

Figure 15:
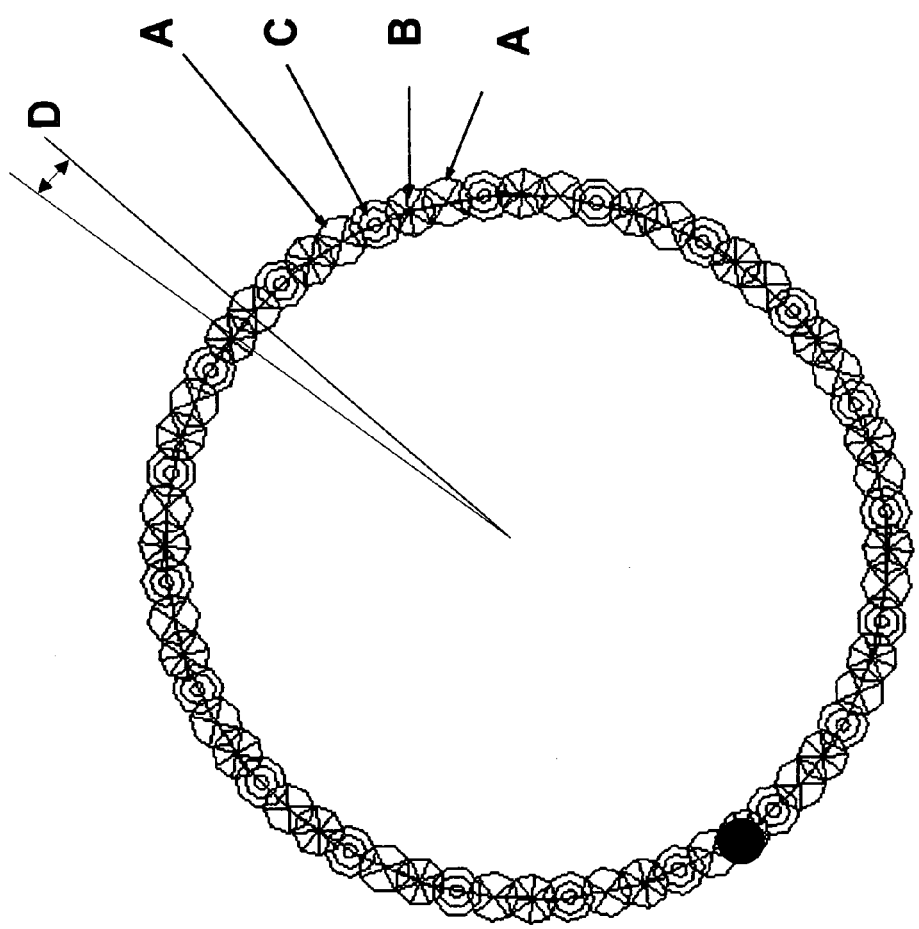
FIG. 15 shows one of three 5-D quantum loops in each particle each using three 6/4 lattice sets (from an electron quark, radius 25, node count 20). Letters A, B, and C each represent one 6/4 set. Letter D represents the maximal distance that energy can transfer successfully between nodes. The figure can also be animated with energy represented as transferring from node to node.

This example demonstrates that the confinement of sub-particles such as quarks inside protons is modeled using quantum loops sharing individual nodes as in FIGS. 26 and 27. The scale, tilt, node positions of the quantum loop sets are mutually aligned within the context of the dynamic metric. Energy can be shown to transfer from node-to-node through the quantum loop and respective shared spaces through animation and dynamic models. FIG. 15 is a model of the quantum loop that can be animated to show the transfer of energy between three lattice sets to create a closed quantum loop, sharing nodes with sub-particles. The quantum loop can be represented mathematically using Julia fractal math and visualizations as seen in FIG. 32.

The confinement for protons and quarks is easily differentiated. The tori structures are unique for the protons (~65% overlap major confinement torus and 3.4 to 1 confinement ratio, FIG. 28) relative to the quark (~90% overlap minor confinement torus and 5 to 1 confinement ratio, FIG. 29). The shared mass and energy value of the confining node is split between the respective quantum loops and provides unique four-wave positions for each particle/sub-particle set.

The Model is useful to the determination of the structure of mass loss during fusion and to determine the character of the strong force. Mass gap represents the sharing of nodes between quantum loops inside a particle and between contiguous particles. The intersection and shared nodes between the three quantum loops of a mass particle (Intra-mass gap) is easily represented by physical models such a FIGS. 16 and 36, where loops intersect at nodes, straddling the centerpoint. Between contiguous particles such as protons and neutrons, for example, quantum loops also share nodes (inter-mass gap) as shown in FIG. 36. The strong force is the result of the local metric organization that results in quantum loops and shared nodes between neutrons and protons.

Example 5

Metric Scales for Larger Atoms

This example demonstrates that the Model provides tools for calculating a scale relationship for proton, quark, and pentaquark sets of mass-particles for larger atoms. The larger relative radius quantum loop sets for mass-particles are based on high-density lattice solutions at larger scales. The model reveals the mechanism for tightening the relative radius of a mass-particle within the atom's metric so that additional quantum loops sets, particle, can be added. Larger radii sets are found by reviewing sets of high-density lattice circle solutions and math (Equations 2-5) with rules for confinement, yielding the partial list of mass-particle sets shown in Table 13.

Example 6

Identification of New Particles and Structures

The Model provides utility in identifying the physical structures and rules associated with quantum physics, identifying additional areas for experimental discovery and research. The model provides the solution to supersymmetry, centerpoint resonance and four-wave dynamics, quantum loop structure and geometry, particle structure and field generation including light and gravity. The Model also unifies the four forces. Importantly, quantum distance is now determinable in terms of four-wave intersections and relative radius.

Additional sub-particles have been identified and physically modeled such as electron sub-particles and additional quark sub-particles. The specific structure of the pentaquark was not known in 2002, but was previously identified in the parent published patent application 20040080274 as a sub-quark, and after 2002 was identified experimentally as a pentaquark. The disclosed Model also enables determination of the six-dimension structure and resonant function of the neutrino, or centerpoint.

The Model provides a deterministic four-dimension ruler for the measurement of metric tightening (FIGS. 38 and 39), light frequency, bonding characteristics, as well as providing a solution to the quantum paradox. The Model provides the fundamental quantum measurement tool, relative radii, which enables the determination of quantum loop solutions, mass-particle structures, atoms, and bonding interactions involving metric matching. The model also enables the determination of the scale of gravitation to the scale of the electromagnetic field by comparing the node count of the proton to the four-wave volume of the cylinder circumscribed around the proton torus (Table 15) and calculating the relative strengths by element yielding Table 16.

The Model enables the determination of the physical structure for the Higgs mechanism (FIG. 48).

The Model demonstrates the ten light-cone metric and the organization of the sweeping dimension waves which create a complex metric in six dimensions with each cone having an opposite spin to its axially symmetric opposite (FIG. 25). The Model also reveals that mass-particles have both positive and negative charge poles (FIGS. 22 to 24). Combining these structures provides an organization to the metric that with alignment significantly increase the apparent attractive forces, yielding the Higgs mechanism.

Significant capital investment and research hours have been targeted at locating the source or structure of the Higgs force. The Model serves as a tool to shift future experiment design, enhancing the focus on low energy experiments; probing the atom using light-wave characteristic as an expression of internal geometry.

Example 7

Base Ten Atomic Modeling

This example demonstrates that the Model yields a simplified structure to the atom that is base ten as shown in FIG. 37. Supersymmetric light-cone symmetry (FIG. 8), five sets of axial triplets (FIG. 6) and the conceptual equator (FIG. 8) provide a foundation for the Quantum Model based on levels of ten. Additionally, the Model shows the relative spin of each of the cones, the contrary spin orientation of the successive cone levels as shown in FIG. 45, and the natural mathematical limit that a change of a single dimension only affects eight of ten cones. Combined, these structures yield a deterministic positioning of electrons (FIG. 47) and atomic axes, crucial to modeling bonds and atomic level interactions.

Example 8

The Structure of Photons

This example demonstrates that the Model provides the fundamental wave structure for photons directly based on the radial scale of the quantum loop (FIG. 49). Further, the model shows the complex wave pattern associated with resonant energy being transferred within the photon (FIGS. 50 and 51) and the method of describing excitation of an individual dimension (FIG. 53). As a tool, this Model describes the fundamental structure for photons role both as a particle and a wave as represented by the interference pattern in FIG. 54. This description provides tools that lead to the storage of photons for computing memory and devices and provides a deterministic language for mathematical, graphical, and physical descriptions of light.

Example 9

Models of the Atom

This example demonstrates that the Model provides significant flexibility in representing particles, fields, and atoms. The atom has been represented in words and graphics and can be further animated, illustrated, or physically represented as illustrated and demonstrated throughout this application. The model is a teaching tool and can be used to enhance reading books, textbooks, manuscripts, computer programs, electronic media, films, research grant proposals, and other commercial ventures. The model provides significant value also for streamlining research proposals and spending. The models enhance the description of the atom through enlightenment, education, explanation, research guidance, and entertainment.

What is claimed is:

1. A physical representational model of an atom, comprising:
   a confined centerpoint region having a spherical shape;
   six wave generation source representations, each wave generation source representation is capable of establishing a propagating wave form by reflecting within the confines of the centerpoint region, wherein a 4-D lattice set is represented by a convergence of four of the six propagating wave forms, wherein the four of the six propagating wave forms are selected using a 6-choose-4 metric having 15 axes.

2. The physical representational model of claim 1, wherein the 15 axes of 4-D lattice sets are separated by equal angles of arcsine ⅓ in $R^6$.

3. The physical representational model of claim 1, wherein the 15 axes of 4-D lattice sets are used to establish five sets of axial triplets forming five light-cone pairs, the representational model further comprising:
a planar equator separating axially opposed cones for defining mass-particle spin orientation.

4. The physical representational model of claim 3, further comprising representation of a physical structure for the Higgs mechanism.

5. The physical representational model of claim 3, wherein each cone is capable of representing a neutron/proton pair and an electron aligned on a radical axis.

6. The physical representational model of claim 1, wherein a neutrino structure is represented by the confined centerpoint and six wave generation source representations.

7. The physical representational model of claim 1, wherein a quantum loop is represented by three 6-choose-4 lattice sets, wherein a full loop using nodes from each of the three 6-choose-4 lattice sets provides a 5-D quantum loop representation.

8. The physical representational model of claim 7, wherein a particle is defined by three of the quantum loops.

9. The physical representational model of claim 8, wherein each of the three quantum loops in a completion set is offset by about 120° and tilt based on a sequentially closest node.

10. The physical representational model of claim 8, wherein a particle pair is indicated by axial structure and minor symmetry.

11. The physical representational model of claim 8, wherein the particle is a mass-particle representation, wherein the three quantum loops align according to spindle torus geometry.

12. The physical representational model of claim 11, wherein multiple mass-particle representations are each constructed of three quantum loops of discrete relative radius based on high-density lattice circle sets representing relative radii solutions for illustrating generation of mass and discrete mass scales based on spindle torus geometries.

13. The physical representational model of claim 12, wherein the multiple mass-particle representations comprise at least one selected from an electron, a quark, end a proton;
wherein an electron mass-particle has a wave radius of 85 waves and 36 lattice points in each of the three 6-choose-4 lattice sets,
wherein a quark mass-particle has a wave radius of 325 waves and 60 lattice points in each of the three 6-choose-4 lattice sets,
wherein a proton mass-particle has a wave radius of 1105 waves and 108 lattice points in each of the three 6-choose-4 lattice sets, wherein each proton is shown as 108 points per quantum loop with three different colored loops.

14. The physical representational model of claim 8, wherein gravitational effects are represented by dimension wave disturbances of the quantum loops.

15. The physical representational model of claim 8, wherein node-to-node sequential transfer of energy around the quantum loops is illustrated, animated, or simulated.

16. The physical representational model of claim 1, wherein elements having atomic numbers 1-10 are represented using axial sticks.

17. The physical representational model of claim 1, wherein elements are represented using a compass model,
wherein neutron and proton pairs arc aligned on five axes, highlighting charge, spin, and one or more additional mass-particles, wherein the additional mass-particles are additional as related to a previous element.

* * * * *

UNITED STATES PATENT AND TRADEMARK OFFICE
CERTIFICATE OF CORRECTION

PATENT NO. : 7,284,987 B2
APPLICATION NO. : 10/996546
DATED : October 23, 2007
INVENTOR(S) : Terrence S. McGrath It is certified that error appears in the above-identified patent and that said Letters Patent is hereby corrected as shown below:

Column 4,
Line 57, "convention 3-D world" should read --conventional 3-D world--.

Column 8,
Line 9, "E is the similar to" should read --E is similar to--.
Lines 23-24, "The drawing also show" should read --The drawing also shows--.
Line 25, "Letter C show" should read --Letter C shows--.
Line 53, "two crests points" should read --two crest points--.
Line 56, "a crests D" should read --a crest D--.

Column 9,
Line 8, "quantum loop" should read --quantum loops--.

Column 12,
Lines 10-11, "result in a stronger field" should read --resulting in a stronger field--.
Line 53, "rotation sequences" should read --rotation sequence--.

Column 14,
Line 48, "straddle the centerpoint" should read --straddling the centerpoint--.

Column 16,
Line 4, "other mass-particle" should read --other mass-particles--.
Line 51, "Field strength is increase" should read --Field strength is increased--.

Column 18,
Line 21, "is the generated" should read --is generated--.

Column 20,
Line 46, "pin-pong balls" should read --ping-pong balls--.

Column 26,
Lines 47-48, "is relative "hard"" should read --is relatively "hard"--.

Column 28,
Line 26, "still meets" should read --still meet--.

Column 41,
Line 25, "$Z_{n+1} = (Z_n)_2 + K$" should read --$Z_{n+1} = (Z_n)^2 + K$--.

Column 45,
Line 19, "Hypemuclear" should read --Hypernuclear--.

UNITED STATES PATENT AND TRADEMARK OFFICE
CERTIFICATE OF CORRECTION

PATENT NO. : 7,284,987 B2
APPLICATION NO. : 10/996546
DATED : October 23, 2007
INVENTOR(S) : Terrence S. McGrath It is certified that error appears in the above-identified patent and that said Letters Patent is hereby corrected as shown below:

Column 47,
Line 35, "A compass model the atom" should read --A compass model of the atom--.
Line 57, "This serves to increases" should read --This serves to increase--.

Column 52,
Line 23, "an atom the respective sets" should read --an atom of the respective sets--.
Line 47, "is replace by" should read --is replaced by--.

Column 55,
Line 25, "advance wave It is the" should read --advance wave is the--.

Column 57,
Line 54, "transfers though" should read --transfers through--.

Column 60,
Line 20, "alignment positions" should read --alignment position--.
Lines 57-58, "energy travels traveling synchronously" should read
            --energy travels synchronously--.

Column 62,
Line 2, "The count for" should read --The total node count for--.
Line 12, "strength of the any node" should read --strength of any node--.

Column 64,
Line 6, "outward potion" should read --outward portion--.
Line 67, "larger that those" should read --larger than those--.

Signed and Sealed this

First Day of July, 2008

JON W. DUDAS
*Director of the United States Patent and Trademark Office*